United States Patent
Mao et al.

(10) Patent No.: US 12,254,175 B2
(45) Date of Patent: Mar. 18, 2025

(54) DISPLAY METHOD AND ELECTRONIC DEVICE

(71) Applicant: HONOR DEVICE CO., LTD., Guangdong (CN)

(72) Inventors: Lu Mao, Shenzhen (CN); Dayou Zhong, Shenzhen (CN); Yunke Zhang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/279,321

(22) PCT Filed: Jan. 4, 2023

(86) PCT No.: PCT/CN2023/070389
§ 371 (c)(1),
(2) Date: Aug. 29, 2023

(87) PCT Pub. No.: WO2023/131171
PCT Pub. Date: Jul. 13, 2023

(65) Prior Publication Data
US 2024/0152269 A1 May 9, 2024

(30) Foreign Application Priority Data
Jan. 6, 2022 (CN) .......................... 202210014268.5

(51) Int. Cl.
G06F 3/04886 (2022.01)
G06F 1/16 (2006.01)
H04M 1/72454 (2021.01)

(52) U.S. Cl.
CPC ........ *G06F 3/04886* (2013.01); *G06F 1/1652* (2013.01); *H04M 1/72454* (2021.01); *G06F 2203/04803* (2013.01)

(58) Field of Classification Search
CPC .............. G06F 3/04886; G06F 1/1652; G06F 2203/04803; H04M 1/72454
See application file for complete search history.

(56) References Cited

U.S. PATENT DOCUMENTS 11,240,365 B1 * 2/2022 Hulbert ............ H04M 1/72448
2014/0149931 A1 5/2014 Miki
(Continued)

FOREIGN PATENT DOCUMENTS

| CN | 105242898 A | 1/2016 |
| CN | 107423063 A | 12/2017 |

(Continued)

OTHER PUBLICATIONS

Extended European Search Report in European Appln No. 23737034. 1, dated Jul. 18, 2024, 11 pages.

*Primary Examiner* — Amit Chatly
(74) *Attorney, Agent, or Firm* — Fish & Richardson P.C.

(57) ABSTRACT

Embodiments of this application relate to the field of electronic devices, and disclose a display method and an electronic device. A specific solution is as follows: An electronic device displays a first interface on a display, where the first interface is an interface of a first application in the electronic device; when a second application in the electronic device meets a preset condition, the electronic device displays a first control on the first interface, where the first control includes an identifier of the first application and an identifier of the second application; the electronic device receives a first operation performed by a user on the first control; and in response to the first operation, the electronic device displays a second interface on the display, where the second interface includes the interface of the first application and an interface of the second application.

20 Claims, 38 Drawing Sheets

(56) References Cited

U.S. PATENT DOCUMENTS

| | | | |
|---|---|---|---|
| 2021/0342050 A1* | 11/2021 | Wang | ............... G06F 3/0486 |
| 2022/0253187 A1 | 8/2022 | Wang | |
| 2022/0253212 A1* | 8/2022 | Luo | ............... G06F 3/04883 |
| 2022/0342682 A1 | 10/2022 | Ni | |
| 2022/0365562 A1* | 11/2022 | Ahn | ............... G06F 1/1624 |
| 2022/0365675 A1 | 11/2022 | Fu et al. | |

FOREIGN PATENT DOCUMENTS

| | | | |
|---|---|---|---|
| CN | 107491278 | A | 12/2017 |
| CN | 109782976 | A | 5/2019 |
| CN | 110333818 | A | 10/2019 |
| CN | 112269506 | A | 1/2021 |
| CN | 113703624 | A | 11/2021 |
| CN | 113760138 | A | 12/2021 |
| EP | 3907591 | A1 | 11/2021 |
| EP | 4024828 | A1 | 7/2022 |
| WO | 2020238744 | A1 | 12/2020 |
| WO | 2021052223 | A1 | 3/2021 |
| WO | 2021063090 | A1 | 4/2021 |

* cited by examiner

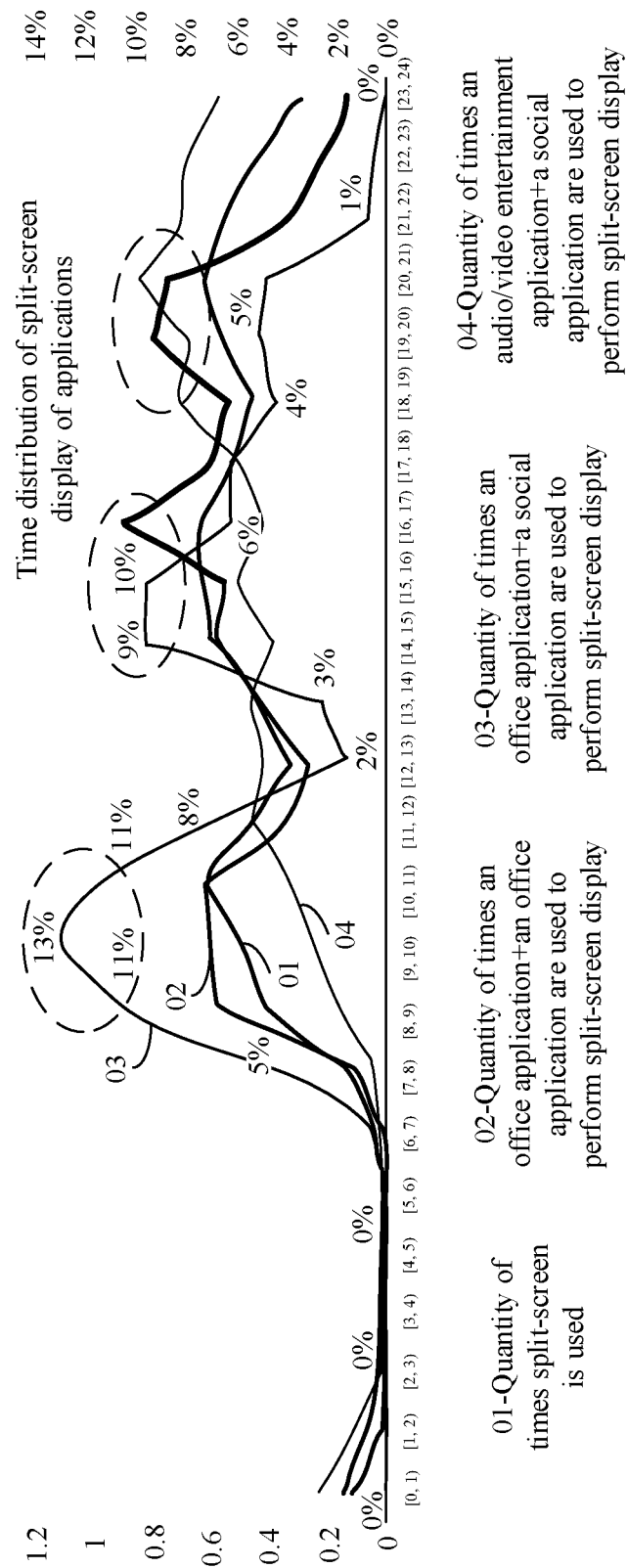
FIG. 12B(1)

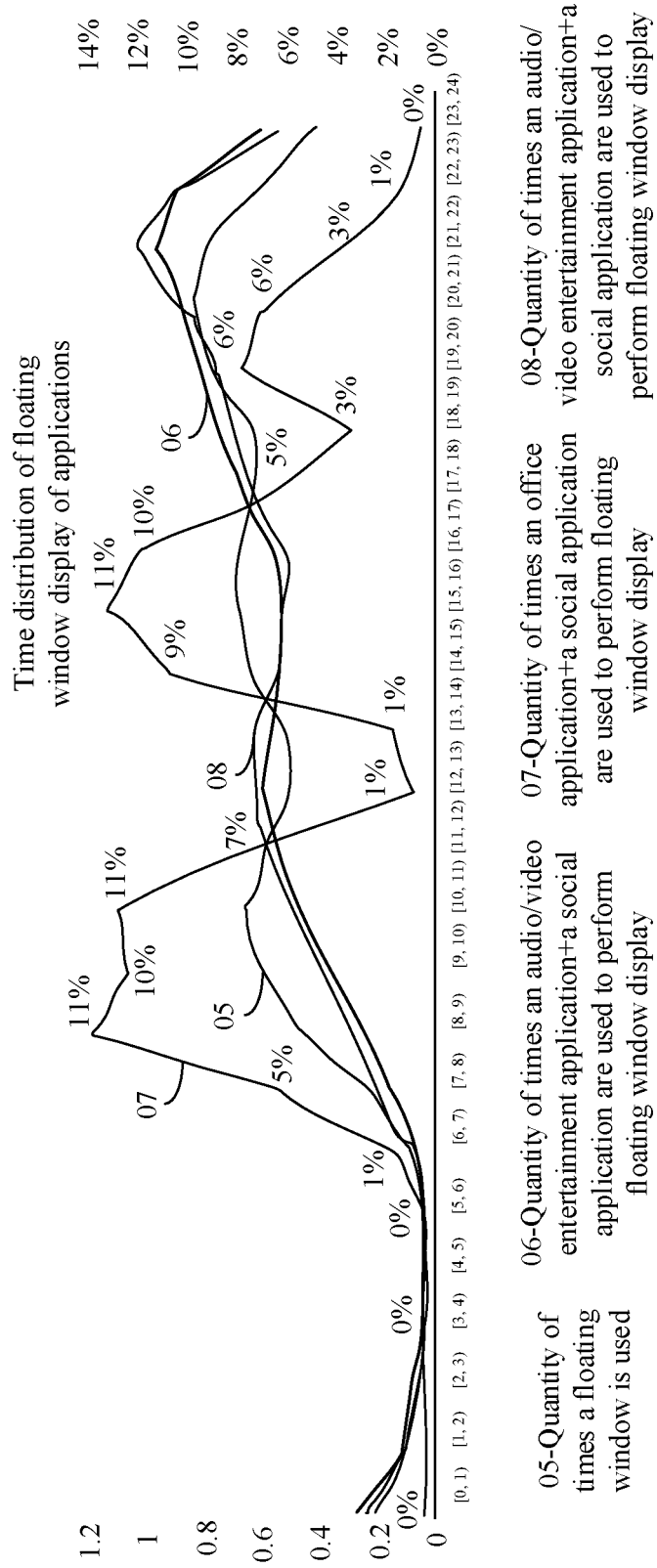
FIG. 12B(2)

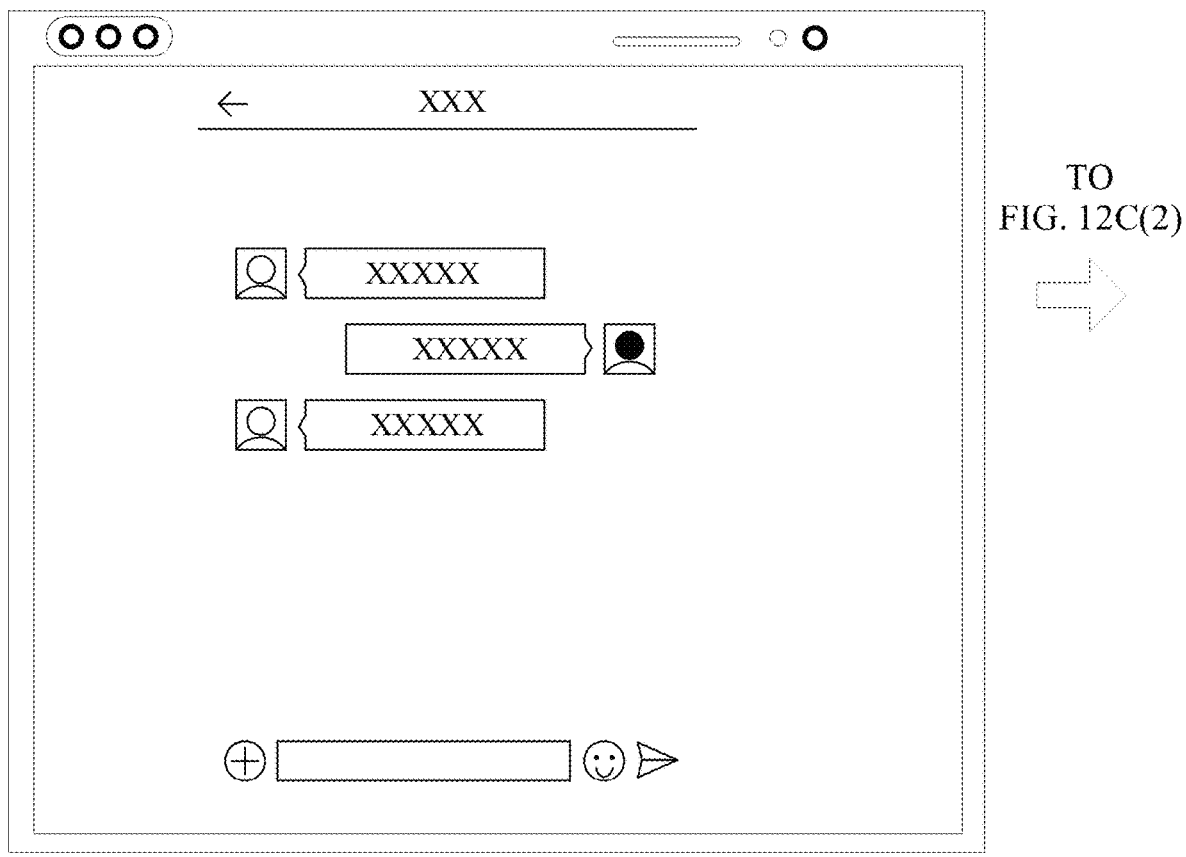
TO
FIG. 12C(2)
FIG. 12C(1)

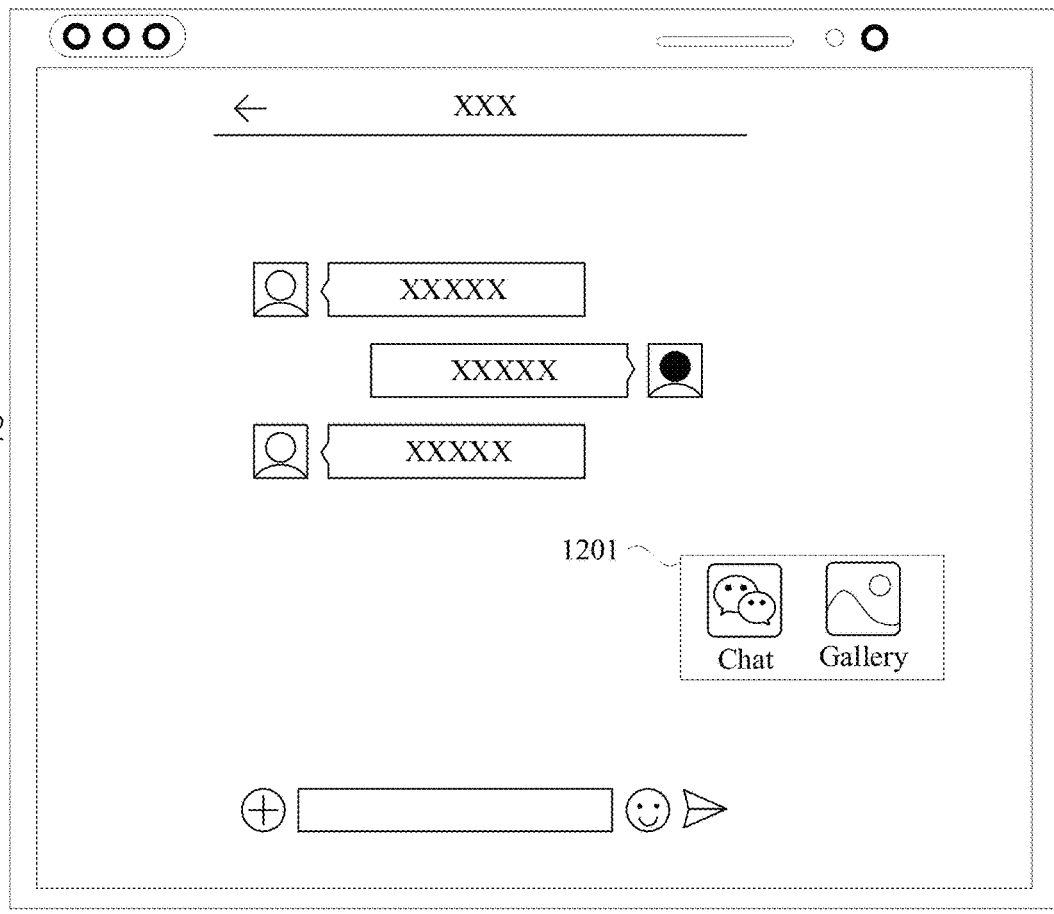
FIG. 12C(2)

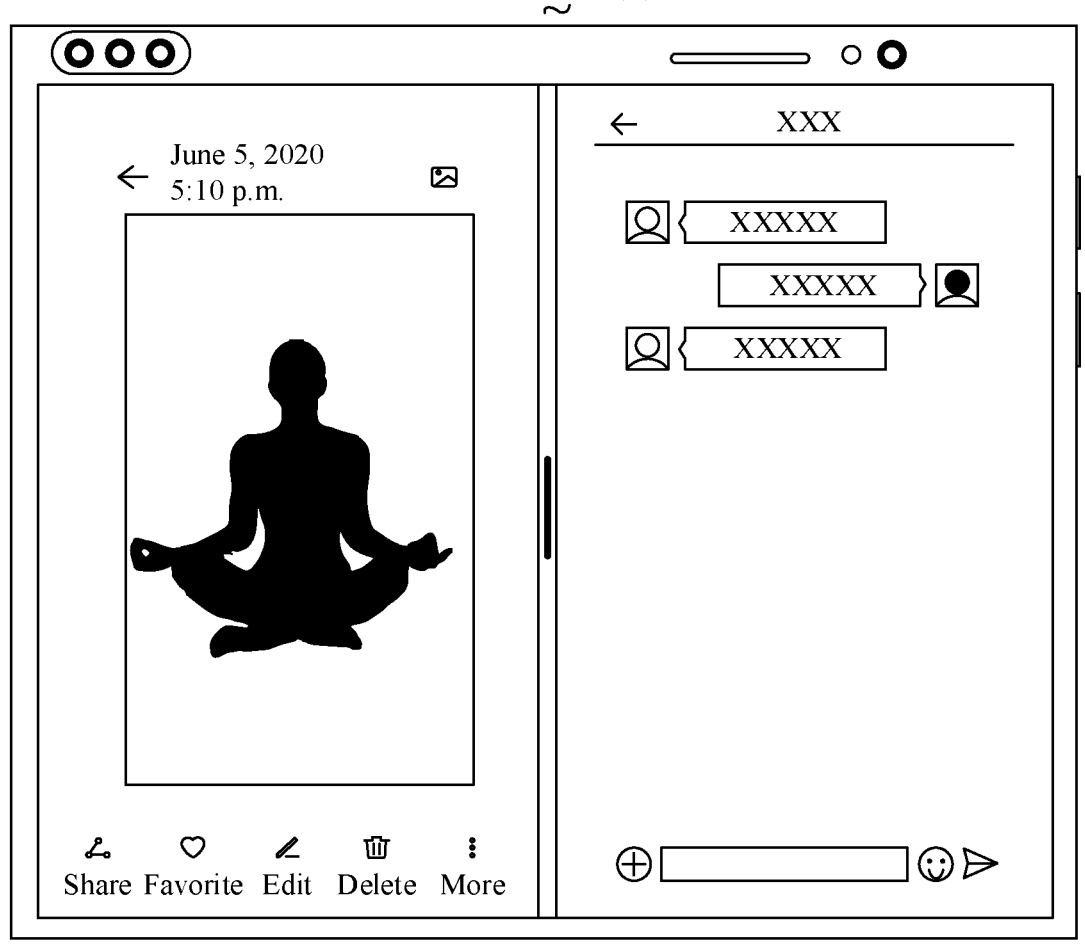
FIG. 12C(3)

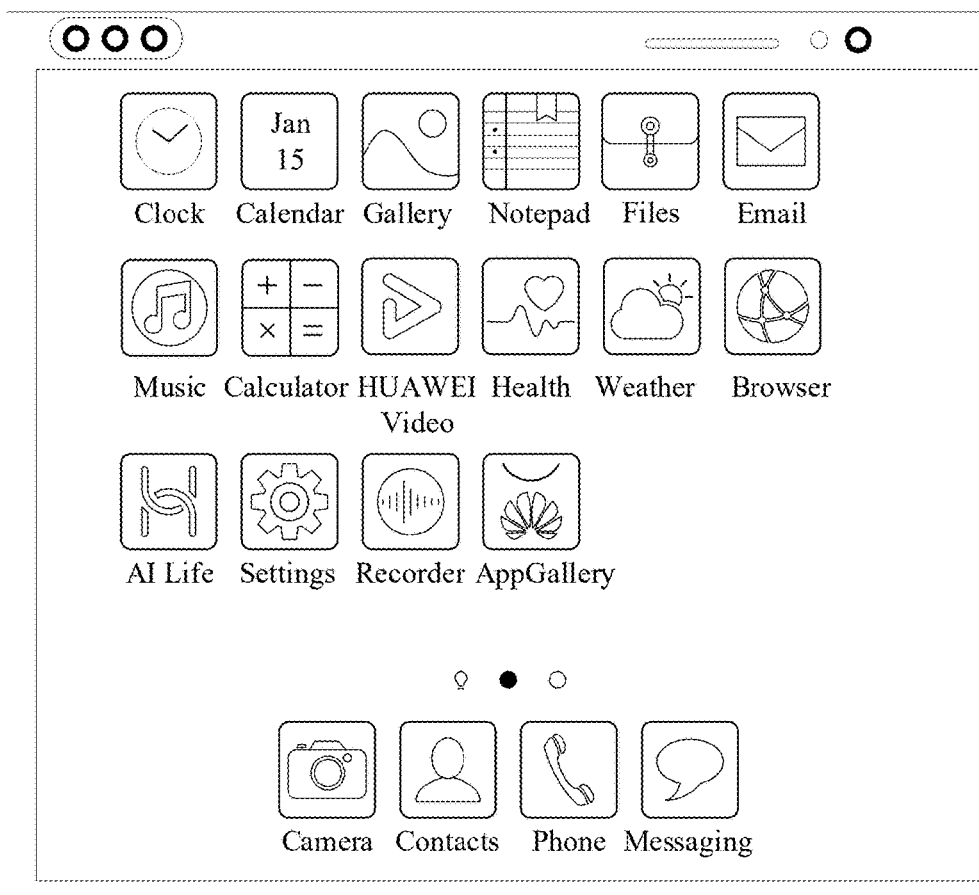
FIG. 13B(1)

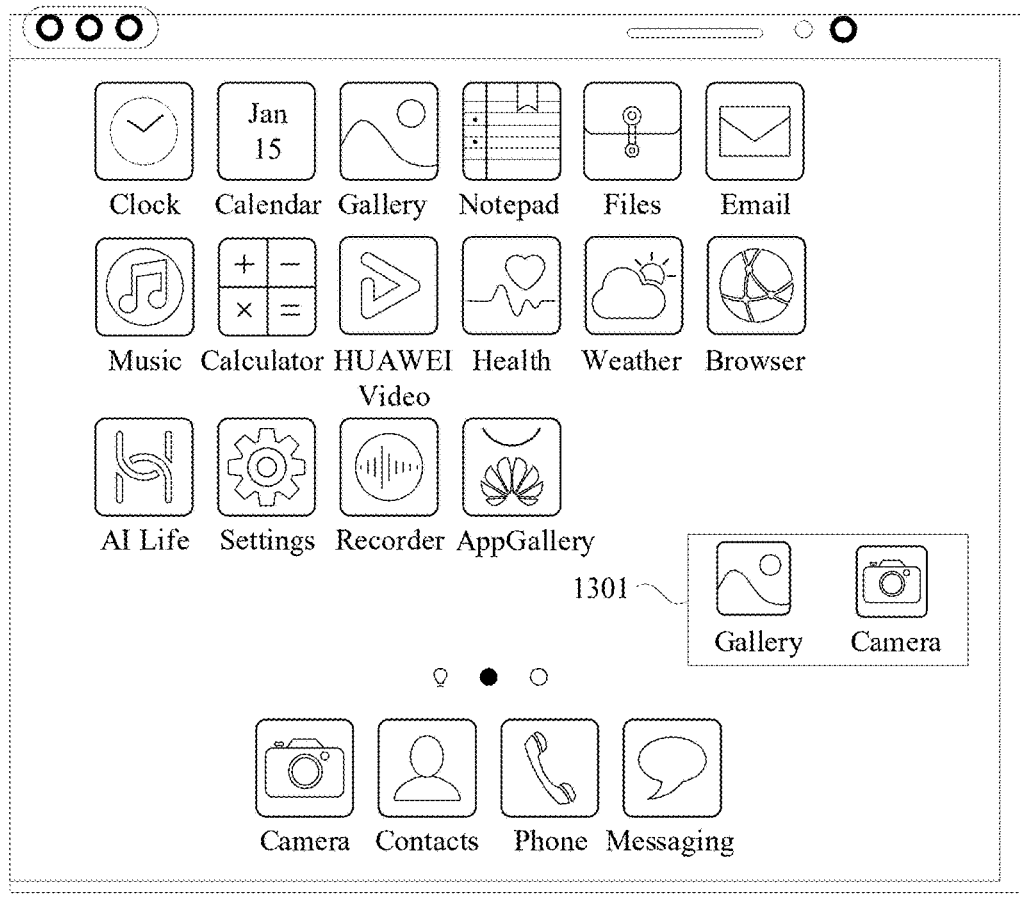
FIG. 13B(2)

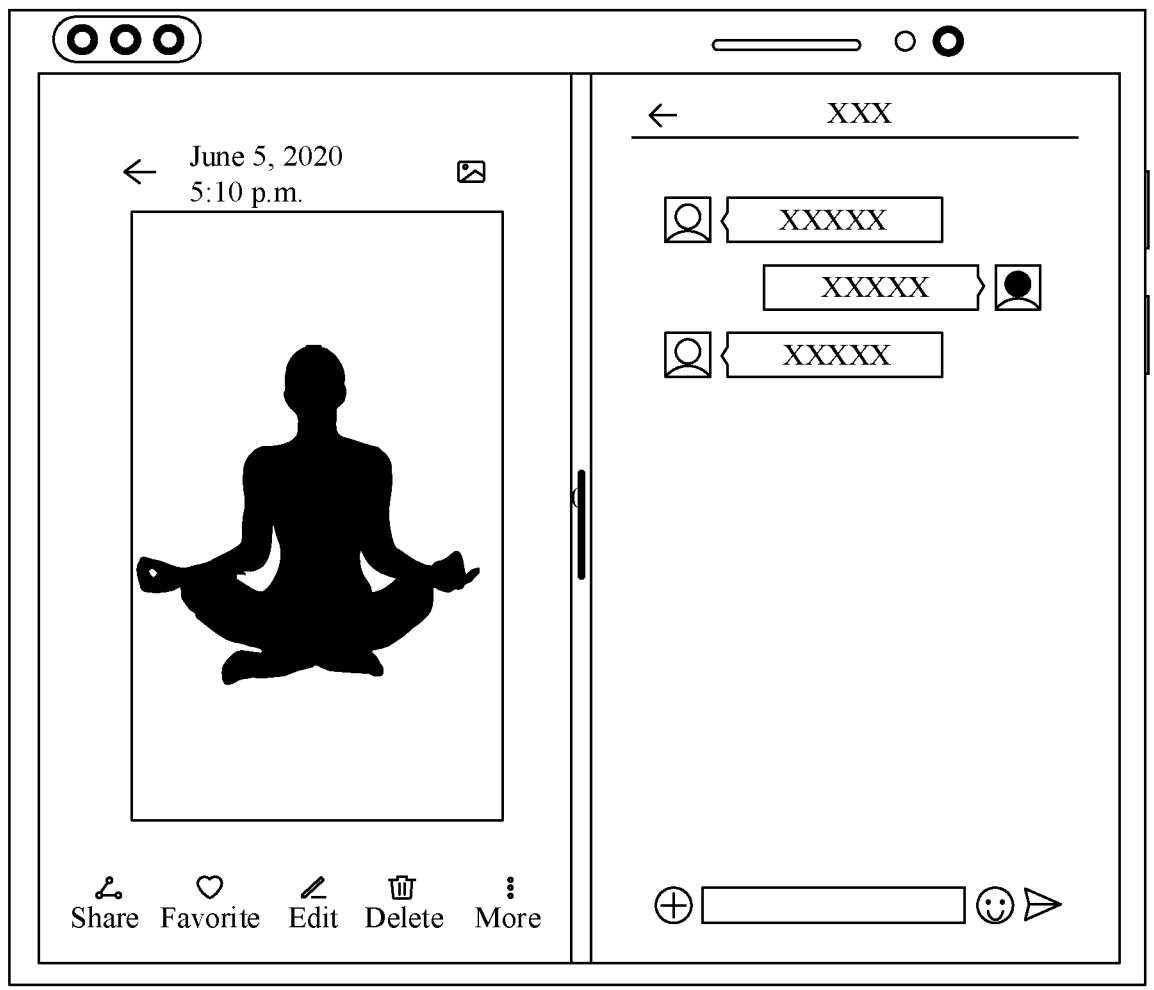
FIG. 13B(3)

Workday

| | Commuting | Forenoon | Lunch break | Afternoon | Metro commuting | Evening |
|---|---|---|---|---|---|---|
| Time | 8:30 — 9:00 | 9:30 — 11:30 | 12:00 — 14:00 | 14:30 — 17:30 | — 21:30 | — 23:30 |

Forenoon (9:30–11:30):
Historical split-screen information:
Applications: a learning and office application+a learning and office application
Time: forenoon
Site: office
Device status: none
Split-screen display manner: The learning and office application is on a left side+the learning and office application is on a right side

Lunch break (12:00–14:00):
Historical split-screen information:
Applications: a social application+a social application
Time: lunch break
Site: office
Device status: none
Split-screen display manner: The social application is on a left side+the social application is on a right side

Afternoon (14:30–17:30):
Historical split-screen information:
Applications: a learning and office application+a learning and office application
Time: forenoon
Site: office
Device status: none
Split-screen display manner: The learning and office application is on a left side+the learning and office application is on a right side

Metro commuting (17:30–21:30):
Historical split-screen information:
Applications: an audio/video entertainment application+a social application
Time: commuting
Site: subway
Device status: A foldable screen is unfolded
Split-screen display manner: The learning and office application is on a left side+the learning and office application is on a right side

Evening (21:30–23:30):
Historical split-screen information:
Applications: a game application+a social application
Time: forenoon
Site: office
Device status: A device is inserted with a headset
Split-screen display manner: The game application is at a bottom part+the social application is in a floating window

Weekend

| | At home | Leave home | Go home | Evening |
|---|---|---|---|---|
| Time | 8:30 — 9:30 | — 17:30 | — 21:30 | — 23:30 |

At home (8:30–9:30):
Historical split-screen information:
Applications: a social application+a utility application
Time: weekend
Site: home
Device status: A foldable screen is unfolded
Split-screen display manner: The social application is on a left side+the utility application is on a right side

Leave home (–17:30):
Historical split-screen information:
Applications: a map application+a social application
Time: weekend
Site: car
Device status: The device is connected to in-vehicle Bluetooth
Split-screen display manner: The map application is on a left side+the social application is on a right side

Go home (17:30–21:30):
Historical split-screen information:
Applications: a map application+an audio/video entertainment application
Time: weekend
Site: car
Device status: The device is connected to in-vehicle Bluetooth
Split-screen display manner: The map application is on a left side+the audio/video entertainment application is on a right side

Evening (21:30–23:30):
Historical split-screen information:
Applications: a game application+a social application
Time: evening
Site: home
Device status: The device is inserted with a headset
Split-screen display manner: The game application is at a bottom part+the social application is in a floating window

FIG. 14

DISPLAY METHOD AND ELECTRONIC DEVICE

CROSS-REFERENCE TO RELATED APPLICATIONS

This application is a national stage of International Application No. PCT/CN2023/070389 filed on Jan. 4, 2023, which claims priority to Chinese Patent Application No. 202210014268.5, filed on Jan. 6, 2022. Both of the aforementioned applications are hereby incorporated by reference in their entireties.

TECHNICAL FIELD

This application relates to the field of electronic devices, and in particular, to a display method and an electronic device.

BACKGROUND

With popularization and development of the Internet, requirements of users for functions of electronic devices (for example, a mobile phone and a tablet computer) are increasingly diverse. For example, increasingly more electronic devices can support split-screen display. For example, an electronic device can display content corresponding to a plurality of applications on a same display interface, to meet a usage requirement of a user for the plurality of applications within a same time period.

For example, the user can enable any application in the electronic device, bring up a split-screen application bar by performing an operation of sliding a screen from outside to inside at a left edge or a right edge of the screen of the electronic device and holding, and long press and drag an application in the split-screen application bar to the screen, so that the electronic device can display content corresponding to the two applications on a same display interface.

However, the foregoing split-screen display method for the electronic device needs the user to perform many operations to complete split-screen display of the electronic device, which brings use inconvenience to the user.

SUMMARY

Embodiments of this application provide a display method and an electronic device, to reduce operations performed when a user uses the electronic device to perform split-screen display, and improve split-screen display efficiency of the electronic device.

To achieve the foregoing objective, the following technical solutions are used in the embodiments of this application.

According to a first aspect, an embodiment of this application provides a display method, applied to an electronic device having a display. The display method may include: The electronic device displays a first interface on the display, where the first interface is an interface of a first application in the electronic device; when a second application in the electronic device meets a preset condition, the electronic device displays a first control on the first interface, where the first control includes an identifier of the first application and an identifier of the second application; the electronic device receives a first operation performed by a user on the first control; and in response to the first operation, the electronic device displays a second interface on the display, where the second interface includes the interface of the first application and an interface of the second application.

Based on the method in the first aspect, when the electronic device displays the interface of the first application, the electronic device can determine whether an application meeting the preset condition exists (for example, an application on which split-screen display can be performed). When the electronic device determines that an application meeting the preset condition exists, the electronic device can automatically display an identifier of the application on which split-screen display can be performed, thereby reducing operations performed when the user uses the electronic device to perform split-screen display, and improving split-screen display efficiency of the electronic device.

With reference to the first aspect, in another possible implementation, the preset condition may be one or more of the following conditions: a quantity of switching times between the second application and the first application within a first preset time period before the first interface is displayed is greater than a threshold for the quantity of switching times; the second application ran in a foreground within a second preset time period before the first interface is displayed; the second interface was displayed on the display before the first interface is displayed; and status information of the electronic device that is generated when the first interface is displayed matches historical status information of the electronic device that is generated when the second interface is displayed on the display, and the historical status information includes at least one of a location of the electronic device that exists when the second interface is displayed on the display, a time of the electronic device that exists when the second interface is displayed on the display, a device status of the electronic device that exists when the second interface is displayed on the display, and a speed of the electronic device that exists when the second interface is displayed on the display.

Based on the possible implementation, when the electronic device displays the interface corresponding to the first application, the electronic device can predict, based on the quantity of switching times between the first application and the second application, an enable sequence of the first application and the second application, an application on which split-screen display was performed by the electronic device, or current status information of the electronic device, an application on which the user needs to perform split-screen display. In this way, the electronic device can automatically display an identifier of the application included in the application on which split-screen display can be performed, thereby reducing operations performed when the user uses the electronic device to perform split-screen display, and improving split-screen display efficiency of the electronic device.

With reference to the first aspect, in another possible implementation, that status information of the electronic device that is generated when the first interface is displayed matches historical status information of the electronic device that is generated when the second interface is displayed on the display includes at least one of the following: a location of the electronic device that exists when the first interface is displayed on the display matches the location of the electronic device that exists when the second interface is displayed on the display; a time of the electronic device that exists when the first interface is displayed on the display matches the time of the electronic device that exists when the second interface is displayed on the display; a device status of the electronic device that exists when the first interface is displayed on the display matches the device status of the electronic device that exists when the second interface is displayed on the display; or a speed of the electronic device that exists when the first interface is displayed on the display matches the speed of the electronic device that exists when the second interface is displayed on the display.

Based on the possible implementation, when the electronic device displays the interface corresponding to the first application, the electronic device can predict, based on the current status information of the electronic device, the application on which the user needs to perform split-screen display. In this way, the electronic device can automatically display the identifier of the application included in the application on which split-screen display can be performed, thereby reducing operations performed when the user uses the electronic device to perform split-screen display, and improving split-screen display efficiency of the electronic device.

With reference to the first aspect, in another possible implementation, the display may be a foldable screen.

Based on the possible implementation, when the electronic device is an electronic device having a foldable screen, the electronic device can automatically display the identifier of the application on which split-screen display can be performed, thereby reducing operations performed when the user uses the electronic device to perform split-screen display, and improving split-screen display efficiency of the electronic device.

With reference to the first aspect, in another possible implementation, that the electronic device displays a second interface on the display may include: When it is detected that the foldable screen of the electronic device is in an unfolded state, the electronic device displays the second interface on the display.

Based on the possible implementation, when the electronic device is an electronic device having a foldable screen and when the foldable screen is unfolded, the electronic device can automatically display the identifier of the application on which split-screen display can be performed, thereby reducing operations performed when the user uses the electronic device to perform split-screen display, and improving split-screen display efficiency of the electronic device.

With reference to the first aspect, in another possible implementation, before the electronic device displays the second interface on the display, the display method may further include: When it is detected that the foldable screen of the electronic device is in a folded state, the electronic device displays a first prompt window, where the first prompt window is used to prompt the user to unfold the foldable screen of the electronic device; and the electronic device receives a second operation performed by the user to unfold the foldable screen.

Based on the possible implementation, when the foldable screen of the electronic device is folded, the electronic device can display a prompt window used to prompt the user to unfold the foldable screen of the electronic device, so that the electronic device can automatically display the identifier of the application on which split-screen display can be performed, thereby reducing operations performed when the user uses the electronic device to perform split-screen display, and improving split-screen display efficiency of the electronic device.

According to a second aspect, an embodiment of this application provides a display method, applied to an electronic device having a display. The display method may include: The electronic device displays a first interface on the display, where the first interface is a home screen of the electronic device or an interface corresponding to any application in the electronic device; when a first application and a second application in the electronic device meet a preset condition, the electronic device displays a first control on the first interface, where the first control includes an identifier of the first application and an identifier of the second application; the electronic device receives a first operation performed by a user on the first control; and in response to the first operation, the electronic device displays a second interface on the display, where the second interface includes an interface of the first application and an interface of the second application.

Based on the method in the second aspect, when the electronic device displays the first interface, the electronic device can determine whether an application meeting the preset condition exists (for example, an application on which split-screen display can be performed). When the electronic device determines that an application meeting the preset condition exists, the electronic device can automatically display an identifier of the application on which split-screen display can be performed, thereby reducing operations performed when the user uses the electronic device to perform split-screen display, and improving split-screen display efficiency of the electronic device.

With reference to the second aspect, in another possible implementation, the preset condition may be that status information of the electronic device that is generated when the first interface is displayed matches historical status information of the electronic device that is generated when the second interface is displayed on the display, and the historical status information includes at least one of a location of the electronic device that exists when the second interface is displayed on the display, a time of the electronic device that exists when the second interface is displayed on the display, a device status of the electronic device that exists when the second interface is displayed on the display, and a speed of the electronic device that exists when the second interface is displayed on the display.

Based on the possible implementation, when the electronic device displays the first interface, the electronic device can predict, based on current status information of the electronic device, an application on which the user needs to perform split-screen display, so that the electronic device can automatically display the identifier of the application included in the application on which split-screen display can be performed, thereby reducing operations performed when the user uses the electronic device to perform split-screen display, and improving split-screen display efficiency of the electronic device.

With reference to the second aspect, in another possible implementation, that status information of the electronic device that is generated when the first interface is displayed matches historical status information of the electronic device that is generated when the second interface is displayed on the display includes at least one of the following: a location of the electronic device that exists when the first interface is displayed on the display matches the location of the electronic device that exists when the second interface is displayed on the display; a time of the electronic device that exists when the first interface is displayed on the display matches the time of the electronic device that exists when the second interface is displayed on the display; a device status of the electronic device that exists when the first interface is displayed on the display matches the device status of the electronic device that exists when the second interface is displayed on the display; or a speed of the electronic device that exists when the first interface is displayed on the display matches the speed of the electronic device that exists when the second interface is displayed on the display.

Based on the possible implementation, when the electronic device displays the interface corresponding to the first application, the electronic device can predict, based on the current status information of the electronic device, the application on which the user needs to perform split-screen display. In this way, the electronic device can automatically display the identifier of the application included in the application on which split-screen display can be performed, thereby reducing operations performed when the user uses the electronic device to perform split-screen display, and improving split-screen display efficiency of the electronic device.

With reference to the second aspect, in another possible implementation, the display may be a foldable screen.

Based on the possible implementation, when the electronic device is an electronic device having a foldable screen, the electronic device can automatically display the identifier of the application on which split-screen display can be performed, thereby reducing operations performed when the user uses the electronic device to perform split-screen display, and improving split-screen display efficiency of the electronic device.

With reference to the second aspect, in another possible implementation, that the electronic device displays a second interface on the display may include: When it is detected that the foldable screen of the electronic device is in an unfolded state, the electronic device displays the second interface on the display.

Based on the possible implementation, when the electronic device is an electronic device having a foldable screen and when the foldable screen is unfolded, the electronic device can automatically display the identifier of the application on which split-screen display can be performed, thereby reducing operations performed when the user uses the electronic device to perform split-screen display, and improving split-screen display efficiency of the electronic device.

With reference to the second aspect, in another possible implementation, before the electronic device displays the second interface on the display, the display method may further include: When it is detected that the foldable screen of the electronic device is in a folded state, the electronic device displays a first prompt window, where the first prompt window is used to prompt the user to unfold the foldable screen of the electronic device; and the electronic device receives a second operation performed by the user to unfold the foldable screen.

Based on the possible implementation, when the foldable screen of the electronic device is folded, the electronic device can display a prompt window used to prompt the user to unfold the foldable screen of the electronic device, so that the electronic device can automatically display the identifier of the application on which split-screen display can be performed, thereby reducing operations performed when the user uses the electronic device to perform split-screen display, and improving split-screen display efficiency of the electronic device.

According to a third aspect, an embodiment of this application provides a display apparatus. The display apparatus may be used in an electronic device to implement the method in the first aspect. Functions of the display apparatus may be implemented by hardware or may be implemented by corresponding software executed by hardware. The hardware or software includes one or more modules corresponding to the functions, for example, a display module and a receiving module.

The display module may be configured to display a first interface on a display, where the first interface is an interface of a first application in the electronic device.

The display module may be further configured to display a first control on the first interface when a second application in the electronic device meets a preset condition, where the first control includes an identifier of the first application and an identifier of the second application.

The receiving module may be configured to receive a first operation performed by a user on a second control.

The display module may be further configured to display a second interface on the display in response to the first operation, where the second interface includes the interface of the first application and an interface of the second application.

With reference to the third aspect, in another possible implementation, the preset condition may be one or more of the following conditions: a quantity of switching times between the second application and the first application within a first preset time period before the first interface is displayed is greater than a threshold for the quantity of switching times; the second application ran in a foreground within a second preset time period before the first interface is displayed; the second interface was displayed on the display before the first interface is displayed; and status information of the electronic device that is generated when the first interface is displayed matches historical status information of the electronic device that is generated when the second interface is displayed on the display, and the historical status information includes at least one of a location of the electronic device that exists when the second interface is displayed on the display, a time of the electronic device that exists when the second interface is displayed on the display, a device status of the electronic device that exists when the second interface is displayed on the display, and a speed of the electronic device that exists when the second interface is displayed on the display.

With reference to the third aspect, in another possible implementation, that status information of the electronic device that is generated when the first interface is displayed matches historical status information of the electronic device that is generated when the second interface is displayed on the display includes at least one of the following: a location of the electronic device that exists when the first interface is displayed on the display matches the location of the electronic device that exists when the second interface is displayed on the display; a time of the electronic device that exists when the first interface is displayed on the display matches the time of the electronic device that exists when the second interface is displayed on the display; a device status of the electronic device that exists when the first interface is displayed on the display matches the device status of the electronic device that exists when the second interface is displayed on the display; or a speed of the electronic device that exists when the first interface is displayed on the display matches the speed of the electronic device that exists when the second interface is displayed on the display.

With reference to the third aspect, in another possible implementation, the display may be a foldable screen.

With reference to the third aspect, in another possible implementation, the display module may be further configured to display the second interface on the display when it is detected that the foldable screen of the electronic device is in an unfolded state.

With reference to the third aspect, in another possible implementation, the display module may be further configured to display a first prompt window when it is detected that the foldable screen of the electronic device is in a folded state, where the first prompt window is used to prompt the user to unfold the foldable screen of the electronic device. The receiving module may be further configured to receive a second operation performed by the user to unfold the foldable screen.

According to a fourth aspect, an embodiment of this application provides a display apparatus. The display apparatus may be used in an electronic device to implement the method in the first aspect. Functions of the display apparatus may be implemented by hardware or may be implemented by corresponding software executed by hardware. The hardware or software includes one or more modules corresponding to the functions, for example, a display module and a receiving module.

The display module may be configured to display a first interface on a display, where the first interface is a home screen of the electronic device or an interface corresponding to any application in the electronic device.

The display module may be further configured to display a first control on the first interface when a first application and a second application in the electronic device meet a preset condition, where the first control includes an identifier of the first application and an identifier of the second application.

The receiving module may be configured to receive a first operation performed by a user on the first control.

The display module may be further configured to enable the electronic device to display a second interface on the display in response to the first operation, where the second interface includes an interface of the first application and an interface of the second application.

With reference to the fourth aspect, in another possible implementation, the preset condition may be that status information of the electronic device that is generated when the first interface is displayed matches historical status information of the electronic device that is generated when the second interface is displayed on the display, and the historical status information includes at least one of a location of the electronic device that exists when the second interface is displayed on the display, a time of the electronic device that exists when the second interface is displayed on the display, a device status of the electronic device that exists when the second interface is displayed on the display, and a speed of the electronic device that exists when the second interface is displayed on the display.

With reference to the fourth aspect, in another possible implementation, that status information of the electronic device that is generated when the first interface is displayed matches historical status information of the electronic device that is generated when the second interface is displayed on the display includes at least one of the following: a location of the electronic device that exists when the first interface is displayed on the display matches the location of the electronic device that exists when the second interface is displayed on the display; a time of the electronic device that exists when the first interface is displayed on the display matches the time of the electronic device that exists when the second interface is displayed on the display; a device status of the electronic device that exists when the first interface is displayed on the display matches the device status of the electronic device that exists when the second interface is displayed on the display; or a speed of the electronic device that exists when the first interface is displayed on the display matches the speed of the electronic device that exists when the second interface is displayed on the display.

With reference to the fourth aspect, in another possible implementation, the display may be a foldable screen.

With reference to the fourth aspect, in another possible implementation, the display module may be further configured to display the second interface on the display when it is detected that the foldable screen of the electronic device is in an unfolded state.

With reference to the fourth aspect, in another possible implementation, the display module may be further configured to display a first prompt window when it is detected that the foldable screen of the electronic device is in a folded state, where the first prompt window is used to prompt the user to unfold the foldable screen of the electronic device. The receiving module may be further configured to receive a second operation performed by the user to unfold the foldable screen.

According to a fifth aspect, an embodiment of this application provides an electronic device, including a processor and a memory configured to store instructions executable by the processor. The processor is configured to enable, when executing the instructions, the electronic device to implement the device control method in the first aspect or any of the possible implementations of the first aspect; or the processor is configured to enable, when executing the instructions, the electronic device to implement the device control method in the second aspect or any of the possible implementations of the second aspect.

According to a sixth aspect, an embodiment of this application provides a computer-readable storage medium, where the computer-readable storage medium stores computer program instructions. When the computer program instructions are executed by an electronic device, the electronic device is enabled to implement the device control method in the first aspect or any of the possible implementations of the first aspect; or when the computer program instructions are executed by an electronic device, the electronic device is enabled to implement the device control method in the second aspect or any of the possible implementations of the second aspect.

According to a seventh aspect, an embodiment of this application provides a computer program product. The computer program product includes computer-readable code, and when the computer-readable code is run in an electronic device, the electronic device is enabled to implement the device control method in the first aspect or any of the possible implementations of the first aspect, or when the computer-readable code is run in an electronic device, the electronic device is enabled to implement the device control method in the second aspect or any of the possible implementations of the second aspect.

It should be understood that, for beneficial effects of the third aspect to the seventh aspect, refer to related descriptions in the first aspect or the second aspect. Details are not described herein again.

BRIEF DESCRIPTION OF DRAWINGS

FIG. 12B(1) and FIG. 12B(2) are a schematic diagram 1 of historical split-screen information of an electronic device according to an embodiment of this application;

FIG. 12C(1), FIG. 12C(2), and FIG. 12C(3) are a schematic diagram 8 of a split-screen display interface of an electronic device according to an embodiment of this application;

FIG. 13B(1), FIG. 13B(2), and FIG. 13B(3) are a schematic diagram 9 of a split-screen display interface of an electronic device according to an embodiment of this application;

FIG. 14 is a schematic diagram 2 of historical split-screen information of an electronic device according to an embodiment of this application;

DESCRIPTION OF EMBODIMENTS

The following clearly and completely describes the technical solutions in the embodiments of this application with reference to the accompanying drawings in the embodiments of this application. Apparently, the described embodiments are merely some rather than all of the embodiments of this application. All other embodiments obtained by a person of ordinary skill in the art without creative efforts fall within the protection scope of this application.

Terms "first" and "second" are merely used for description purposes, and shall not be understood as indicating or implying relative importance or implicitly indicating a quantity of technical features indicated. Therefore, features defined with "first" and "second" may explicitly or implicitly include one or more of the features. In the descriptions of this application, unless otherwise specified, "a plurality of" means two or more.

With popularization and development of the Internet, requirements of users for functions of electronic devices (for example, a mobile phone and a tablet computer) are increasingly diverse. For example, increasingly more electronic devices can support split-screen display. For example, an electronic device can display content corresponding to a plurality of applications on a same display interface, to meet a usage requirement of a user for the plurality of applications within a same time period.

Figure 1A:
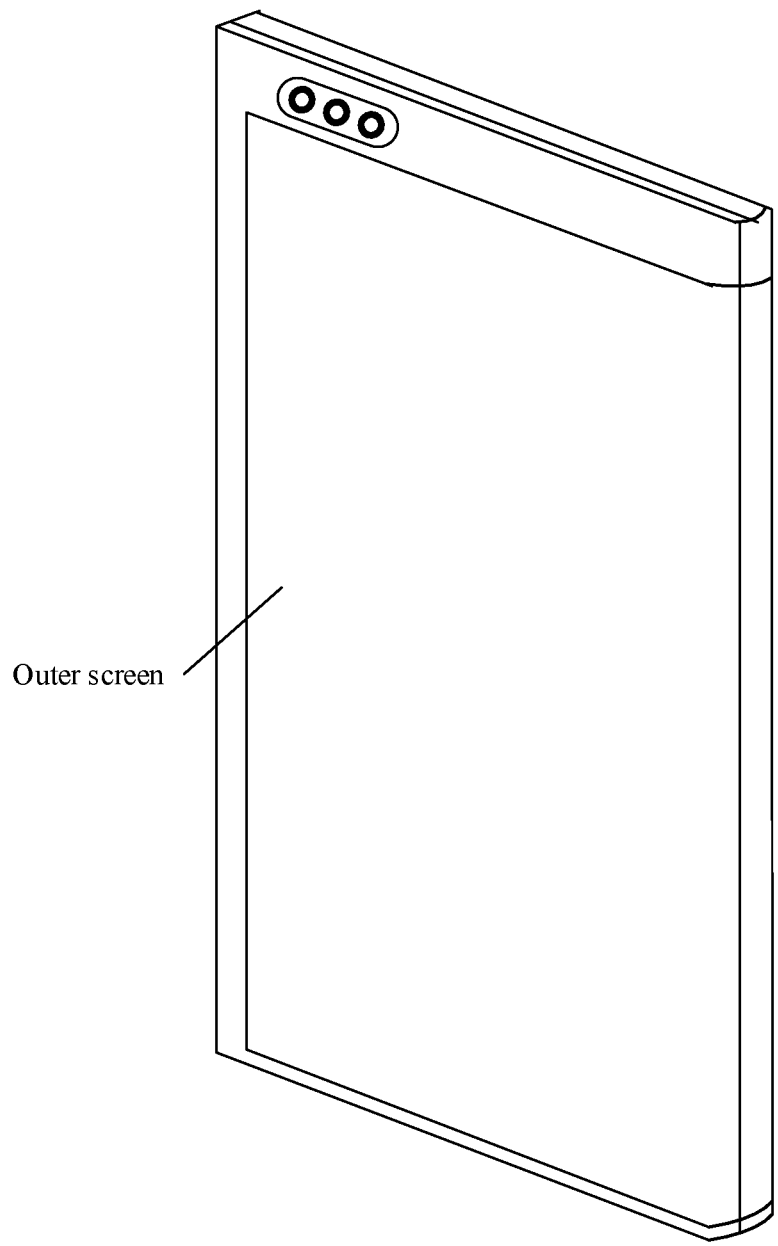
FIG. 1A, FIG. 1B, and FIG. 1C are a schematic diagram 1 of a split-screen display interface of an electronic device according to an embodiment of this application.
Figure 1B:
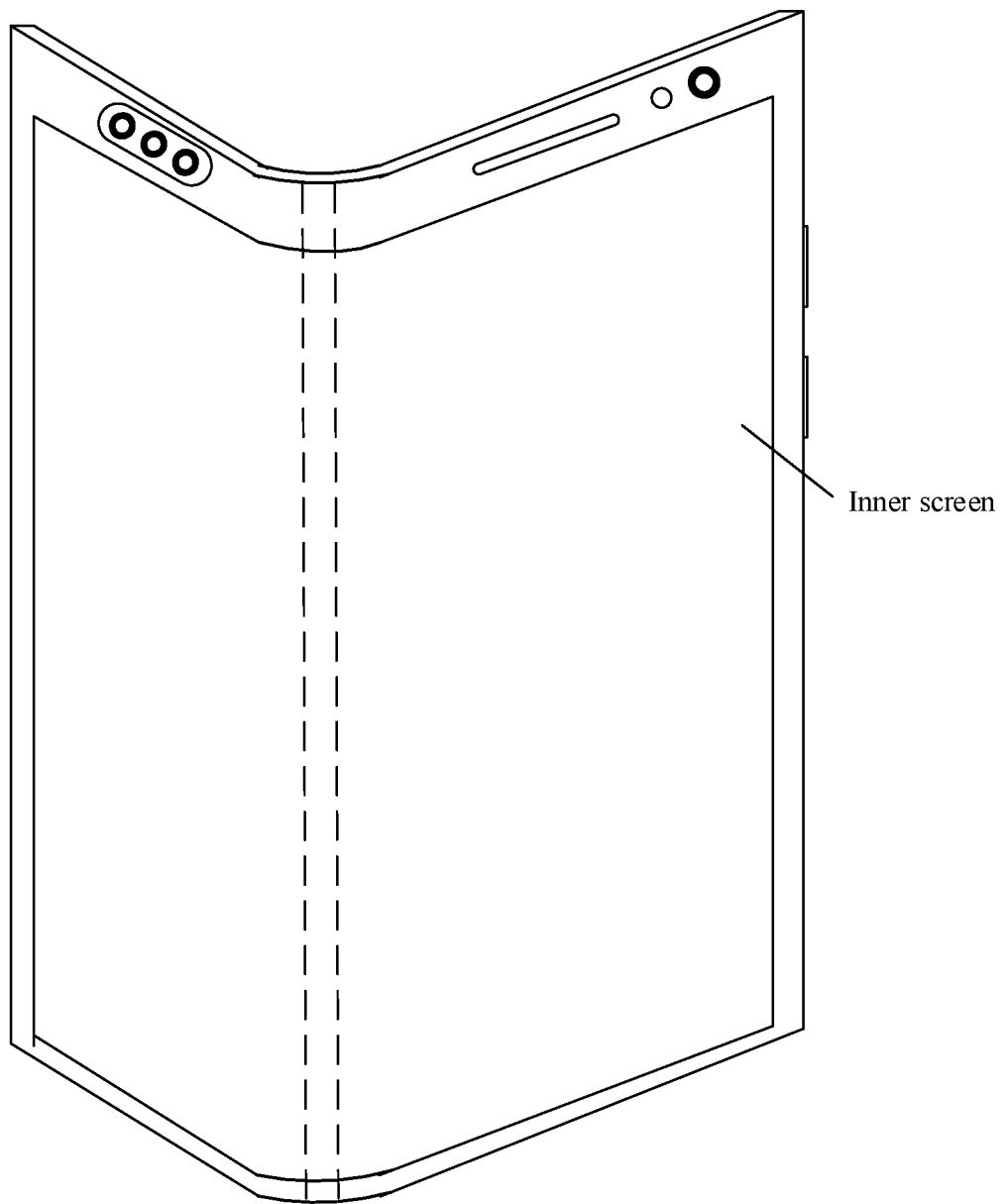
Figure 1C:
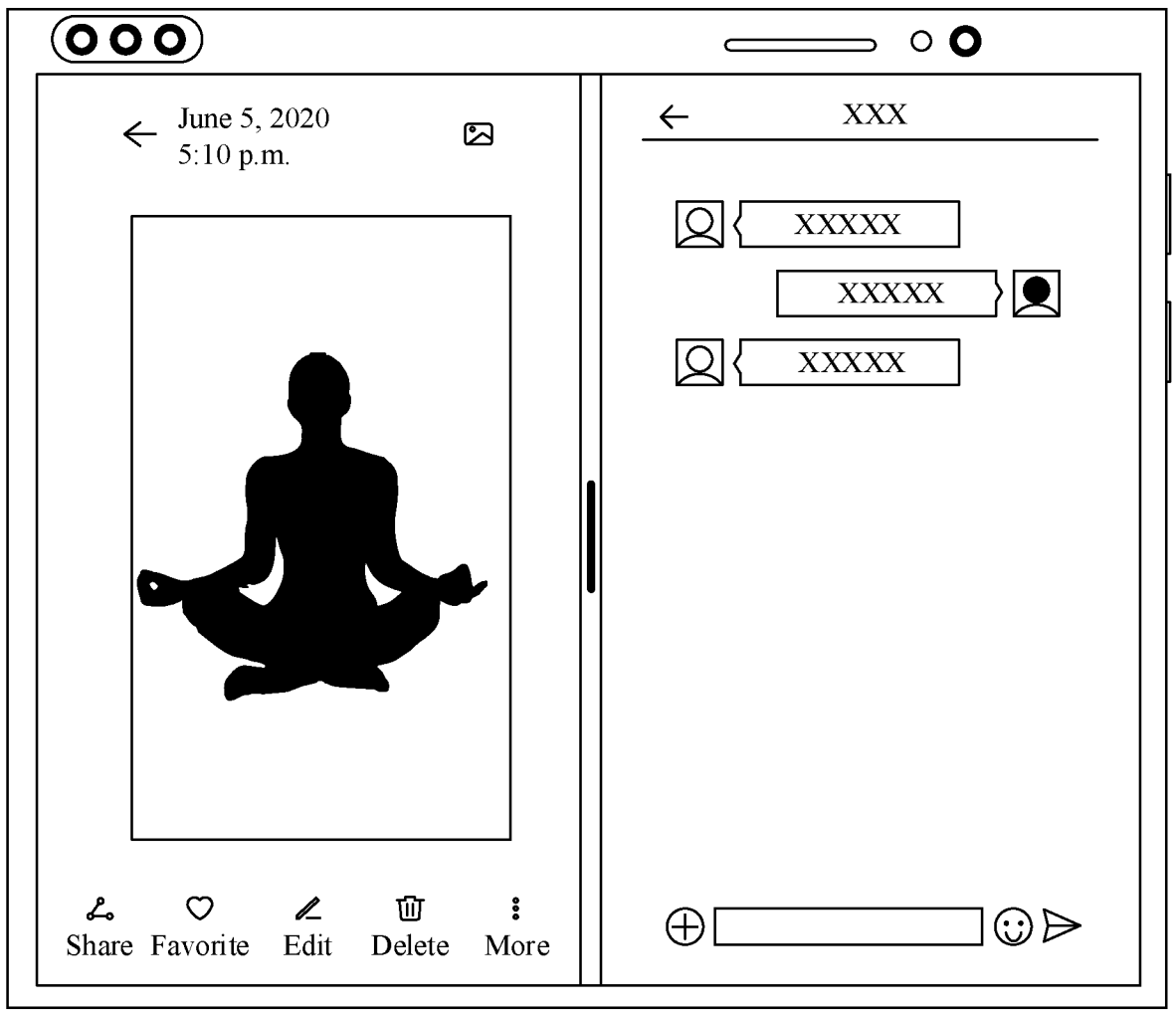

For example, a mobile phone is a mobile phone having an inward foldable screen. As shown in FIG. 1A, after the foldable-screen mobile phone is fully folded, that is, when the inward foldable screen (namely, an inner screen) is in a folded state, only an outer screen displays content. In this case, use experience of the foldable-screen mobile phone is the same as that of a bar-type mobile phone. As the mobile phone is unfolded, that is, when the inward foldable screen of the mobile phone is unfolded, the inward foldable screen (namely, the inner screen) can be folded into a form in a semi-folded state shown in FIG. 1B. As the mobile phone is continuously unfolded, FIG. 1C is a schematic diagram in which the inward foldable screen (namely, the inner screen) is in a fully unfolded state. When the inward foldable screen (namely, the inner screen) is in the fully unfolded state, the inner screen displays content, and the content can support full-screen display or left-right-screen display. In this case, the outer screen is in a screen-off state. With reference to FIG. 1C, when the foldable screen of the mobile phone is in the fully unfolded state, a user can enable a first application, for example, a picture application, in the mobile phone, so that a specific picture in the picture application can be edited. When a second application, for example, a specific social application, in the mobile phone receives a message, the user can trigger the mobile phone to perform split-screen display, that is, trigger the mobile phone to simultaneously display content corresponding to the picture application and content corresponding to the social application on a screen. As shown in FIG. 1C, after the user triggers the mobile phone to perform split-screen display, the mobile phone can simultaneously display the content corresponding to the picture application and the content corresponding to the social application on the screen. For example, the mobile phone can display the content corresponding to the social application on a right side of the screen and display the content corresponding to the picture application on a left side of the screen.

Usually, the user can enable any application in the electronic device, bring up a split-screen application bar by performing an operation of sliding a screen from outside to inside at a left edge, a right edge, an upper edge, or a lower edge of the screen of the electronic device and holding, and long press and drag an application in the split-screen application bar to the screen, so that the electronic device can display the two applications on a same display interface.

Figure 2A:
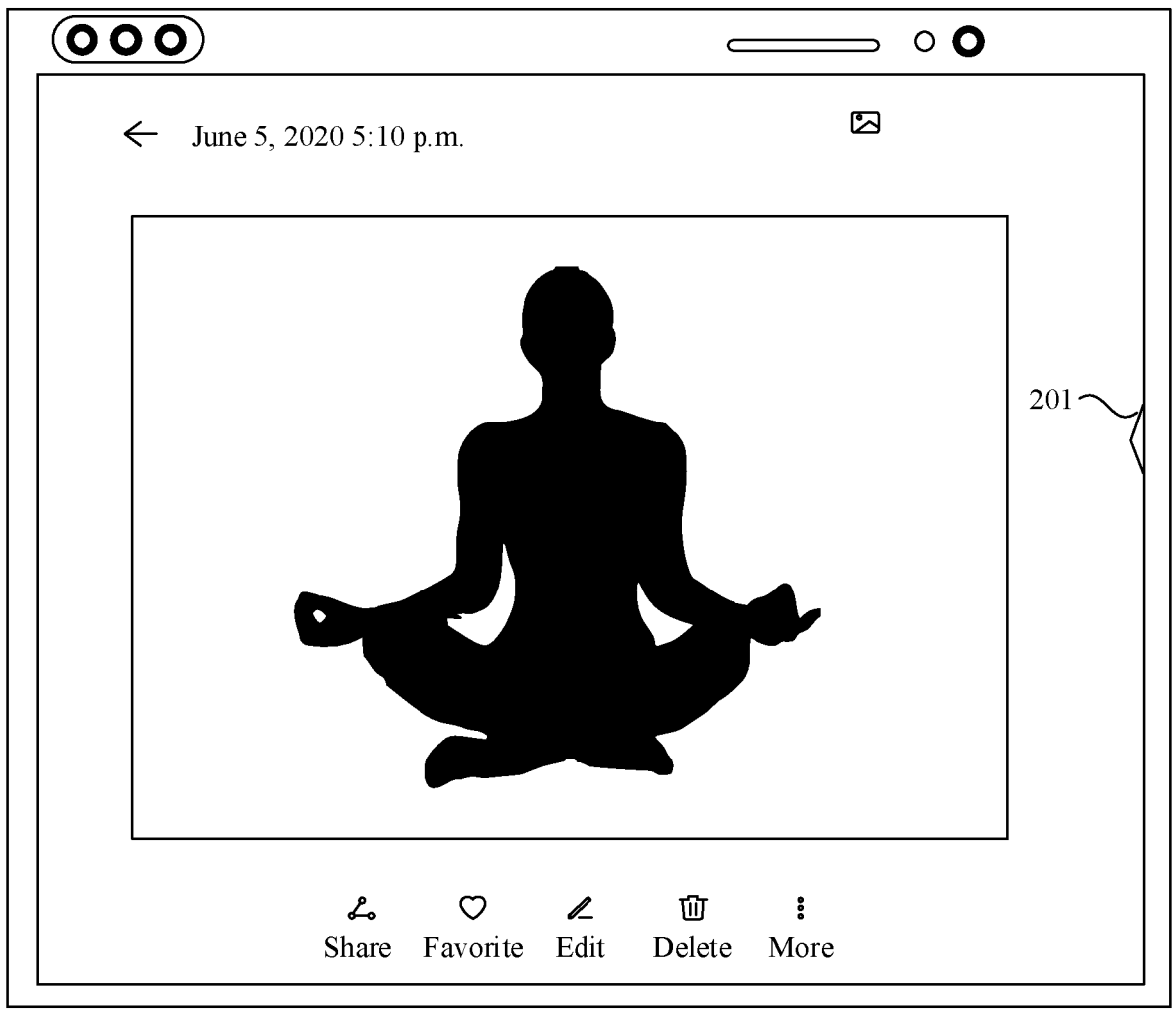
FIG. 2A, FIG. 2B, and FIG. 2C are a schematic diagram 2 of a split-screen display interface of an electronic device according to an embodiment of this application.

For example, the mobile phone is still a mobile phone having an inward foldable screen. A user can enable a picture application in the mobile phone, so that a specific picture in the picture application can be edited. As shown in FIG. 2A, when the foldable screen of the mobile phone is in a fully unfolded state, the mobile phone can display a display interface corresponding to the picture application. When a specific social application in the mobile phone receives a message, or when the user needs to simultaneously use another application (for example, an email application or a music application), the user can trigger a selection control 201 included in the display interface corresponding to the picture application, to trigger the mobile phone to display a split-screen application bar.

Figure 2B:
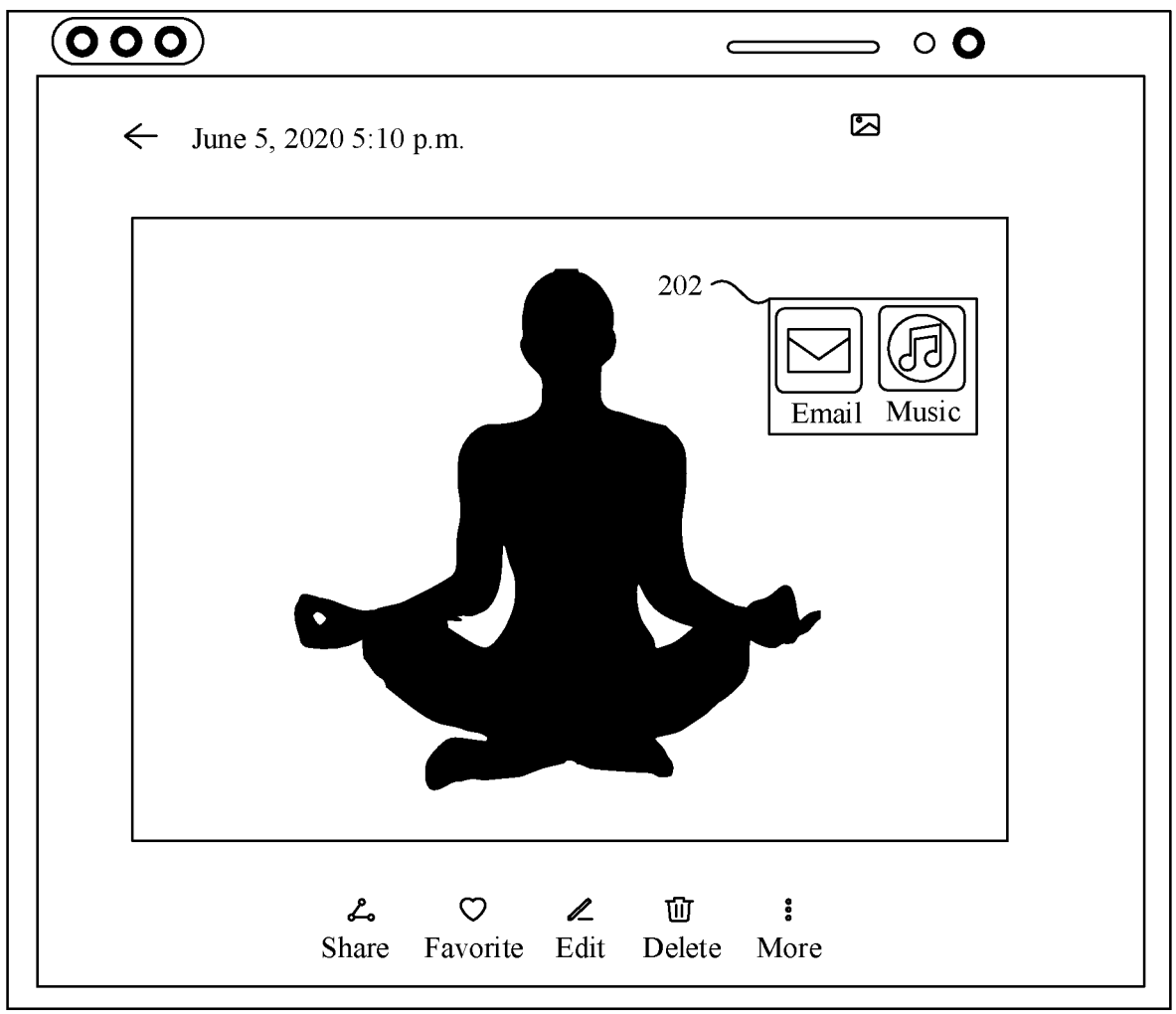

When the mobile phone receives a trigger operation, for example, a tap operation, performed by the user on the selection control 201, or an operation of sliding a screen from outside to inside and holding, as shown in FIG. 2B, the mobile phone can display, in response to the operation, the split-screen application bar 202 in the display interface corresponding to the picture application. The displayed split-screen application bar 202 may include an identifier of an application on which split-screen display can be performed. For example, the split-screen application bar 202 may include an identifier of the email application and an identifier of the music application, and the split-screen application bar 202 may also include an identifier of the social application on which split-screen display can be performed.

The user can select, from the identifiers that are of the applications and that are included in the split-screen application bar 202, an identifier of an application on which split-screen display needs to be performed, for example, the identifier of the social application. When the user selects the identifier of the social application, the user can long press the identifier of the social application and drag the identifier of the social application to the screen of the mobile phone.

Figure 2C:
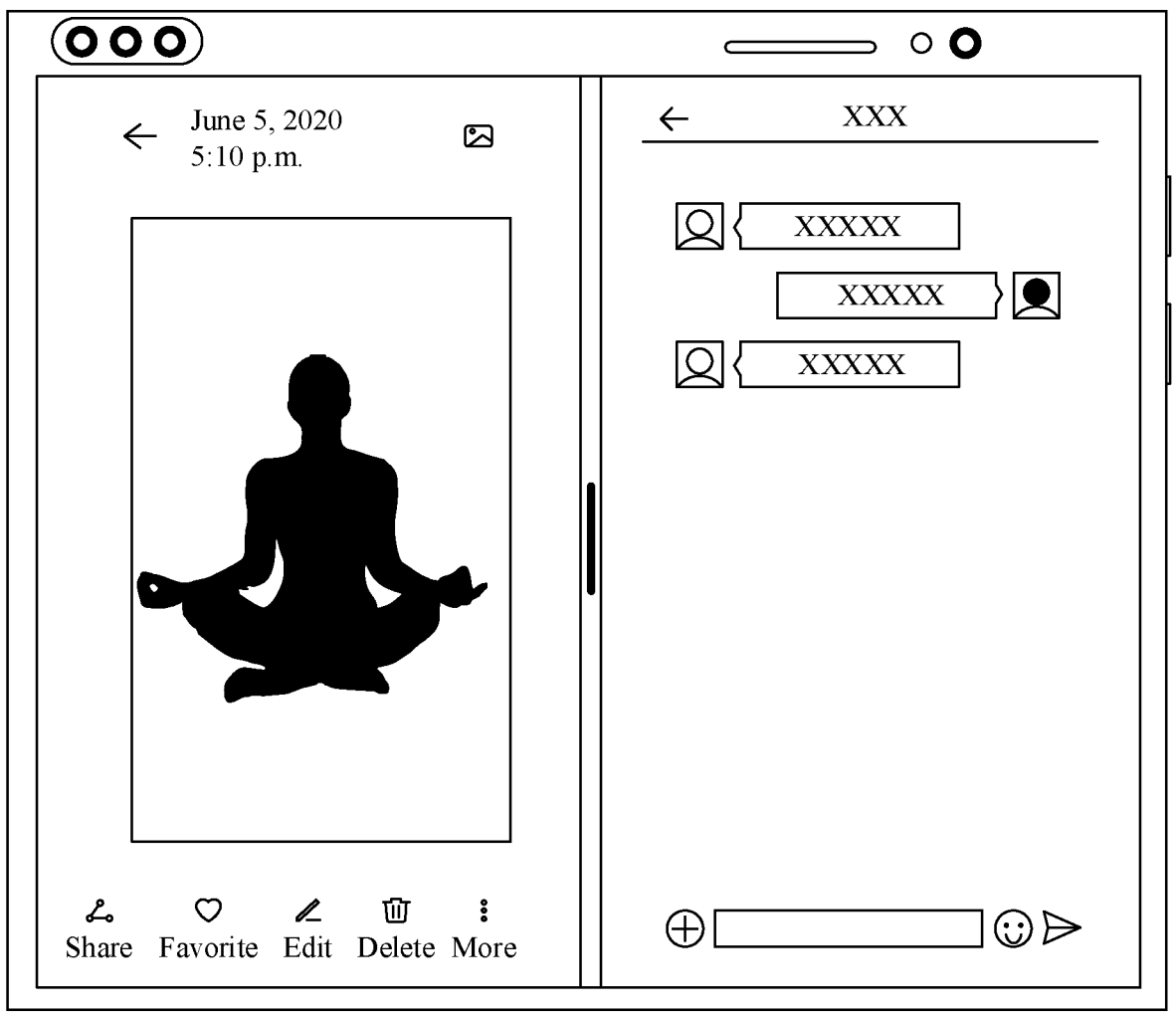

When the mobile phone receives the operation performed by the user to long press the identifier of the social application and drag the identifier of the social application to the screen of the mobile phone, the mobile phone can perform, in response to the operation, split-screen display on content corresponding to the picture application and content corresponding to the social application. As shown in FIG. 2C, the mobile phone can display the content corresponding to the social application on a right side of the screen and display the content corresponding to the picture application on a left side of the screen, that is, the mobile phone simultaneously displays the content corresponding to the two applications on a same display interface, to meet a usage requirement of the user for a plurality of applications within a same time period.

Figure 3A:
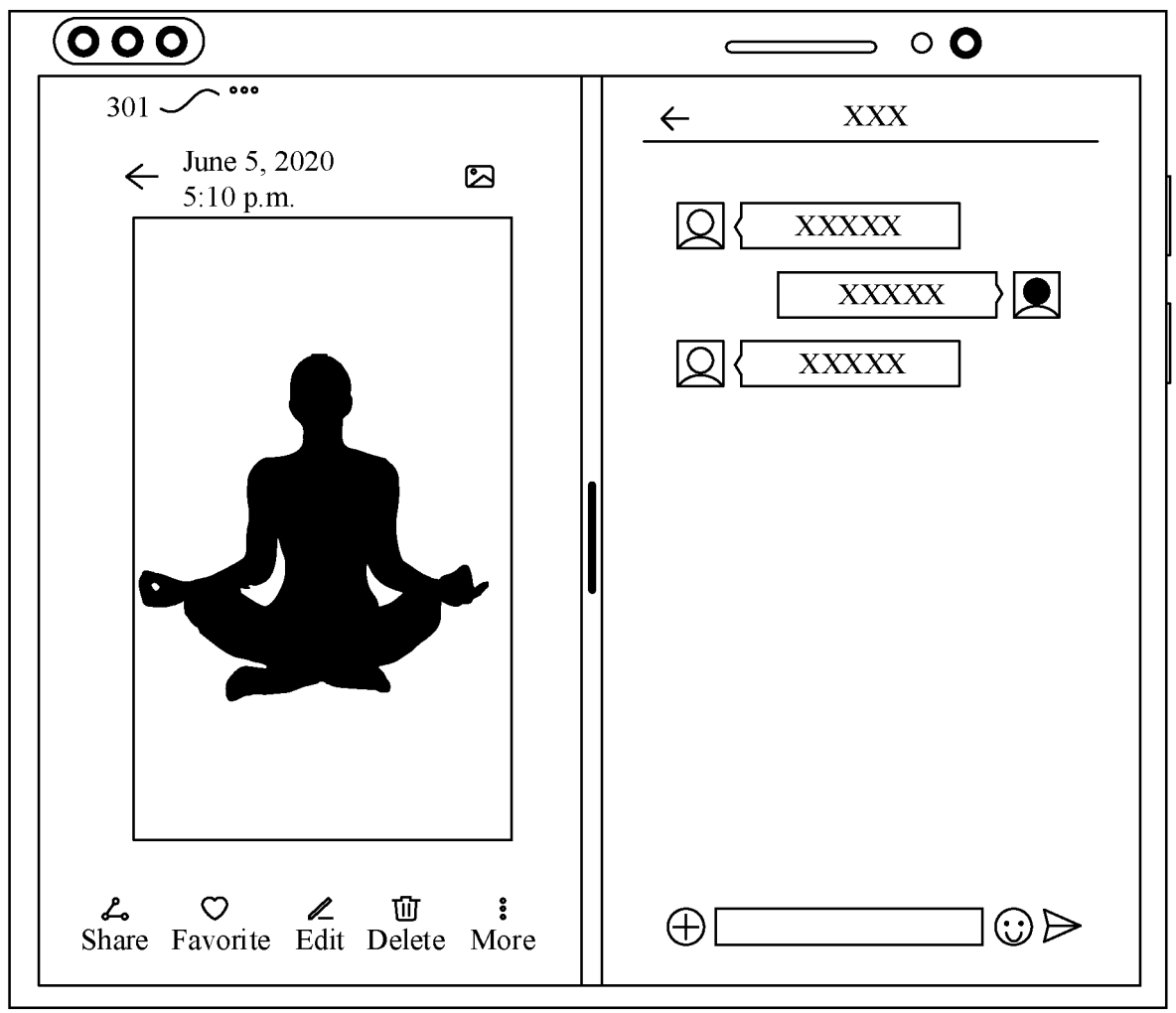
FIG. 3A, FIG. 3B, FIG. 3C, and FIG. 3D are a schematic diagram 3 of a split-screen display interface of an electronic device according to an embodiment of this application.

For another example, the mobile phone is still a mobile phone having an inward foldable screen. With reference to FIG. 3A, when the foldable screen of the mobile phone is in a fully unfolded state, and when the mobile phone performs split-screen display on content corresponding to a picture application and content corresponding to a social application, the mobile phone may display a multitasking control 301 on a display interface, where the multitasking control 301 is used to trigger the mobile phone to display a plurality of split-screen modes such as a split-screen browsing mode, a side pulling mode, and a middle window mode. In the split-screen browsing mode, the mobile phone can display content corresponding to two applications side by side, that is, the display interface of the mobile phone may include a left display area and a right display area, and each display area displays content corresponding to one application. The mobile phone may alternatively display content corresponding to two applications in an up-down direction, that is, the display interface of the mobile phone may include an upper display area and a lower display area, and each display area displays content corresponding to one application. The user may further drag a slider bar between the two display areas to adjust sizes of the display areas corresponding to the two applications.

Figure 3B:
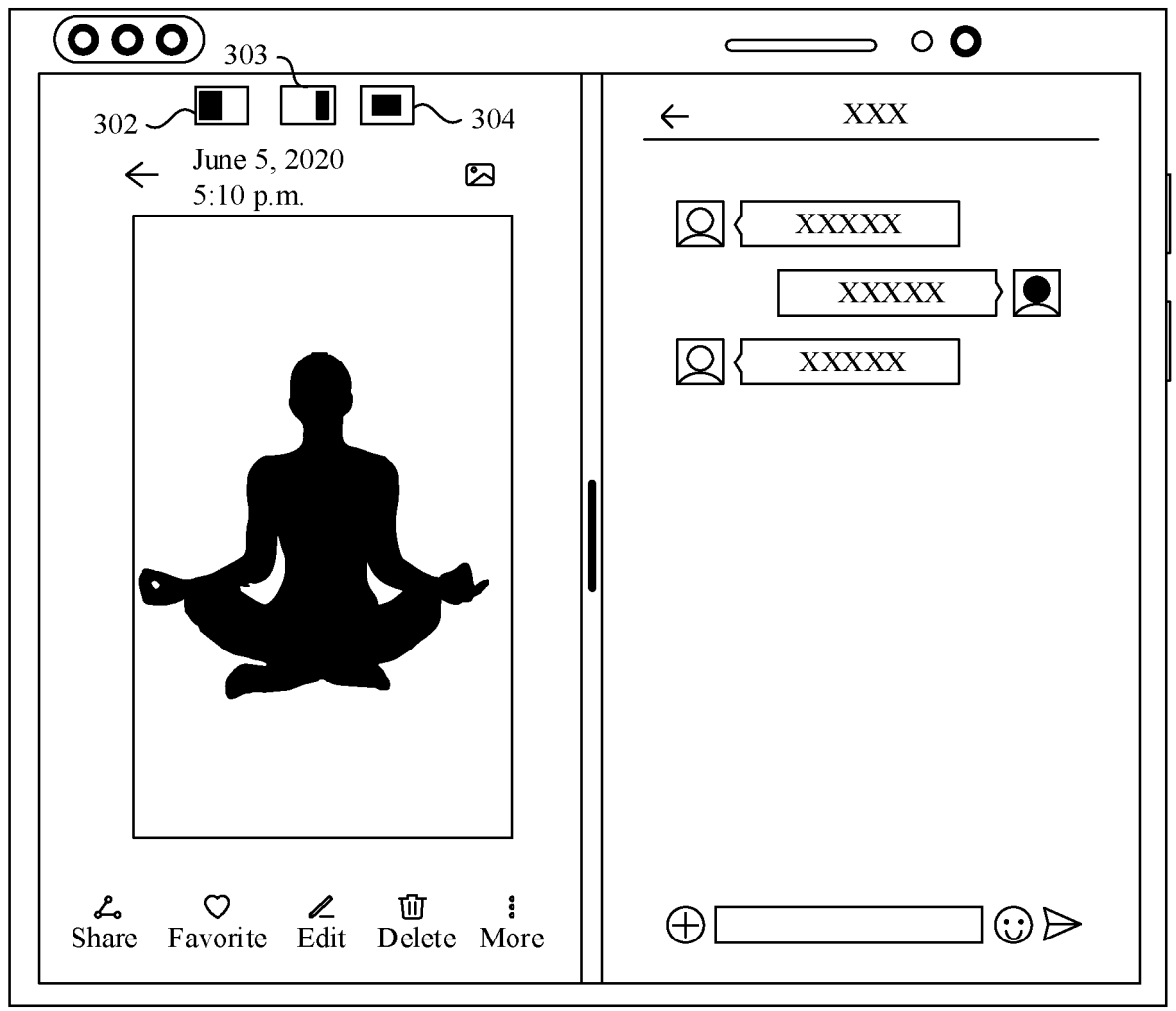

For example, when the mobile phone receives a trigger operation, for example, a tap operation, performed by a user on the multitasking control 301, as shown in FIG. 3B, the mobile phone may display, in response to the operation, controls such as a split-screen browsing control 302, a side pulling control 303, and a middle window control 304 corresponding to the plurality of split-screen modes.

Figure 4A:
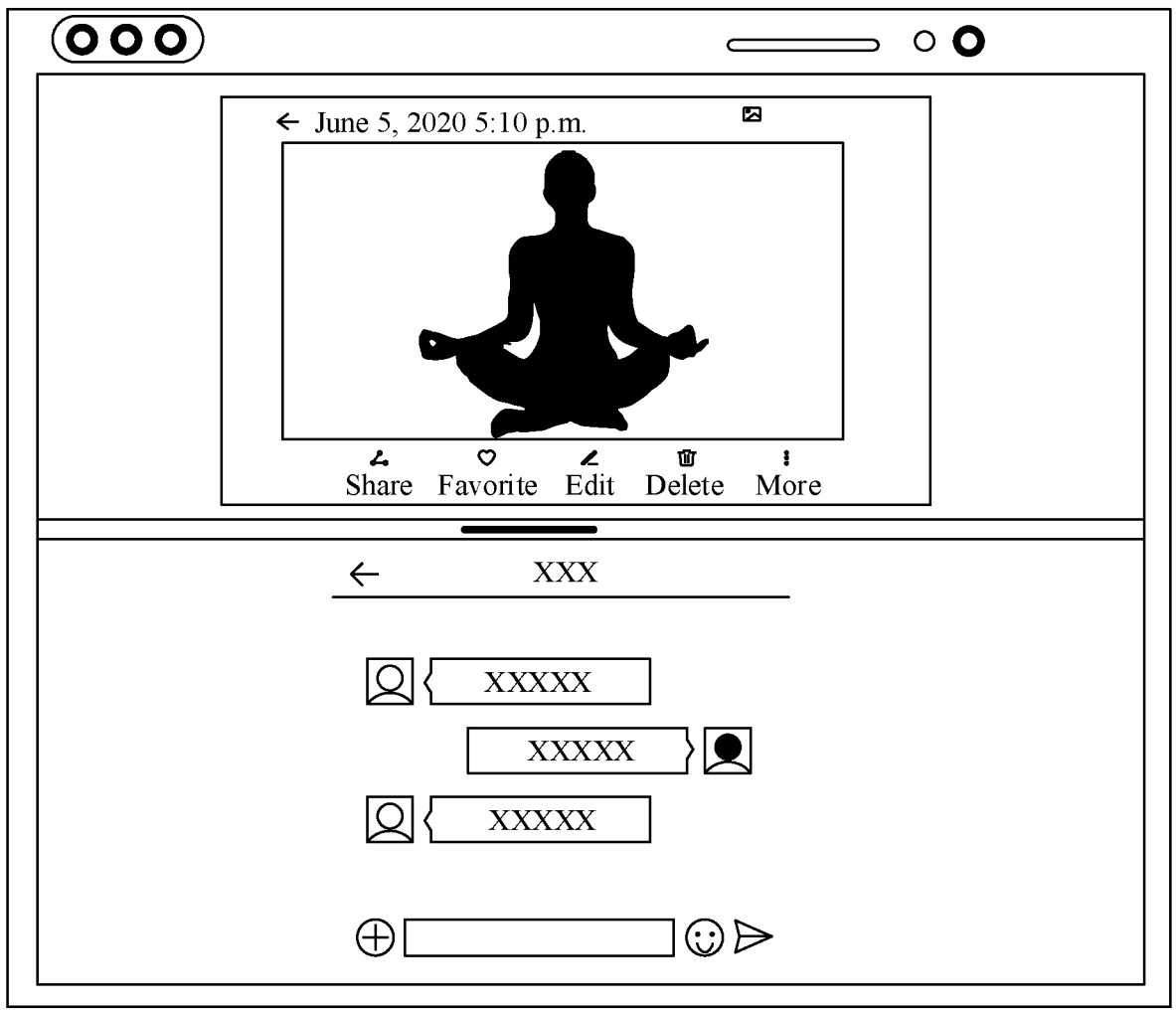
FIG. 4A and FIG. 4B are a schematic diagram 4 of a split-screen display interface of an electronic device according to an embodiment of this application.

When the mobile phone receives a trigger operation, for example, a tap operation, performed by the user on the split-screen browsing control 302, as shown in FIG. 3B, the mobile phone may display, in response to the operation, content corresponding to two applications in a left-right direction, that is, the display interface of the mobile phone may include a left display area and a right display area, the left display area can display the content corresponding to the picture application, and the right display area can display the content corresponding to the social application. When the mobile phone receives a trigger operation, for example, a tap operation, performed by the user on the split-screen browsing control 302, as shown in FIG. 4A, the mobile phone may alternatively display, in response to the operation, content corresponding to two applications in an up-down direction, that is, the display interface of the mobile phone may include an upper display area and a lower display area, the upper display area can display the content corresponding to the picture application, and the lower display area can display the content corresponding to the social application.

Figure 3C:
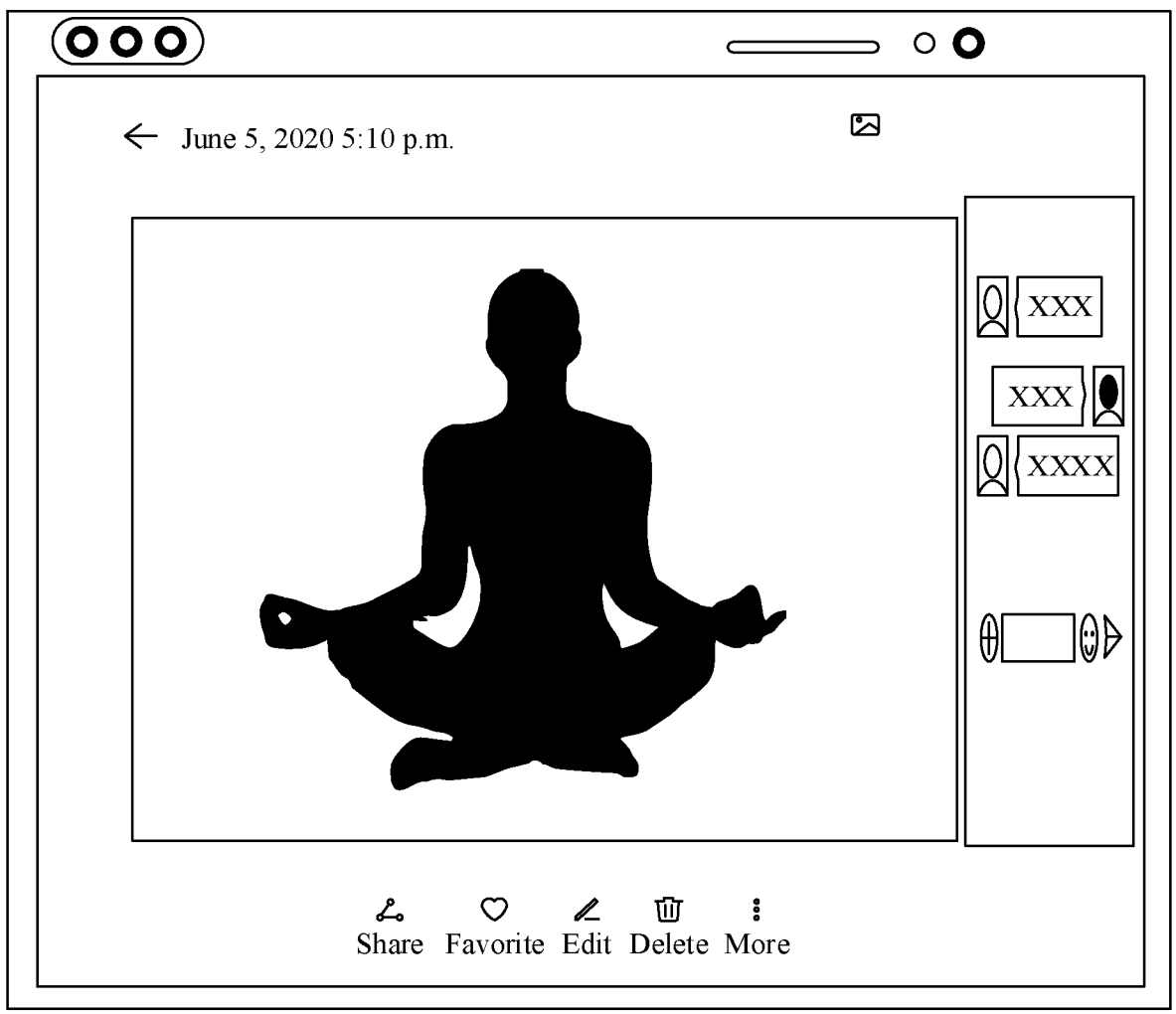
Figure 4B:
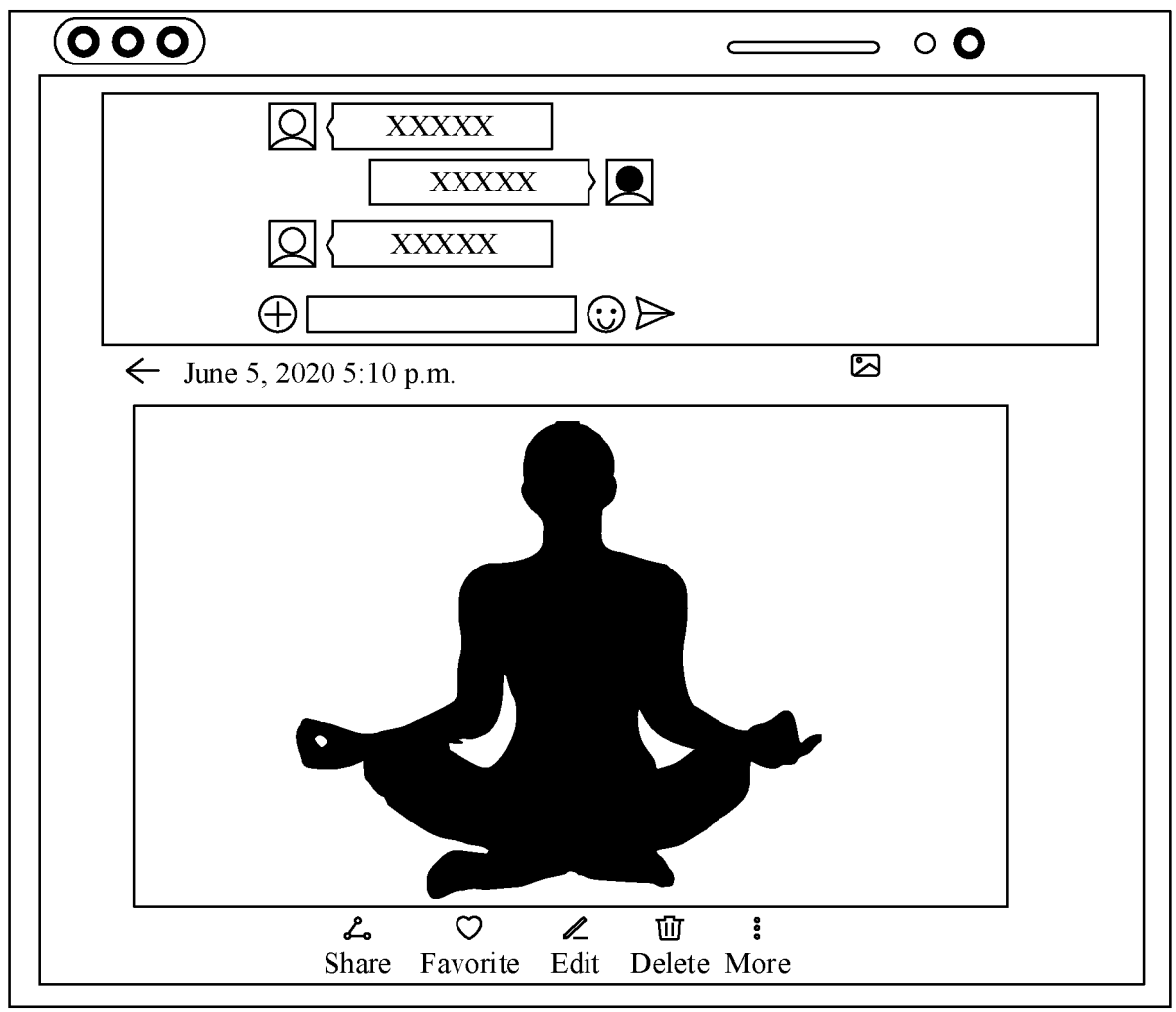

When the mobile phone receives a trigger operation, for example, a tap operation, performed by the user on the side pulling control 303, as shown in FIG. 3C, the display interface of the mobile phone may display, in response to the operation, the content corresponding to the picture application, the content corresponding to the social application may be displayed in a small floating window, and the user can drag the floating window to a left side or a right side of the display interface of the mobile phone. When the mobile phone receives a trigger operation, for example, a tap operation, performed by the user on the side pulling control 303, as shown in FIG. 4B, the display interface of the mobile phone may display, in response to the operation, the content corresponding to the picture application, the content corresponding to the social application may be displayed in a small floating window, and the user can drag the floating window to an upper side or a lower side of the display interface of the mobile phone.

Figure 3D:
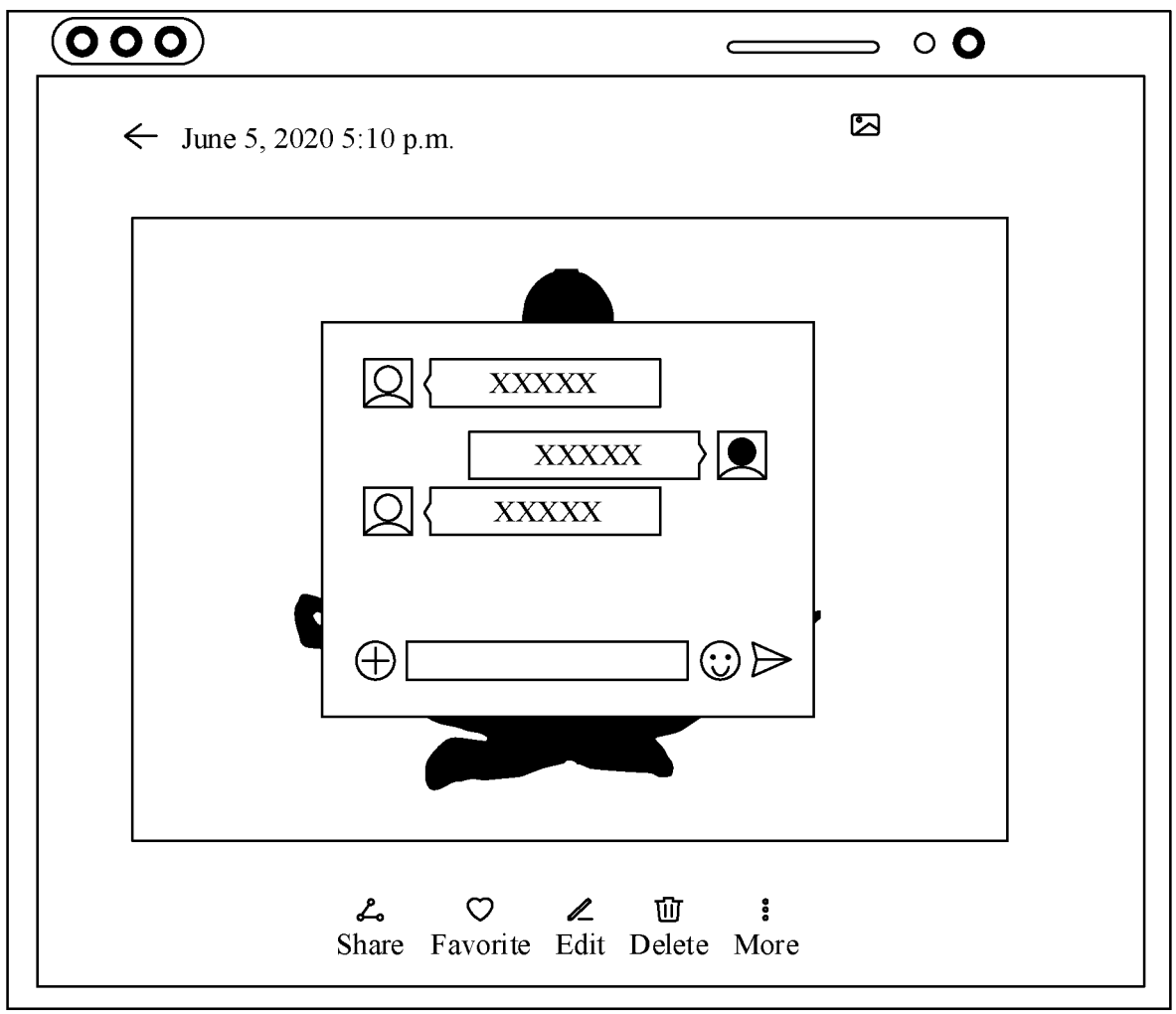

When the mobile phone receives a trigger operation, for example, a tap operation, performed by the user on the middle window control 304, as shown in FIG. 3D, the display interface of the mobile phone may display, in response to the operation, the content corresponding to the picture application, and the content corresponding to the social application may be displayed in a middle window in the display interface.

The user may alternatively enable a plurality of applications in the mobile phone simultaneously. For example, the user may simultaneously enable three applications in the mobile phone, so that the mobile phone can display content corresponding to the three applications on a same display interface, where the display mode may be referred to as a smart multi-window mode. For example, the mobile phone may display content corresponding to two applications in the split-screen browsing mode, and display content corresponding to a third application in the middle window mode (which may also be referred to as a floating window).

Figure 5:
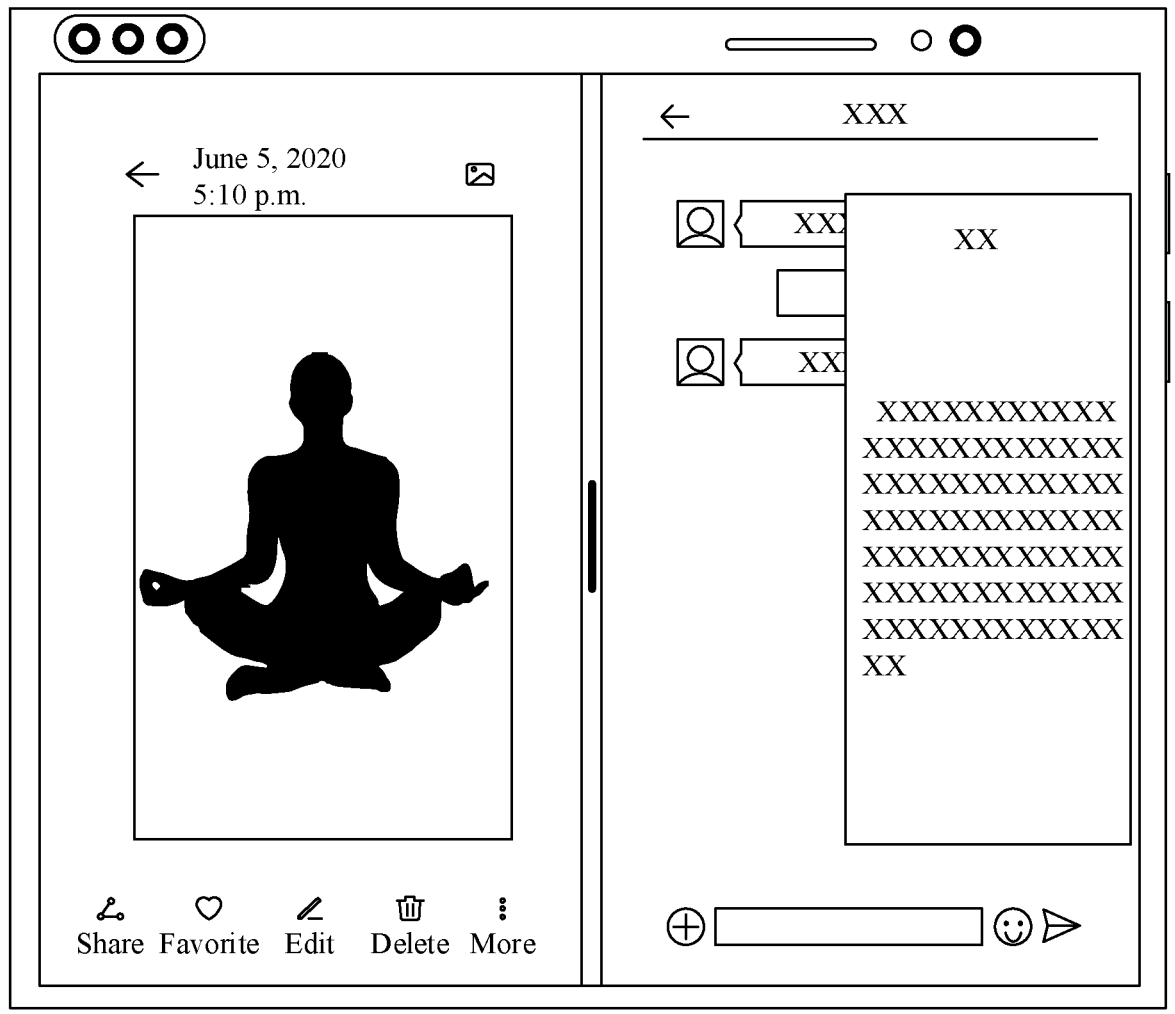
FIG. 5 is a schematic diagram 5 of a split-screen display interface of an electronic device according to an embodiment of this application.

For example, the user may enable a picture application in the mobile phone, so that a specific picture in the picture application can be edited, a specific social application in the mobile phone receives a message, and the user needs to read a specific article in a reading application. In other words, the user needs the mobile phone to simultaneously display content corresponding to the three applications. In this case, the user may trigger the smart multi-window mode in the mobile phone, so that the mobile phone can simultaneously display the content corresponding to the picture application, the social application, and the reading application. When the mobile phone receives a trigger operation, for example, a tap operation, performed by the user on the smart multi-window mode, as shown in FIG. 5, in response to the operation, the display interface (a display interface corresponding to an inner screen) of the mobile phone may include a left display area and a right display area, the left display area can display the content corresponding to the picture application, and the right display area can display the content corresponding to the social application. In addition, the display interface of the mobile phone can display a floating window, and the floating window can display the content corresponding to the reading application.

It can be learned that, in the conventional technology, a user needs to perform many operations when the user needs to use an electronic device to perform split-screen display, so that the electronic device can complete split-screen display, which brings use inconvenience to the user and results in poor user experience.

For the foregoing problems, embodiments of this application provide a display method, applied to an electronic device. In the method, when the electronic device displays a first application, the electronic device can automatically display, based on a use condition of a user, an identifier of a second application on which split-screen display can be performed together with the first application, and the user does not need to trigger the electronic device to display the identifier of the second application on which split-screen display can be performed together with the first application, thereby reducing operations performed when the user uses the electronic device to perform split-screen display, and improving split-screen display efficiency of the electronic device.

The following describes the display method provided in the embodiments of this application.

The display method provided in the embodiments of this application may be applied to an electronic device. In some examples, the electronic device may be an electronic device having a display, for example, a mobile phone, a tablet computer, a handheld computer, a personal computer (personal computer, PC), a cellular phone, or a personal digital assistant (personal digital assistant, PDA). In some examples, when the electronic device is a mobile phone, the electronic device may be a mobile phone having a foldable screen. A specific form of the electronic device is not limited in the embodiments of this application.

Figure 6:
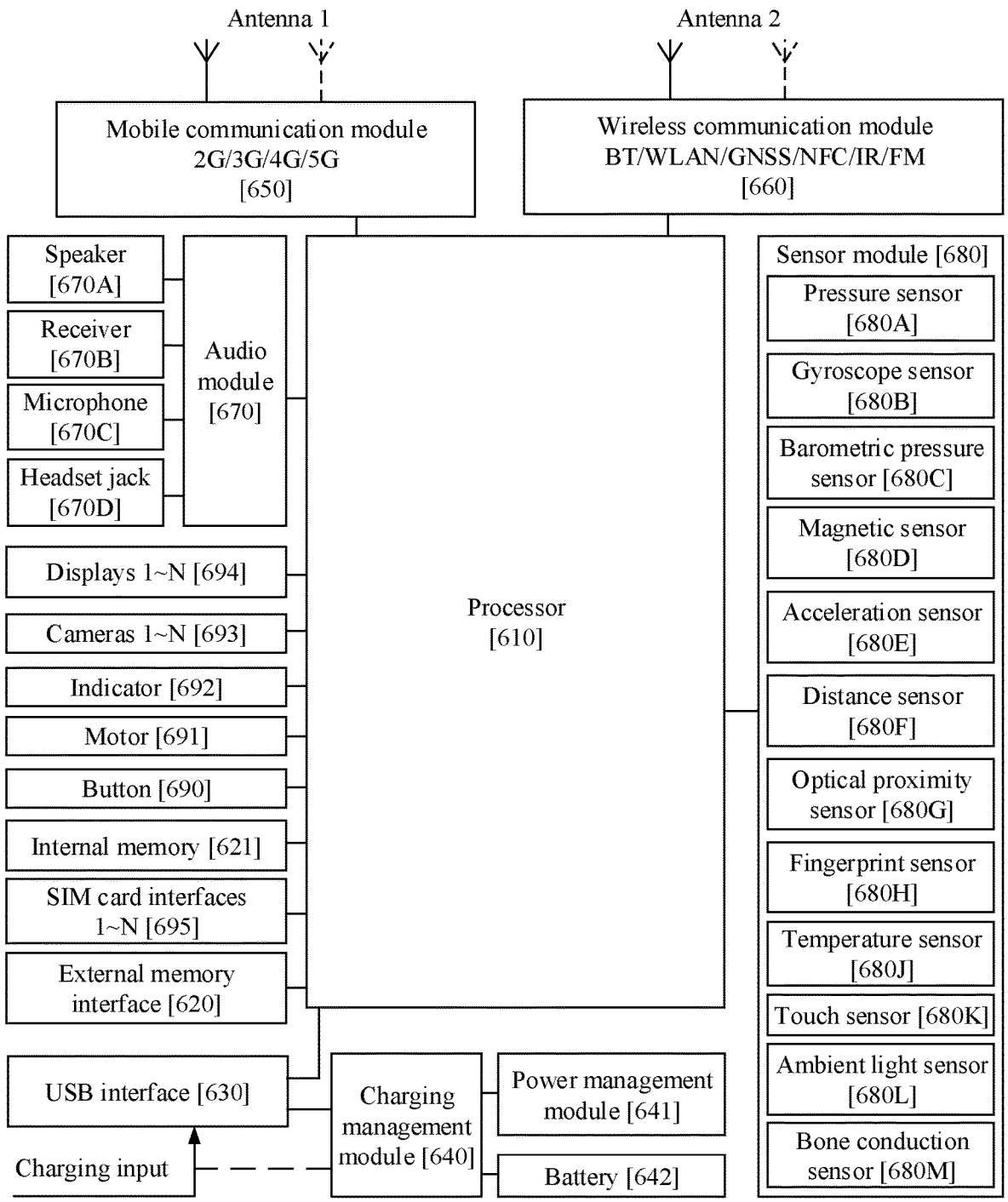
FIG. 6 is a schematic diagram of a hardware structure of an electronic device according to an embodiment of this application.

For example, the electronic device is a mobile phone. FIG. 6 is a schematic diagram of a structure of an electronic device according to an embodiment of this application.

As shown in FIG. 6, the electronic device may include a processor 610, an external memory interface 620, an internal memory 621, a universal serial bus (universal serial bus, USB) interface 630, a charging management module 640, a power management module 641, a battery 642, an antenna 1, an antenna 2, a mobile communication module 650, a wireless communication module 660, an audio module 670, a speaker 670A, a receiver 670B, a microphone 670C, a headset jack 670D, a sensor module 680, a button 690, a motor 691, an indicator 692, a camera 693, a display 694, a subscriber identification module (subscriber identification module, SIM) card interface 695, and the like. The sensor module 680 may include a pressure sensor 680A, a gyroscope sensor 680B, a barometric pressure sensor 680C, a magnetic sensor 680D, an acceleration sensor 680E, a distance sensor 680F, an optical proximity sensor 680G, a fingerprint sensor 680H, a temperature sensor 680J, a touch sensor 680K, an ambient light sensor 680L, a bone conduction sensor 680M, and the like.

It may be understood that the schematic structure in this embodiment does not constitute a specific limitation on the electronic device. In some other embodiments, the electronic device may include more or fewer components than those shown in the figure, combine some components, split some components, or have different component arrangements. The components shown in the figure may be implemented by hardware, software, or a combination of software and hardware.

The processor 610 may include one or more processing units. For example, the processor 610 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent devices or may be integrated into one or more processors.

The controller may be a nerve center and a command center of the electronic device. The controller may generate an operation control signal based on instruction operation code and a sequence signal, to complete control of instruction fetching and instruction execution.

A memory may be further disposed in the processor 610, and is configured to store instructions and data. In some embodiments, the memory in the processor 610 is a cache. The memory can store instructions or data just used or cyclically used by the processor 610. If the processor 610 needs to use the instructions or the data again, the processor 610 may directly invoke the instructions or the data from the memory. This avoids repeated access and reduces a waiting time of the processor 610, thereby improving efficiency of a system.

In some embodiments, the processor 610 may include one or more interfaces. The interfaces may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

A wireless communication function of the electronic device may be implemented by using the antenna 1, the antenna 2, the mobile communication module 650, the wireless communication module 660, the modem processor, the baseband processor, and the like.

The antenna 1 and the antenna 2 are configured to transmit and receive electromagnetic wave signals. Each antenna in the electronic device may be configured to cover one or more communication frequency bands. Different antennas may be further multiplexed to improve antenna utilization. For example, the antenna 1 may be multiplexed as a diversity antenna in a wireless local area network. In some other embodiments, the antenna may be used in combination with a tuning switch.

The mobile communication module 650 may provide a wireless communication solution applied to the electronic device, including 2G/3G/4G/5G. The mobile communication module 650 may include at least one filter, a switch, a power amplifier, a low noise amplifier (low noise amplifier, LNA), and the like. The mobile communication module 650 may receive an electromagnetic wave by using the antenna 1, perform processing such as filtering and amplification on the received electromagnetic wave, and transmit a processed electromagnetic wave to the modem processor for demodulation. The mobile communication module 650 may further amplify a signal modulated by the modem processor, and convert the signal into an electromagnetic wave by using the antenna 1 for radiation. In some embodiments, at least some functional modules of the mobile communication module 650 may be disposed in the processor 610. In some embodiments, at least some functional modules of the mobile communication module 650 may be disposed in a same device as at least some modules of the processor 610.

The wireless communication module 660 may provide a wireless communication solution applied to the electronic device, including a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), or infrared (infrared, IR). The wireless communication module 660 may be one or more devices integrating at least one communication processing module. The wireless communication module 660 receives an electromagnetic wave by using the antenna 2, performs frequency modulation and filtering processing on an electromagnetic wave signal, and sends a processed signal to the processor 610. The wireless communication module 660 may further receive a to-be-sent signal from the processor 610, perform frequency modulation and amplification on the signal, and convert the signal into an electromagnetic wave by using the antenna 2 for radiation.

In some embodiments, the antenna 1 and the mobile communication module 650 of the electronic device are coupled, and the antenna 2 and the wireless communication module 560 are coupled, so that the electronic device can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, an IR technology, and/or the like. The GNSS may include a global positioning system (global positioning system, GPS), a global navigation satellite system (global navigation satellite system, GLONASS), a beidou navigation satellite system (beidou navigation satellite system, BDS), a quasi-zenith satellite system (quasi-zenith satellite system, QZSS), and/or a satellite based augmentation system (satellite based augmentation systems, SBAS).

The electronic device implements a display function by using the GPU, the display 694, the application processor, and the like. The GPU is a microprocessor for image processing, and is connected to the display 694 and the application processor. The GPU is configured to perform mathematical and geometrical calculation, and is configured to render graphics. The processor 610 may include one or more GPUs, and the one or more GPUs execute program instructions to generate or change display information.

The display 694 is configured to display an image, a video, or the like. The display 694 includes a display panel. The display panel may be a liquid crystal display (liquid crystal display, LCD), an organic light-emitting diode (organic light-emitting diode, OLED), an active-matrix organic light emitting diode or active-matrix organic light emitting diode (active-matrix organic light emitting diode, AMO-LED), a flex light-emitting diode (flex light-emitting diode, FLED), a Miniled, a MicroLed, a Micro-oLed, a quantum dot light emitting diode (quantum dot light emitting diodes, QLED), or the like. In some embodiments, the electronic device may include one or N displays 694, where N is a positive integer greater than 1.

The electronic device may implement a shooting function by using the ISP, the camera 693, the video codec, the GPU, the display 694, the application processor, and the like. In some embodiments, the electronic device may include one or N cameras 693, where N is a positive integer greater than 1.

The internal memory 621 may be configured to store computer-executable program code, and the executable program code includes instructions. The processor 610 executes various functional applications and data processing of the electronic device by running the instructions stored in the internal memory 621. The internal memory 621 may include a program storage area and a data storage area. The program storage area may store an operating system, an application required by at least one function (for example, a sound playback function or an image playback function), and the like. The data storage area may store data (for example, audio data or a phone book) created in a use process of the electronic device. In addition, the internal memory 621 may include a high-speed random access memory, and may further include a non-volatile memory, for example, at least one magnetic disk storage device, a flash memory device, or a universal flash storage (universal flash storage, UFS).

The acceleration sensor 680E may periodically collect acceleration data of the electronic device at a specific frequency. For example, acceleration of the electronic device in various directions (which are usually an X-axis direction, a Y-axis direction, and a Z-axis direction) may be collected.

Certainly, it may be understood that FIG. 6 merely shows an example for description when a form of the electronic device is a mobile phone. If the electronic device is in another device form, for example, is a tablet computer, a handheld computer, a PC, or a PDA, the structure of the electronic device may include fewer structures than those shown in FIG. 6 or may include more structures than those shown in FIG. 6. This is not limited herein. In some examples, when the electronic device is a mobile phone, the electronic device may be a mobile phone having a foldable screen. There may be two types of foldable-screen mobile phones. One type of foldable-screen mobile phone has a foldable screen that is folded outward (outward foldable screen for short), and the other type of foldable-screen mobile phone has a foldable screen that is folded inward (inward foldable screen for short). For example, the inward foldable screen can be folded to be divided into an outer screen and an inner screen. When the inward foldable screen is in a folded state, only the outer screen displays content. When the inward foldable screen is in a fully unfolded state, the inner screen displays content, and the outer screen is in a screen-off state. It may be understood that the foldable screen may be folded in an up-down direction or a left-right direction. This is not limited in this embodiment of this application. Herein, inward folding is merely used as an example for description.

In the following embodiments of this application, that a screen of the electronic device is a foldable screen, that is, that the electronic device is a foldable-screen mobile phone, is used as an example for description. It may be understood that the display method provided in the embodiments of this application may also be applied to a normal mobile phone, namely, a normal bar-type mobile phone.

Methods in the following embodiments may all be implemented in an electronic device having the foregoing hardware structure.

It may be understood that a function of the electronic device usually needs to be implemented based on both support of hardware and cooperation of a software module.

Figure 7:
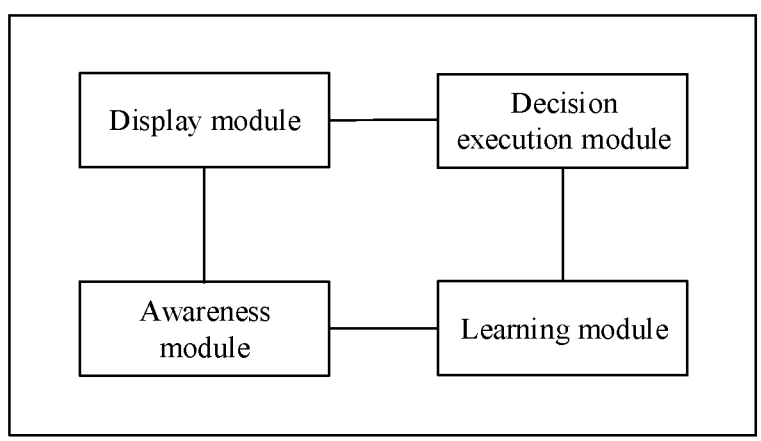
FIG. 7 is a schematic diagram of a structure of an electronic device according to an embodiment of this application.

For example, with reference to FIG. 7, the software module of the electronic device may include a display module, an awareness module, a learning module, a decision execution module, and the like.

The display module may be configured to perform split-screen display on content corresponding to a plurality of applications. The display module may be further configured to display, based on a message sent by the decision execution module, identifiers of the plurality of applications on which split-screen display can be performed.

The awareness module may be configured to obtain awareness of a user, device awareness of the electronic device, and awareness of an environment in which the electronic device is located. In other words, the awareness module of the electronic module can obtain all status information that needs to be obtained. For example, the awareness module obtains a quantity of times the user uses the electronic device to enable or switch an application. The awareness module obtains a status of the electronic device (namely, a status of the user) that exists when the electronic device performs split-screen display on the plurality of applications, for example, obtains a location status of the electronic device. For example, the awareness module determines whether the user is at home, in a company, driving, on a subway, on an airplane, on a high-speed train, in an elevator, in a restaurant, or the like. The awareness module obtains a motion status of the electronic device (namely, a status of the user) that exists when the electronic device performs split-screen display on the plurality of applications. For example, the awareness module determines whether the user is walking, running, riding, or the like. The awareness module obtains a device status of the electronic device that exists when the electronic device performs split-screen display on the plurality of applications. For example, the awareness module determines that a foldable screen of the electronic device is folded, the electronic device is connected to a Bluetooth headset, the electronic device is connected to a loudspeaker box or the electronic device is connected to devices such as in-vehicle Bluetooth, the electronic device is connected to Wi-Fi or NFC, or the like. The awareness module obtains statuses of the applications that exist when the electronic device performs split-screen display on the plurality of applications. For example, the awareness module determines duration in which the electronic device performs split-screen display on the plurality of applications, a location relationship that is between the plurality of applications (for example, a left-right location relationship or an up-down location relationship) and that exists when the electronic device performs split-screen display on the plurality of applications, types of the applications, order statuses of the applications, or the like.

For example, the awareness module may obtain a quantity of switching times between a second application and a first application within a first preset time period. The awareness module may further obtain an enable time of each of the second application and the first application within a second preset time period. The awareness module may further obtain historical split-screen information of the first application. The awareness module may further obtain current status information of the electronic device.

The learning module may be configured to draw a portrait for the user, learn a habit presented when the user uses the electronic device to perform split-screen display on the plurality of applications, or the like. In other words, the learning module may learn an attribute, a behavior, and a habit of the user using the electronic device, to provide individualized experience based on a service. For example, drawing a portrait for the user may include: determining whether the user using the electronic device is an office worker, a gender (male/female), a business trip condition, a commuting time, a sleep time, or the like. Habits presented when the user uses the electronic device to perform split-screen display on the plurality of applications may include: an application that the user is used to using the electronic device to perform split-screen display, use duration in which the user uses the electronic device to perform split-screen display on the plurality of applications, the location relationship that is between the plurality of applications and that exists when the user uses the electronic device to perform split-screen display on the plurality of applications (for example, an application A is on a left side of a screen of the electronic device, and an application B is on a right side of the screen of the electronic device), a trigger opportunity for the user to use the electronic device to perform split-screen display on the plurality of applications (for example, the electronic device is connected to a Bluetooth device, the electronic device is on a subway or in a car, or the foldable screen of the electronic device is unfolded).

For example, the learning module may further store the quantity of switching times between the second application and the first application within the first preset time period. The learning module may further store the enable time of each of the second application and the first application within the second preset time period. The learning module may further store the historical split-screen information of the first application. The learning module may further perform training based on historical split-screen information of an application pair on which split-screen display was performed by the electronic device, to obtain a split-screen prediction model.

The decision execution module may perform comprehensive determining based on content of the awareness module and the learning module, to provide corresponding execution/recommendation.

To be specific, the decision execution module can predict, based on information obtained by the awareness module and a result obtained after the learning module learns the attribute, the behavior, and the habit of the user using the electronic device, the plurality of applications on which split-screen display can be performed by the electronic device, and send, to the display module, the plurality of predicted applications on which split-screen display can be performed by the electronic device, so that the display module can display the identifiers of the plurality of predicted applications on which split-screen display can be performed.

For example, the decision execution module may determine, based on the quantity of switching times that is between the second application and the first application within the first preset time period and that is stored in the learning module, whether the second application exists, where the second application is an application whose quantity of switching times with the first application within the first preset time period is greater than a threshold for the quantity of switching times.

The decision execution module may alternatively determine, based on the enable time that is of each of the second application and the first application within the second preset time period and that is stored in the learning module, whether the second application exists, where the second application is an application enabled before the first application within the second preset time period.

The decision execution module may alternatively determine, based on the historical split-screen information that is of the first application and that is stored in the learning module, whether the second application exists, where the second application is an application on which split-screen display was performed together with the first application.

The decision execution module may further determine, based on the split-screen prediction model stored in the learning module and the current status information that is of the electronic device and that is obtained by the awareness module, whether a first application pair exists, where the first application pair includes a plurality of applications on which split-screen display can be performed.

When the electronic device displays data corresponding to the first application, the electronic device may automatically display, based on a switching condition between the plurality of applications in the electronic device (for example, a quantity of switching times between applications), an enable sequence of the plurality of applications, historical split-screen information of the plurality of applications in the electronic device (for example, information such as the time, the location, or the device status of the electronic device that exists when the electronic device performs split-screen display on the plurality of applications), or the current status information of the electronic device (for example, information such as a current time of the electronic device, a current location of the electronic device, a current device status of the electronic device, or a current speed of the electronic device that exists when the electronic device displays the data corresponding to the first application), an identifier of the second application on which split-screen display can be performed together with the first application, thereby reducing operations performed when the user uses the electronic device to perform split-screen display, and improving split-screen display efficiency of the electronic device.

For example, in some examples, when the electronic device displays the data corresponding to the first application, the electronic device may automatically display, based on the quantity of switching times between the first application and the second application, the identifier of the second application on which split-screen display can be performed together with the first application, thereby reducing operations performed when the user uses the electronic device to perform split-screen display, and improving split-screen display efficiency of the electronic device.

Figure 8:
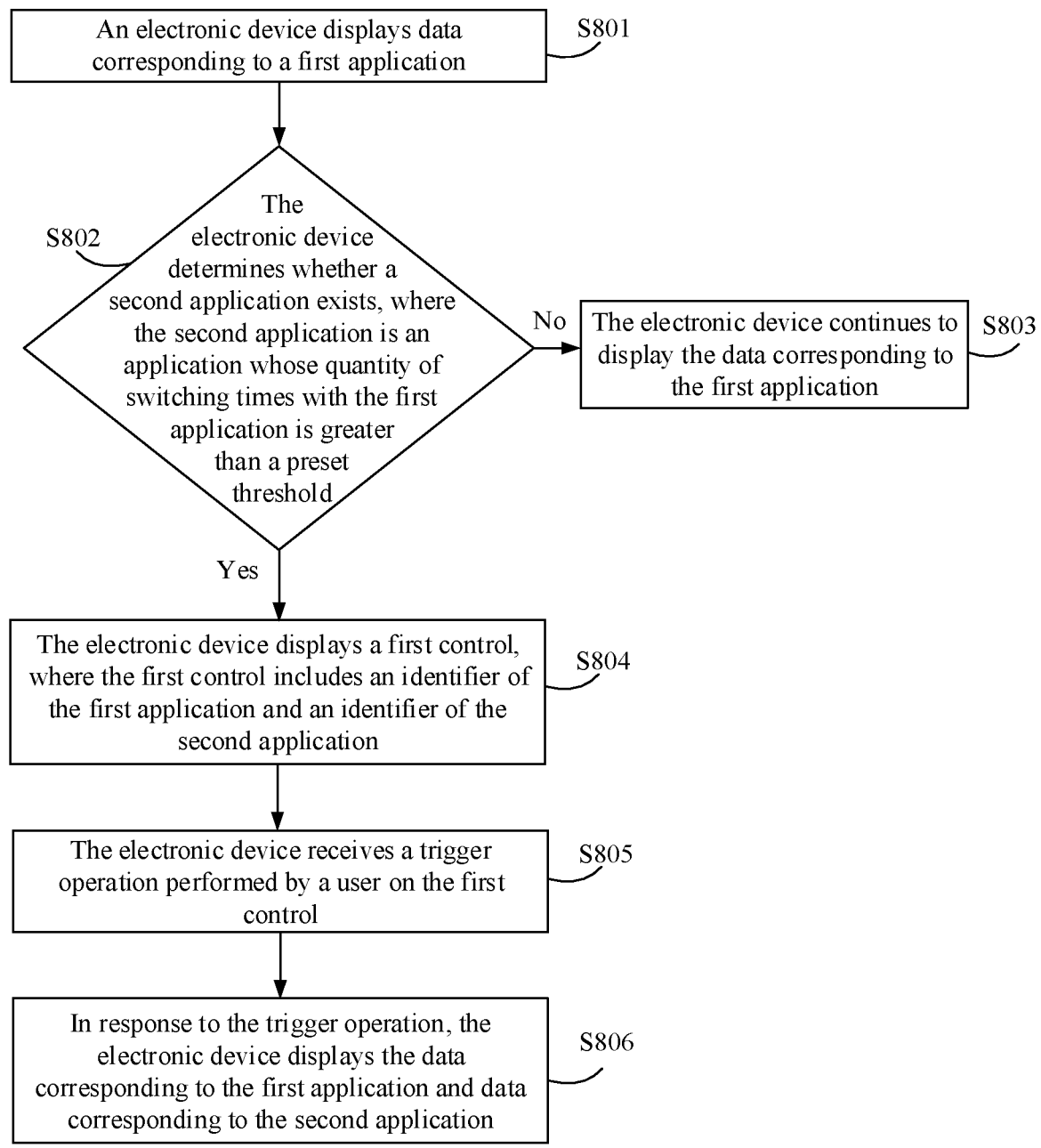
FIG. 8 is a schematic flowchart 1 of a display method according to an embodiment of this application.

As shown in FIG. 8, the display method provided in the embodiments of this application may include the following S801-S806.

S801: An electronic device displays data corresponding to a first application.

When a user needs to use an application (which may be referred to as a first application) in the electronic device, the user can trigger the electronic device to enable the first application. To be specific, when the electronic device receives a trigger operation, for example, a tap operation, performed by the user on an identifier of the first application, the electronic device may display an interface corresponding to the first application, that is, the electronic device may display the data corresponding to the first application or content corresponding to the first application.

For example, the first application is a picture application in a mobile phone. When the mobile phone receives a trigger operation, for example, a tap operation, performed by the user on an identifier of the picture application in the mobile phone, the mobile phone may display an interface corresponding to the picture application, that is, the mobile phone may display data corresponding to the picture application. With reference to FIG. 1C, when the mobile phone receives a selection operation, for example, a tap operation, performed by the user on a specific picture included in the picture application in the mobile phone, the mobile phone may display data corresponding to the picture.

In some examples, the first application may be an application on which split-screen display can be performed. In other words, the electronic device can simultaneously display the data corresponding to the first application and data corresponding to another application. For example, the first application may be a picture application, a social application, an office application, or the like. A specific type of the first application is not limited in this embodiment of this application.

For example, after the electronic device displays the data corresponding to the first application, the electronic device may determine whether the first application is an application on which split-screen display can be performed. When the electronic device determines that the first application is an application on which split-screen display can be performed, the electronic device may continue to perform the following solution, that is, the electronic device may automatically display an identifier of a second application, so that the user does not need to trigger the electronic device to display the identifier of the second application, thereby reducing operations performed when the user uses the electronic device to perform split-screen display. When the electronic device determines that the first application is an application on which split-screen display cannot be performed, the electronic device may continue to display the data corresponding to the first application, that is, the electronic device may continue to display the interface corresponding to the first application.

For example, with reference to FIG. 7, the display module in the electronic device may display the data corresponding to the first application.

S802: The electronic device determines whether a second application exists, where the second application is an application whose quantity of switching times with the first application within a first preset time period is greater than a threshold for the quantity of switching times.

After the electronic device displays the data corresponding to the first application, the electronic device may determine whether the second application exists in the electronic device. The second application may be an application whose quantity of switching times with the first application within the first preset time period is greater than the threshold for the quantity of switching times. The threshold for the quantity of switching times may be set based on an actual condition. This is not limited in this embodiment of this application. There may be one or more second applications. This is not limited in this application.

For example, the second application may be a picture application, a social application, an office application, or the like. A specific type of the second application is not limited in this embodiment of this application. The second application may be a same application as the first application, or the second application may be a different application from the first application. This is not limited in this embodiment of this application.

In some examples, the electronic device may determine, based on historical switching information stored in the electronic device, whether the second application exists in the electronic device. The historical switching information may include a plurality of application pairs, and a quantity of mutual switching times between a plurality of applications in each application pair within the first preset time period. The application pair may include two or more applications. The first preset time period may be set based on an actual condition. This is not limited in this embodiment of this application. For example, the application pair may include a learning and office application and a learning and office application, a learning and office application and a communication and social application, a communication and social application and an audio/video entertainment application, a photographing and beautifying application and a learning and office application, or a utility application and a learning and office application, or the application pair may include other types of applications. This is not limited in this embodiment of this application.

Figure 9A:
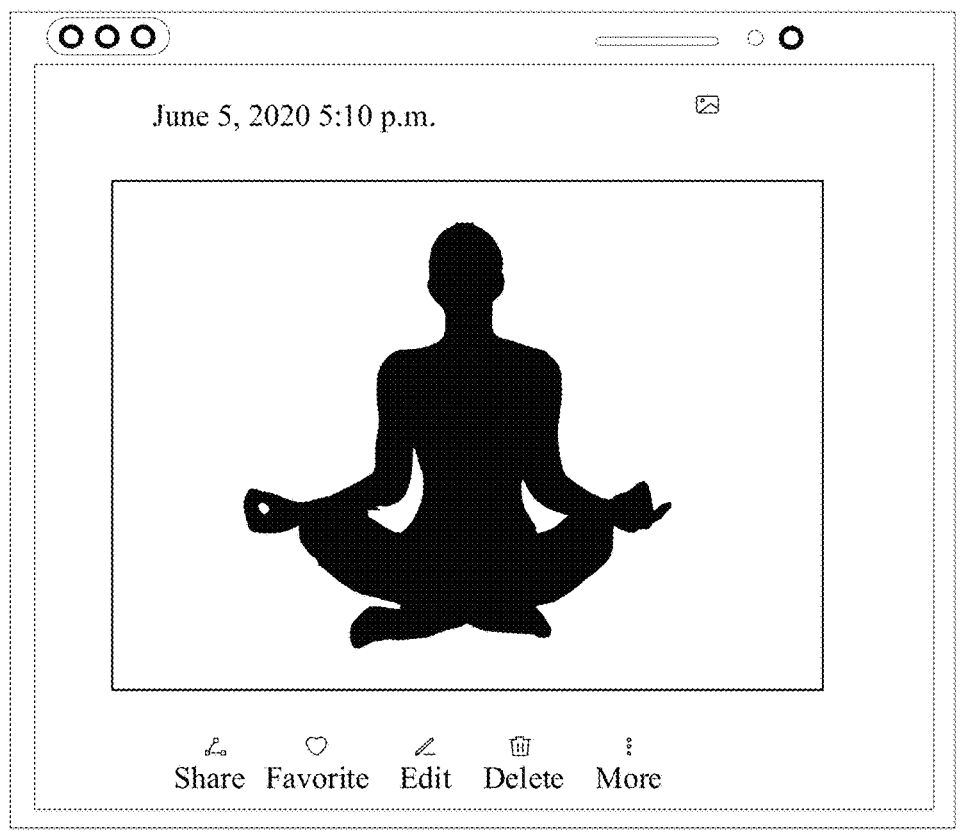
FIG. 9A, FIG. 9B, FIG. 9C, and FIG. 9D are a schematic diagram 6 of a split-screen display interface of an electronic device according to an embodiment of this application.
Figure 9B:
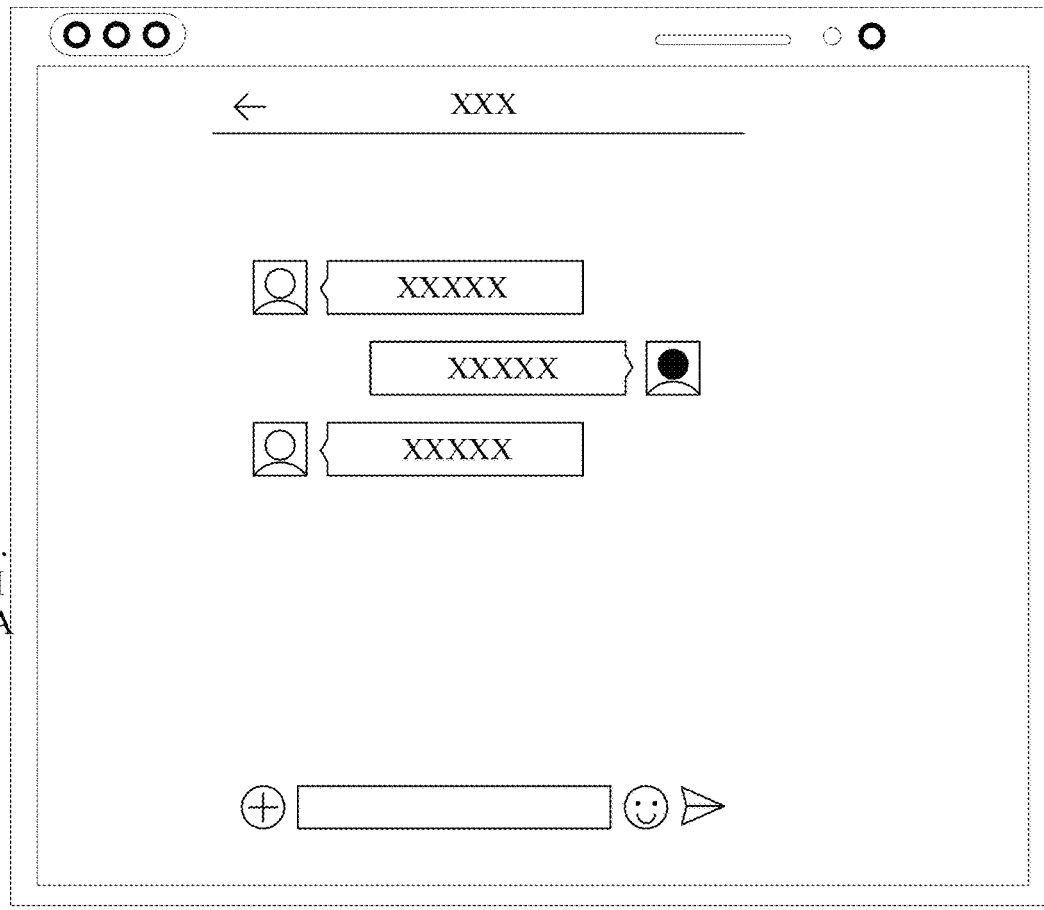

For example, the mobile phone is a mobile phone having an inward foldable screen, and the application pair includes identifiers of two applications. With reference to FIG. 9A, when the foldable screen of the mobile phone is in a fully unfolded state, the user can display an interface corresponding to a picture application by using the mobile phone. Then, the user may switch the mobile phone to a social application. In other words, as shown in FIG. 9B, the user may switch a display interface of the mobile phone to an interface corresponding to the social application. Then, the user may switch the mobile phone to the picture application. In other words, the user may switch the display interface of the mobile phone to the interface corresponding to the picture application. The mobile phone may determine that the picture application and the social application are one application pair, and the mobile phone may store historical switching information, namely, identifiers of the two applications (an identifier of the picture application and an identifier of the social application) included in the application pair, and a quantity of switching times between the picture application and the social application that are included in the application pair.

After the mobile phone displays data corresponding to the picture application (namely, the interface corresponding to the picture application), the picture application is the first application, and the mobile phone may determine, from the stored historical switching information, the application pair including the identifier of the picture application. For example, the application pair is referred to as a first application pair, and the first application pair includes the identifier of the picture application and the identifier of the social application. Then, the mobile phone determines whether a quantity of mutual switching times between the picture application and the social application that are included in the first application pair within the first preset time period is greater than the threshold for the quantity of switching times. When the mobile phone determines that the quantity of mutual switching times between the picture application and the social application that are included in the first application pair within the first preset time period is greater than the threshold for the quantity of switching times, the mobile phone may determine that the social application is the second application.

For another example, the mobile phone is still a mobile phone having an inward foldable screen, and the application pair includes identifiers of a plurality of applications, for example, identifiers of three applications. With reference to FIG. 9A, when the foldable screen of the mobile phone is in a fully unfolded state, the user can display an interface corresponding to a picture application by using the mobile phone. Then, the user may switch the mobile phone to a social application. In other words, as shown in FIG. 9B, the user may switch a display interface of the mobile phone to an interface corresponding to the social application. Then, the user may switch the mobile phone to a music application. In other words, the user may switch the display interface of the mobile phone to an interface corresponding to the music application. Then, the user may switch the display interface of the mobile phone to the interface corresponding to the picture application. Then, the user may switch the display interface of the mobile phone to the interface corresponding to the social application. The mobile phone may determine that the picture application, the social application, and the music application are one application pair, and the mobile phone may store historical switching information, namely, the application pair (an identifier of the picture application, an identifier of the social application, and an identifier of the music application), and a quantity of switching times among the picture application, the social application, and the music application that are included in the application pair.

After the mobile phone displays data corresponding to the picture application (namely, the interface corresponding to the picture application), the picture application is the first application, and the mobile phone may determine, from the stored historical switching information, the application pair including the identifier of the picture application. For example, the application pair is referred to as a first application pair, and the first application pair includes the identifier of the picture application, the identifier of the social application, and the identifier of the music application. Then, the mobile phone determines whether the quantity of switching times among the picture application, the social application, and the music application that are included in the first application pair is greater than the threshold for the quantity of switching times. After the mobile phone determines that a quantity of mutual switching times among the picture application, the social application, and the music application that are included in the application pair within the first preset time period is greater than the threshold for the quantity of switching times, the mobile phone may determine that the social application and the music application are second applications.

In some examples, the second application may be an application whose quantity of switching times with the first application is greater than the threshold for the quantity of switching times and on which split-screen display can be performed in the electronic device. In other words, the electronic device can simultaneously display data corresponding to the second application and data corresponding to another application (for example, the first application).

For example, after the electronic device determines the second application, the electronic device may determine whether the second application is an application on which split-screen display can be performed. When the electronic device determines that the second application is an application on which split-screen display can be performed, the electronic device may continue to perform the following solution, that is, the electronic device may automatically display an identifier of the second application, so that the user does not need to trigger the electronic device to display the identifier of the second application, thereby reducing operations performed when the user uses the electronic device to perform split-screen display. When the electronic device determines that the second application is an application on which split-screen display cannot be performed, the electronic device may continue to display the data corresponding to the first application, that is, the electronic device may continue to display the interface corresponding to the first application.

It should be noted that, when the user cannot use a split-screen mode of the electronic device or the user uses a new electronic device, and the electronic device does not store the historical switching information, the electronic device may guide, based on a scenario, a new user to try the split-screen mode of the electronic device. For example, the electronic device may prompt the user to first enable the first application and then enable the second application. Then, the electronic device may prompt the user to frequently switch between the first application and the second application within the first preset time period by using the electronic device, that is, the quantity of switching times may be greater than a preset threshold. Then, the electronic device may prompt the user that split-screen display can be performed on the first application and the second application, and may prompt the user to select a split-screen display manner, for example, an up-down split-screen manner or a left-right split-screen manner. After the user determines the split-screen display manner, the electronic device may store the historical switching information, namely, the application pair (including the identifier of the first application and the identifier of the second application), and a quantity of mutual switching times between the first application and the second application within the first preset time period. The historical switching information may further include the split-screen display manner of the first application and the second application.

Then, after the electronic device displays the first application, the electronic device may determine the second application based on the historical switching information, to automatically display the identifier of the second application on which split-screen display can be performed together with the first application. When the electronic device receives a trigger operation performed by the user to perform split-screen display on the second application, the electronic device may perform split-screen display on the data corresponding to the first application and the data corresponding to the second application in the split-screen display manner previously selected by the user.

For example, with reference to FIG. 7, the awareness module in the electronic device may determine the quantity of switching times between the second application and the first application within the first preset time period, the learning module may store the quantity of switching times between the second application and the first application within the first preset time period, and the decision execution module may determine, based on the quantity of switching times that is between the second application and the first application within the first preset time period and that is stored in the learning module, whether the second application exists, where the second application is an application whose quantity of switching times with the first application within the first preset time period is greater than the threshold for the quantity of switching times.

When the electronic device determines that no second application exists, the electronic device may continue to display the data corresponding to the first application, that is, the electronic device may continue to perform the following S803. When the electronic device determines that the second application exists, the electronic device may display the identifier of the second application, that is, the electronic device may continue to perform the following S804.

S803: The electronic device continues to display the data corresponding to the first application.

When the electronic device determines that no second application exists, that is, when the electronic device determines that an application whose quantity of switching times with the first application is greater than the threshold for the quantity of switching times does not exist in the electronic device, that is, when an application on which split-screen display can be performed together with the first application does not exist in the electronic device, the electronic device may continue to display the data corresponding to the first application.

For example, with reference to FIG. 7, the display module in the electronic device may continue to display the data corresponding to the first application.

S804: The electronic device displays a first control, where the first control includes an identifier of the first application and an identifier of the second application.

When the electronic device determines that the second application exists, that is, when the electronic device determines that an application whose quantity of switching times with the first application is greater than the threshold for the quantity of switching times exists in the electronic device, that is, when an application on which split-screen display can be performed together with the first application exists in the electronic device, the electronic device can display the second application, so that the user can determine whether to perform split-screen display on the data corresponding to the second application.

In some examples, the electronic device may display the first control, and the first control may include the identifier of the first application and the identifier of the second application, so that the user can trigger the first control. When the electronic device receives a trigger operation, for example, a tap operation, performed by the user on the first control, the electronic device may display the data corresponding to the first application and the data corresponding to the second application. The second application may refer to one application, or the second application may refer to a plurality of applications. When the second application refers to a plurality of applications, the electronic device may display identifiers of the plurality of applications, so that the user can select an application on which split-screen display needs to be performed.

For example, when the first application is a social application, and a quantity of switching times between each of a picture application, a music application, and an office application in the electronic device and the social application is greater than the threshold for the quantity of switching times, the second applications may be the picture application, the music application, and the office application. The electronic device may display an identifier of the picture application, an identifier of the music application, and an identifier of the office application, and the user selects the identifier of the picture application, the identifier of the music application, or the identifier of the office application, so that the electronic device can perform split-screen display on data corresponding to the social application and data corresponding to the picture application, data corresponding to the social application and data corresponding to the music application, or data corresponding to the social application and data corresponding to the office application.

In some examples, when the electronic device determines that the second application exists, the electronic device may display a split-screen application bar, which may also be referred to as a recommendation capsule. The split-screen application bar may include the identifier of the second application. The user selects, from the split-screen application bar, the identifier of the second application on which split-screen display needs to be performed.

Figure 9C:
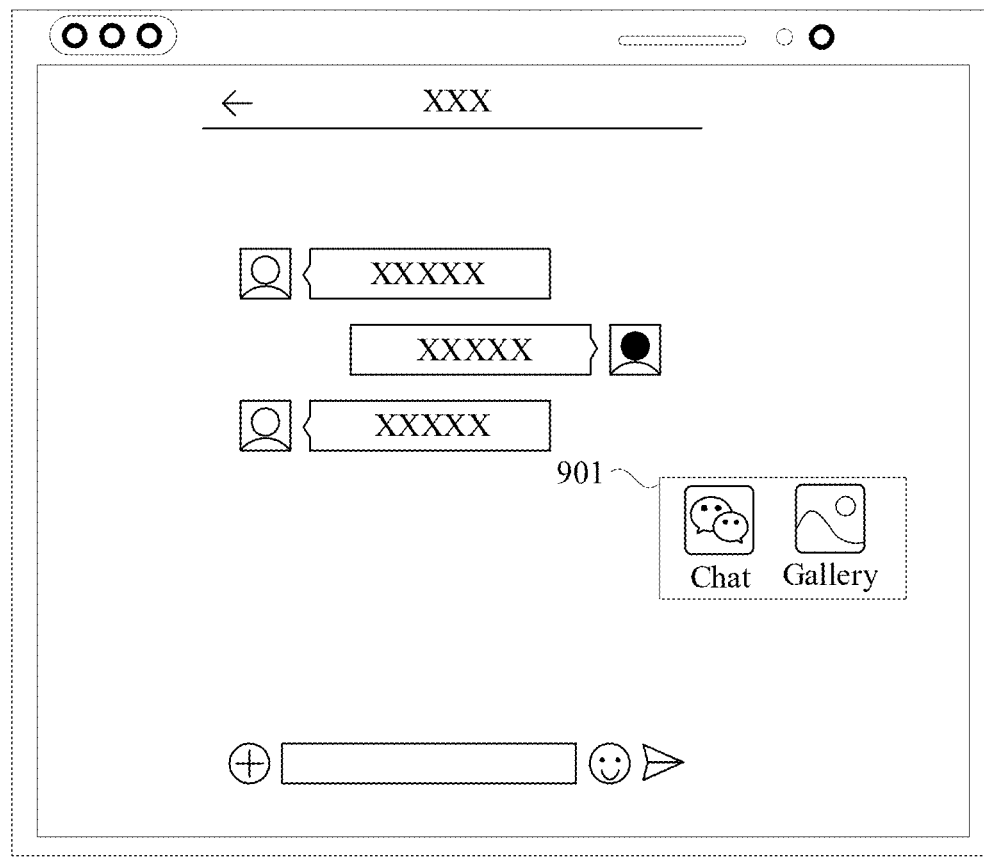

For example, with reference to FIG. 9A and FIG. 9B, after the user switches between a picture application and a social application in the mobile phone for a plurality of times, the mobile phone may use the picture application and the social application as one application pair, and the mobile phone may store historical switching information, namely, identifiers of the two applications included in the application pair (an identifier of the picture application and an identifier of the social application), and a quantity of switching times between the picture application and the social application that are included in the application pair. Then, when the user enables the social application (that is, the social application is the first application) by using the mobile phone, the mobile phone may determine whether the second application exists. When the mobile phone determines that a quantity of mutual switching times between the picture application and the social application within the first preset time period is greater than the threshold for the quantity of switching times, the mobile phone may determine that the picture application is the second application. That is, when the mobile phone determines that the second application exists, as shown in FIG. 9C, the mobile phone may display the split-screen application bar 901, namely, the first control, on an interface corresponding to the social application. The split-screen application bar 901 may include the identifier of the first application and the identifier of the second application, namely, the identifier of the social application and the identifier of the picture application, for example, an identifier of a gallery. In this case, the user can select, from the split-screen application bar 901, the identifiers of the first application and the second application on which split-screen display needs to be performed.

In some examples, when the electronic device includes a foldable screen, and before the electronic device displays the identifier of the second application, the electronic device may determine whether a status of the screen of the electronic device is an unfolded state. When the electronic device determines that the status of the screen of the electronic device is the unfolded state, the electronic device may display the identifier of the second application. For example, the electronic device may display the split-screen application bar, where the split-screen application bar may include the identifier of the second application.

When the electronic device determines that the status of the screen of the electronic device is not the unfolded state, that is, is a folded state, the electronic device may display a prompt window to prompt the user to use split-screen display when the status of the screen of the electronic device is the unfolded state. After the electronic device displays the prompt window, when the status of the screen of the electronic device is changed from the folded state to the unfolded state within a preset time period, the electronic device may display the identifier of the second application. For example, the electronic device may display the split-screen application bar, where the split-screen application bar may include the identifier of the second application.

For example, with reference to FIG. 7, the display module in the electronic device may display the identifier of the second application.

S805: The electronic device receives a trigger operation performed by the user on the first control.

After the electronic device displays the first control, the user may perform the trigger operation on the first control, to trigger the electronic device to perform split-screen display on content corresponding to the second application. In other words, the electronic device can simultaneously display content corresponding to the first application and the content corresponding to the second application on the screen (namely, a display interface).

For example, still with reference to FIG. 9C, the mobile phone may display the split-screen application bar 901 on the interface corresponding to the social application. The split-screen application bar 901 may include the identifier of the first application and the identifier of the second application, namely, the identifier of the social application and the identifier of the picture application. When the user needs to perform split-screen display on the content corresponding to the social application and the content corresponding to the picture application by using the mobile phone, the user may trigger the identifier of the social application and the identifier of the picture application in the split-screen application bar 901.

S806: In response to the trigger operation, the electronic device displays the data corresponding to the first application and the data corresponding to the second application.

When the electronic device receives a trigger operation, for example, a tap operation, performed by the user on the identifier of the second application, the electronic device may display, in response to the operation, the data corresponding to the first application and the data corresponding to the second application. For example, the electronic device may display the data corresponding to the first application and the data corresponding to the second application in a split-screen mode of the electronic device (for example, a split-screen browsing mode, a side pulling mode, or a middle window mode) or the like. In this embodiment of this application, that the electronic device performs split-screen display on the data corresponding to the first application and the data corresponding to the second application is used as an example for description. In other words, the electronic device may display the data corresponding to the first application and the data corresponding to the second application in the split-screen browsing mode.

Figure 9D:
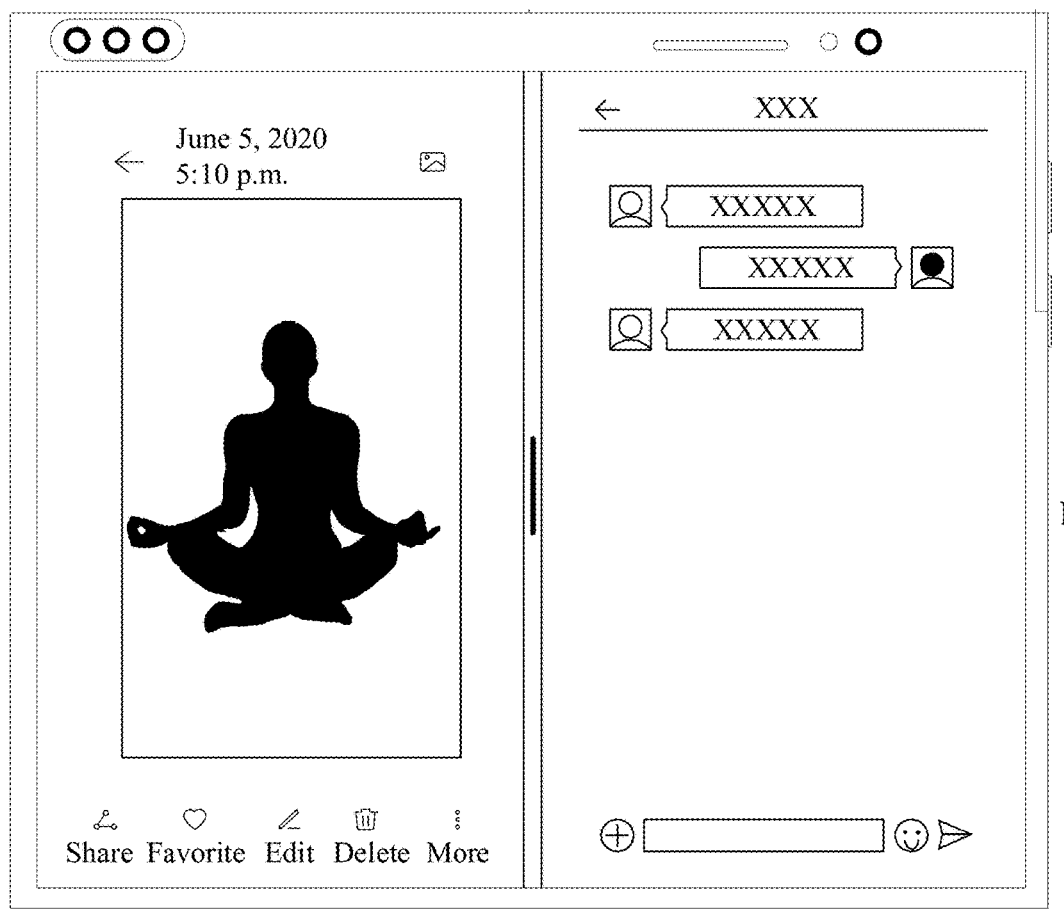

For example, still with reference to FIG. 9C, the mobile phone may display the split-screen application bar 901 on the interface corresponding to the social application. The split-screen application bar 901 may include the identifier of the first application and the identifier of the second application, namely, the identifier of the social application and the identifier of the picture application. When the user needs to perform split-screen display on the data corresponding to the social application and the data corresponding to the picture application by using the mobile phone, the user may trigger the split-screen application bar 901. To be specific, when the mobile phone receives a trigger operation, for example, a tap operation, performed by the user on the split-screen application bar 901, as shown in FIG. 9D, the mobile phone may perform, in response to the operation, split-screen display on the data corresponding to the picture application and the data corresponding to the social application. In other words, the mobile phone may perform split-screen display on the interface corresponding to the picture application and the interface corresponding to the social application.

For example, with reference to FIG. 7, the display module in the electronic device may display the data corresponding to the first application and the data corresponding to the second application.

By using the solution in this application, when the electronic device displays the data corresponding to the first application, the electronic device can automatically display the identifier of the second application based on the quantity of switching times between the first application and the second application, thereby reducing operations performed when the user triggers the electronic device to display an application on which split-screen display can be performed, reducing operations performed when the user uses the electronic device to perform split-screen display, and improving split-screen display efficiency of the electronic device.

For another example, in some examples, when the electronic device displays the data corresponding to the first application, the electronic device may automatically display, based on an enable sequence of the first application and the second application, the identifier of the second application on which split-screen display can be performed together with the first application, thereby reducing operations performed when the user uses the electronic device to perform split-screen display, and improving split-screen display efficiency of the electronic device.

Figure 10:
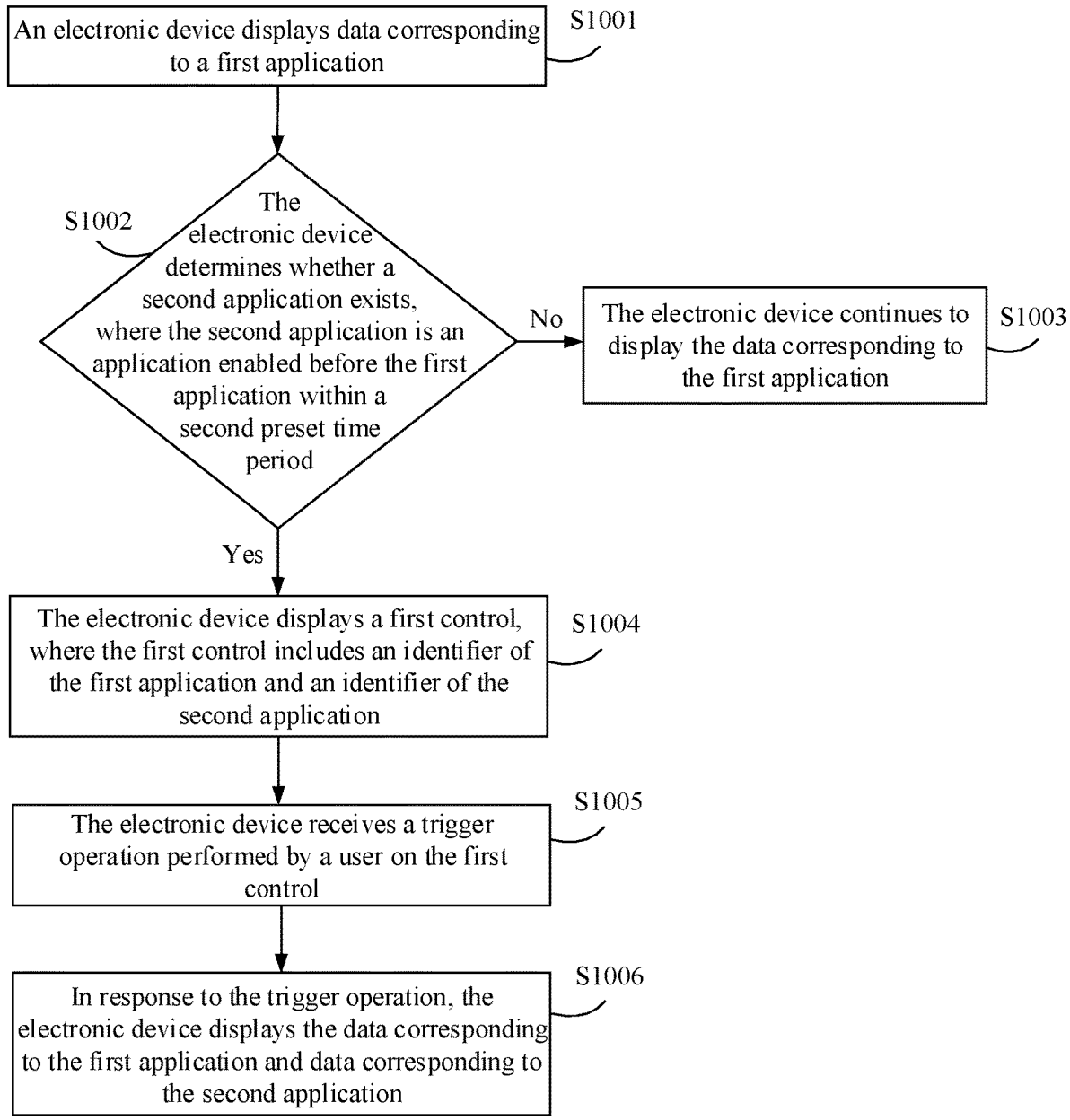
FIG. 10 is a schematic flowchart 2 of a display method according to an embodiment of this application.

As shown in FIG. 10, the display method provided in the embodiments of this application may include the following S1001-S1006.

S1001: An electronic device displays data corresponding to a first application.

For a specific implementation in which the electronic device displays the data corresponding to the first application, refer to the implementation in the foregoing S801. Details are not described in this embodiment of this application again.

S1002: The electronic device determines whether a second application exists, where the second application is an application enabled before the first application within a second preset time period.

After the electronic device displays the data corresponding to the first application, the electronic device may determine whether the second application exists in the electronic device. The second application may be an application enabled before the first application within the second preset time period. The second preset time period may be set based on an actual condition. This is not limited in this embodiment of this application. There may be one or more second applications. This is not limited in this application. For example, the second application may be a picture application, a social application, an office application, or the like. A specific type of the second application is not limited in this embodiment of this application. The second application may be a same application as the first application, or the second application may be a different application from the first application. This is not limited in this embodiment of this application.

In some examples, the electronic device may determine, based on historical switching information stored in the electronic device, whether the second application exists in the electronic device. The historical switching information may include a plurality of application pairs, and an enable sequence of a plurality of applications in each application pair within the second preset time period. The application pair may include identifiers of two or more applications. For example, the application pair may include a learning and office application and a learning and office application, a learning and office application and a communication and social application, a communication and social application and an audio/video entertainment application, a photographing and beautifying application and a learning and office application, or a utility application and a learning and office application, or the application pair may include other types of applications. This is not limited in this embodiment of this application.

Figure 11A:
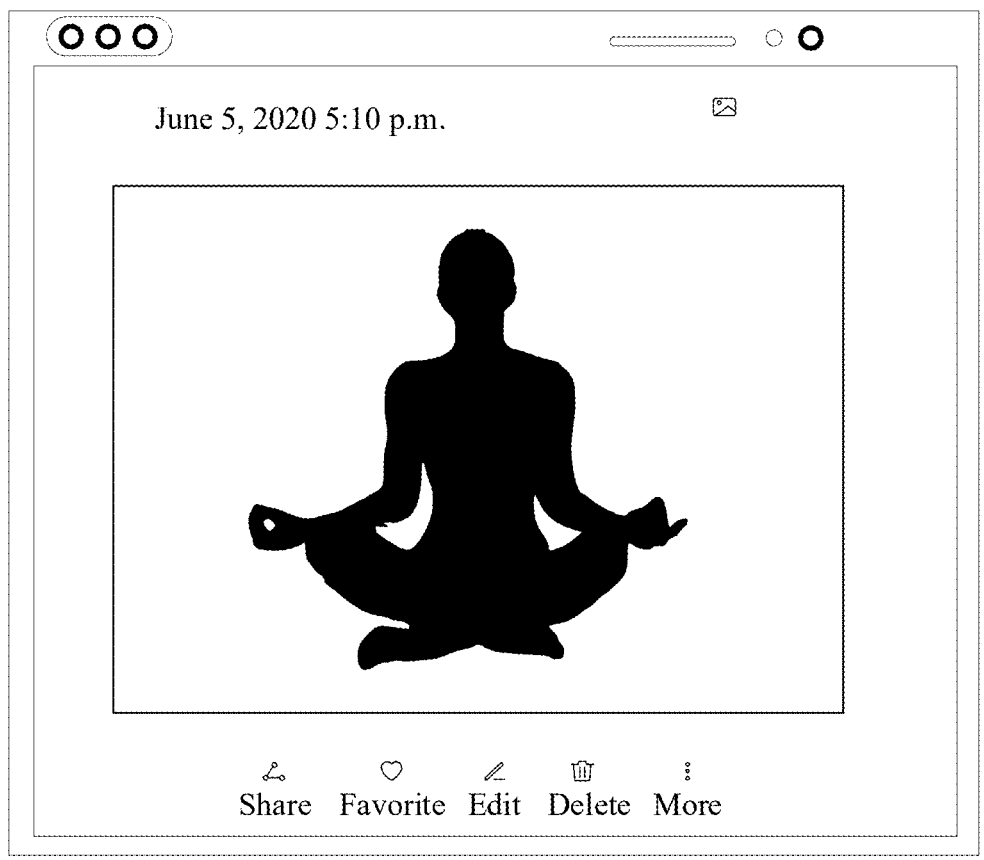
FIG. 11A, FIG. 11B, FIG. 11C, and FIG. 11D are a schematic diagram 7 of a split-screen display interface of an electronic device according to an embodiment of this application.
Figure 11B:
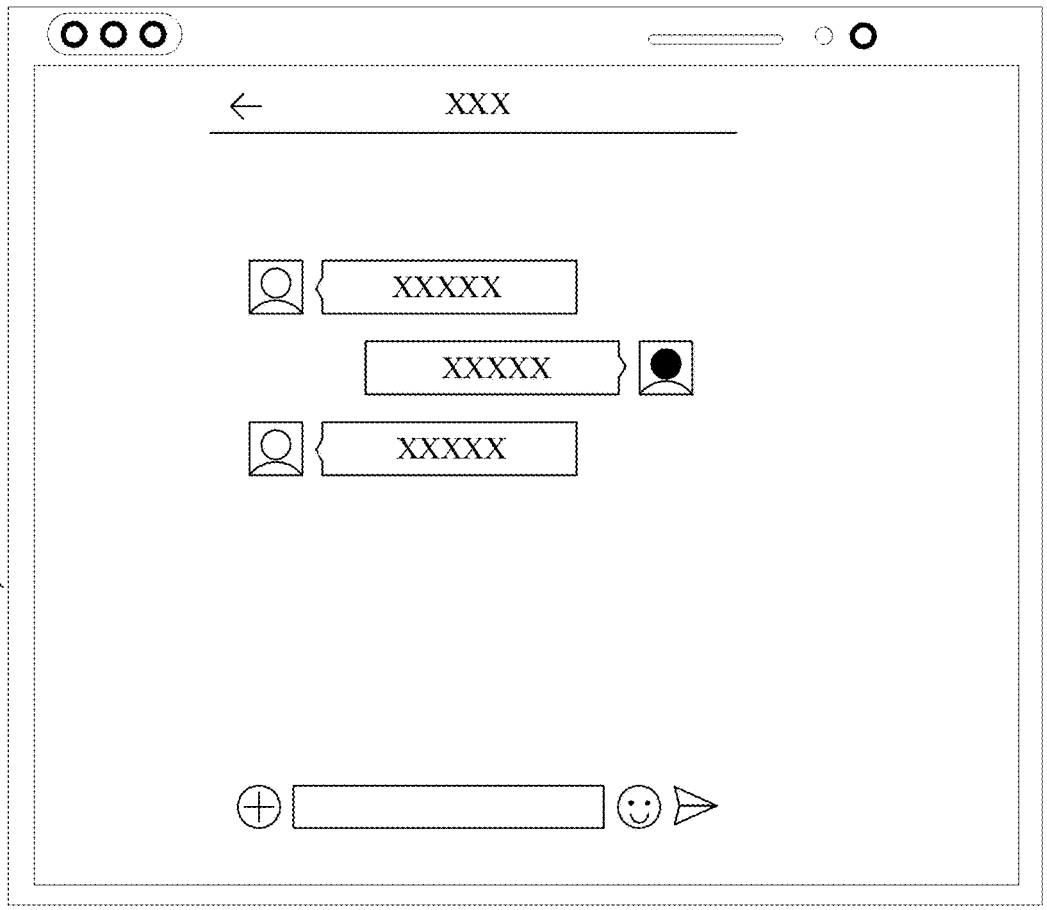

For example, the mobile phone is a mobile phone having an inward foldable screen, and the application pair includes identifiers of two applications. With reference to FIG. 11A, when the foldable screen of the mobile phone is in a fully unfolded state, a user can display an interface corresponding to a picture application by using the mobile phone. Then, the user may switch the mobile phone to a social application within the second preset time period. In other words, as shown in FIG. 11B, the user may switch a display interface of the mobile phone to an interface corresponding to the social application. The mobile phone may determine that the picture application and the social application are one application pair, and the mobile phone may store historical switching information, namely, identifiers of the two applications (an identifier of the picture application and an identifier of the social application) included in the application pair, and an enable sequence of the picture application and the social application that are included in the application pair within the second preset time period, that is, the picture application is enabled before the social application within the second preset time period.

After the mobile phone displays data corresponding to the social application (namely, the interface corresponding to the social application), the social application is the first application, and the mobile phone may determine, from the stored historical switching information, the application pair including the identifier of the social application. For example, the application pair is referred to as a second application pair, where the second application pair includes the identifier of the picture application and the identifier of the social application, and the enable sequence of the picture application and the social application within the second preset time period, that is, the picture application is enabled before the social application within the second preset time period. Then, the mobile phone may determine, based on the second application pair, that the picture application is the second application.

In some examples, the second application may be an application that is enabled before the first application within the second preset time period and on which split-screen display can be performed. In other words, the electronic device can simultaneously display data corresponding to the second application and data corresponding to another application (for example, the first application).

For example, after the electronic device determines the second application, the electronic device may determine whether the second application is an application on which split-screen display can be performed. When the electronic device determines that the second application is an application on which split-screen display can be performed, the electronic device may continue to perform the following solution, that is, the electronic device may automatically display an identifier of the second application, so that the user does not need to trigger the electronic device to display the identifier of the second application, thereby reducing operations performed when the user uses the electronic device to perform split-screen display. When the electronic device determines that the second application is an application on which split-screen display cannot be performed, the electronic device may continue to display the data corresponding to the first application, that is, the electronic device may continue to display the interface corresponding to the first application.

It should be noted that, when the user cannot use a split-screen mode of the electronic device or the user uses a new electronic device, and the electronic device does not store the historical switching information, the electronic device may guide, based on a scenario, a new user to try the split-screen mode of the electronic device. For example, the electronic device may prompt the user to first enable the first application and then prompt the user to enable the second application within the second preset time period. Then, the electronic device may prompt the user that split-screen display can be performed on the first application and the second application, and may prompt the user to select a split-screen display manner, for example, an up-down split-screen manner or a left-right split-screen manner. After the user determines the split-screen display manner, the electronic device may store the historical switching information, namely, the application pair (including the identifier of the first application and the identifier of the second application), and the enable sequence of the first application and the second application within the second preset time period. The historical switching information may further include the split-screen display manner of the first application and the second application.

Then, after the electronic device displays the first application, the electronic device may determine the second application based on the historical switching information, to automatically display the identifier of the second application on which split-screen display can be performed together with the first application. When the electronic device receives a trigger operation performed by the user to perform split-screen display on the second application, the electronic device may perform split-screen display on the data corresponding to the first application and the data corresponding to the second application in the split-screen display manner previously selected by the user.

For example, with reference to FIG. 7, the awareness module in the electronic device may obtain an enable time of each of the second application and the first application within the second preset time period. The learning module may store the enable time of each of the second application and the first application within the second preset time period. The decision execution module may determine, based on the enable time that is of each of the second application and the first application within the second preset time period and that is stored in the learning module, whether the second application exists, where the second application is an application enabled before the first application within the second preset time period.

When the electronic device determines that no second application exists, the electronic device may continue to display the data corresponding to the first application, that is, the electronic device may continue to perform the following S1003. When the electronic device determines that the second application exists, the electronic device may display the identifier of the second application, that is, the electronic device may continue to perform the following S1004.

S1003: The electronic device continues to display the data corresponding to the first application.

When the electronic device determines that no second application exists, that is, when the electronic device determines that no application is enabled before the first application within the second preset time period, that is, when an application on which split-screen display can be performed together with the first application does not exist in the electronic device, the electronic device may continue to display the data corresponding to the first application.

For example, with reference to FIG. 7, the display module in the electronic device may continue to display the data corresponding to the first application.

S1004: The electronic device displays a first control, where the first control includes an identifier of the first application and an identifier of the second application.

When the electronic device determines that the second application exists, the electronic device determines that an application is enabled before the first application within the second preset time period, that is, an application on which split-screen display can be performed together with the first application exists in the electronic device, and the electronic device may display the second application, so that the user can determine whether to perform split-screen display on the data corresponding to the second application.

In some examples, the electronic device may display the first control, and the first control may include the identifier of the first application and the identifier of the second application, so that the user can trigger the first control. When the electronic device receives a trigger operation, for example, a tap operation, performed by the user on the first control, the electronic device may display the data corresponding to the first application and the data corresponding to the second application. The second application may refer to one application, or the second application may refer to a plurality of applications. When the second application refers to a plurality of applications, the electronic device may display identifiers of the plurality of applications, so that the user can select an application on which split-screen display needs to be performed.

In some examples, the second application may refer to one application, or the second application may refer to a plurality of applications. When the second application refers to a plurality of applications, the electronic device may display identifiers of the plurality of applications, so that the user can select an application on which split-screen display needs to be performed.

For example, the first application is a social application. When a picture application, a music application, and an office application in the electronic device are enabled (that is, run in a foreground of the electronic device) before the social application within the second preset time period, the second applications may be the picture application, the music application, and the office application. The electronic device may display an identifier of the picture application, an identifier of the music application, and an identifier of the office application, and the user selects the identifier of the picture application, the identifier of the music application, or the identifier of the office application, so that the electronic device can perform split-screen display on data corresponding to the social application and data corresponding to the picture application, data corresponding to the social application and data corresponding to the music application, or data corresponding to the social application and data corresponding to the office application.

In some examples, when the electronic device determines that the second application exists, the electronic device may display a split-screen application bar. The split-screen application bar may include the identifier of the second application. The user selects, from the split-screen application bar, the identifier of the second application on which split-screen display needs to be performed.

For example, with reference to FIG. 11A and FIG. 11B, the user first displays an interface corresponding to a picture application by using the mobile phone. Then, the user may switch the mobile phone to an interface corresponding to a social application within the second preset time period. Then, the mobile phone may use the picture application and the social application as one application pair. The mobile phone may store historical switching information, namely, identifiers of the two applications (an identifier of the picture application and an identifier of the social application) included in the application pair, and an enable sequence of the picture application and the social application that are included in the application pair within the second preset time period, that is, the picture application is enabled before the social application within the second preset time period.

Figure 11C:
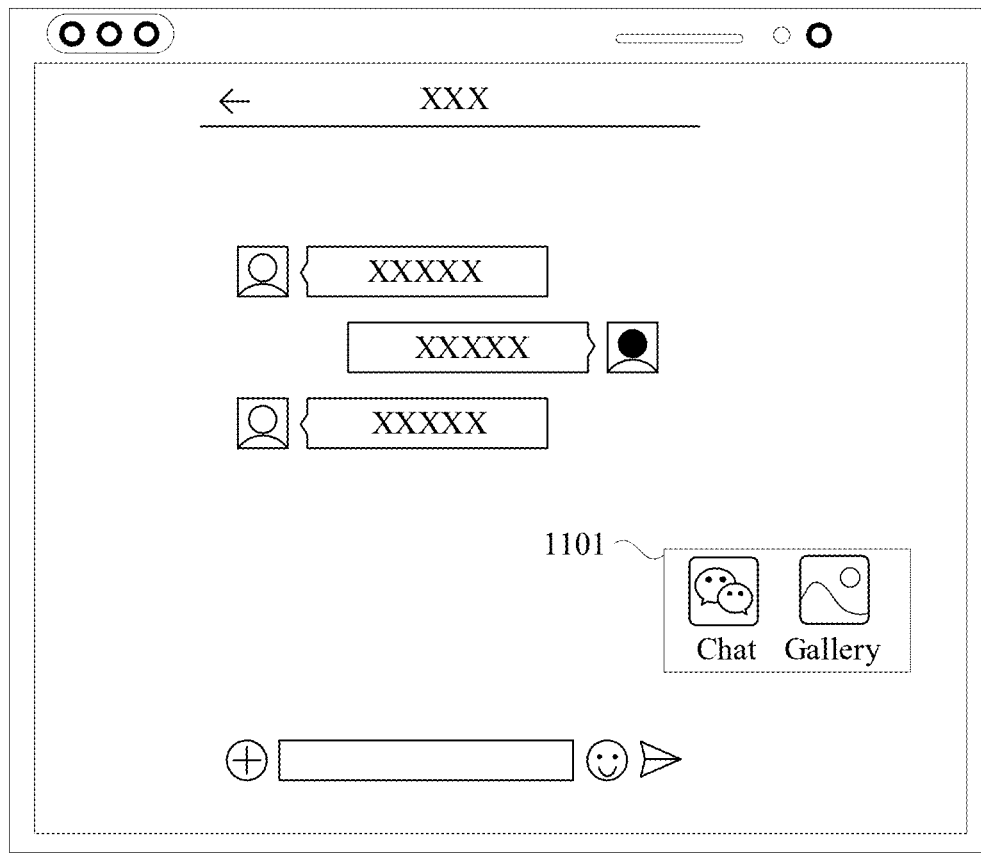

Then, when the user enables the social application (that is, the social application is the first application) by using the mobile phone, the mobile phone may determine whether the second application exists. When the mobile phone determines that the picture application is enabled before the social application within the second preset time period, the mobile phone may determine that the picture application is the second application. That is, when the mobile phone determines that the second application exists, as shown in FIG. 11C, the mobile phone may display the split-screen application bar 1101, namely, the first control, on the interface corresponding to the social application. The split-screen application bar 1101 may include the identifier of the first application and the identifier of the second application, namely, the identifier of the social application and the identifier of the picture application, for example, an identifier of a gallery. In this case, the user can select, from the split-screen application bar 1101, the identifiers of the first application and the second application on which split-screen display needs to be performed.

In some examples, when the electronic device includes a foldable screen, and before the electronic device displays the identifier of the second application, the electronic device may determine whether a status of the screen of the electronic device is an unfolded state. When the electronic device determines that the status of the screen of the electronic device is the unfolded state, the electronic device may display the identifier of the second application. For example, the electronic device may display the split-screen application bar, where the split-screen application bar may include the identifier of the second application.

When the electronic device determines that the status of the screen of the electronic device is not the unfolded state, that is, is a folded state, the electronic device may display a prompt window to prompt the user to use split-screen display when the status of the screen of the electronic device is the unfolded state. After the electronic device displays the prompt window, when the status of the screen of the electronic device is changed from the folded state to the unfolded state within a preset time period, the electronic device may display the identifier of the second application.

For example, the electronic device may display the split-screen application bar, where the split-screen application bar may include the identifier of the second application.

For example, with reference to FIG. 7, the display module in the electronic device may display the identifier of the second application.

S1005: The electronic device receives a trigger operation performed by the user on the first control.

After the electronic device displays the first control, the user may perform the trigger operation on the first control, to trigger the electronic device to perform split-screen display on content corresponding to the second application. In other words, the electronic device can simultaneously display content corresponding to the first application and the content corresponding to the second application on the screen (namely, a display interface). For example, with reference to FIG. 11C, the mobile phone may display the split-screen application bar 101 on the interface corresponding to the social application. The split-screen application bar 1101 may include the identifier of the first application and the identifier of the second application, namely, the identifier of the social application and the identifier of the picture application. When the user needs to perform split-screen display on the content corresponding to the social application and the content corresponding to the picture application by using the mobile phone, the user may trigger the identifier of the social application and the identifier of the picture application in the split-screen application bar 1101.

S1006: In response to the trigger operation, the electronic device displays the data corresponding to the first application and the data corresponding to the second application.

When the electronic device receives a trigger operation, for example, a tap operation, performed by the user on the identifier of the second application, the electronic device may display, in response to the operation, the data corresponding to the first application and the data corresponding to the second application. For example, the electronic device may display the data corresponding to the first application and the data corresponding to the second application in a split-screen mode of the electronic device (for example, a split-screen browsing mode, a side pulling mode, or a middle window mode) or the like. In this embodiment of this application, that the electronic device performs split-screen display on the data corresponding to the first application and the data corresponding to the second application is used as an example for description. In other words, the electronic device may display the data corresponding to the first application and the data corresponding to the second application in the split-screen browsing mode.

Figure 11D:
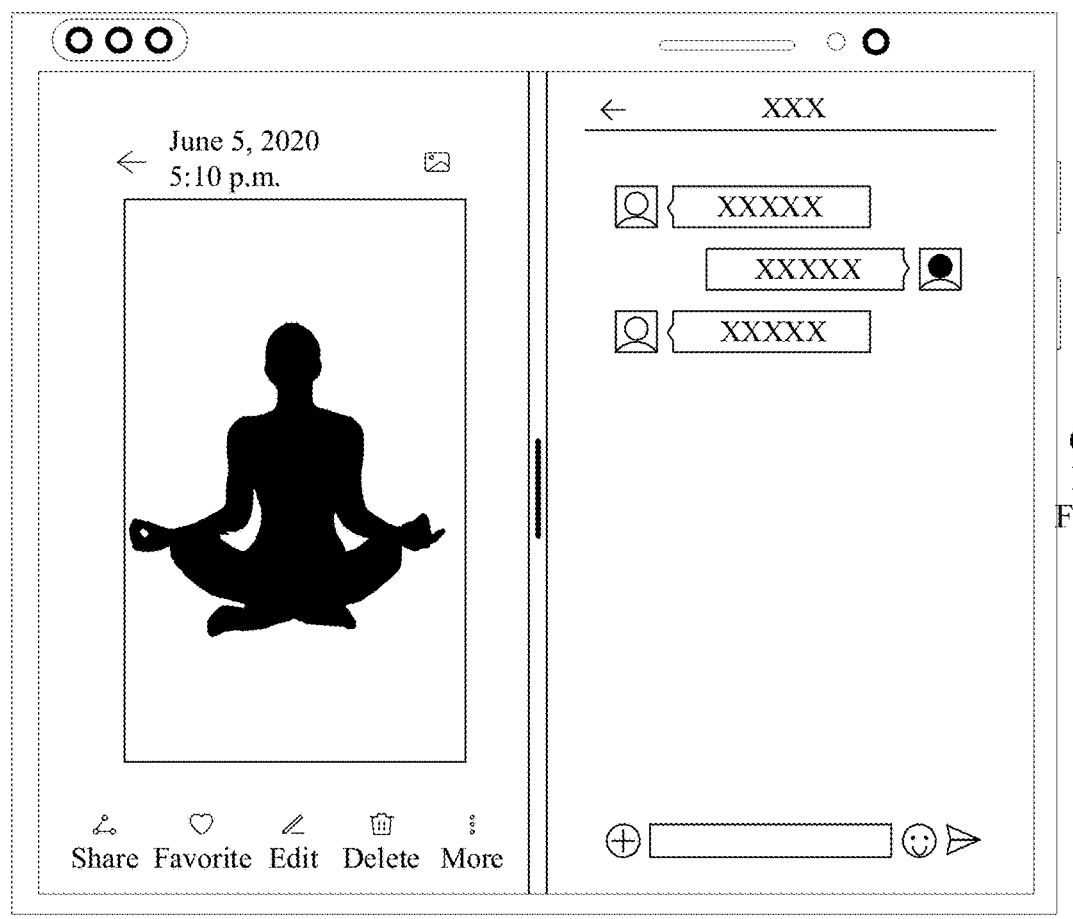

For example, still with reference to FIG. 11C, the mobile phone may display the split-screen application bar 1101 on the interface corresponding to the social application. The split-screen application bar 1101 may include the identifier of the first application and the identifier of the second application, namely, the identifier of the social application and the identifier of the picture application. When the user needs to perform split-screen display on the data corresponding to the social application and the data corresponding to the picture application by using the mobile phone, the user may trigger the split-screen application bar 1101. To be specific, when the mobile phone receives a trigger operation, for example, a tap operation, performed by the user on the split-screen application bar 1101, as shown in FIG. 11D, the mobile phone may perform, in response to the operation, split-screen display on the data corresponding to the picture application and the data corresponding to the social application. In other words, the mobile phone may perform split-screen display on the interface corresponding to the picture application and the interface corresponding to the social application.

For example, with reference to FIG. 7, the display module in the electronic device may display the data corresponding to the first application and the data corresponding to the second application.

By using the solution in this application, when the electronic device displays the data corresponding to the first application, the electronic device can automatically display the identifier of the second application based on the enable sequence of the first application and the second application, thereby reducing operations performed when the user triggers the electronic device to display an application on which split-screen display can be performed, reducing operations performed when the user uses the electronic device to perform split-screen display, and improving split-screen display efficiency of the electronic device.

For another example, in some examples, when the electronic device displays the data corresponding to the first application, the electronic device may automatically display, based on historical split-screen information of the first application, the identifier of the second application on which split-screen display can be performed together with the first application, thereby reducing operations performed when the user uses the electronic device to perform split-screen display, and improving split-screen display efficiency of the electronic device.

Figure 12A:
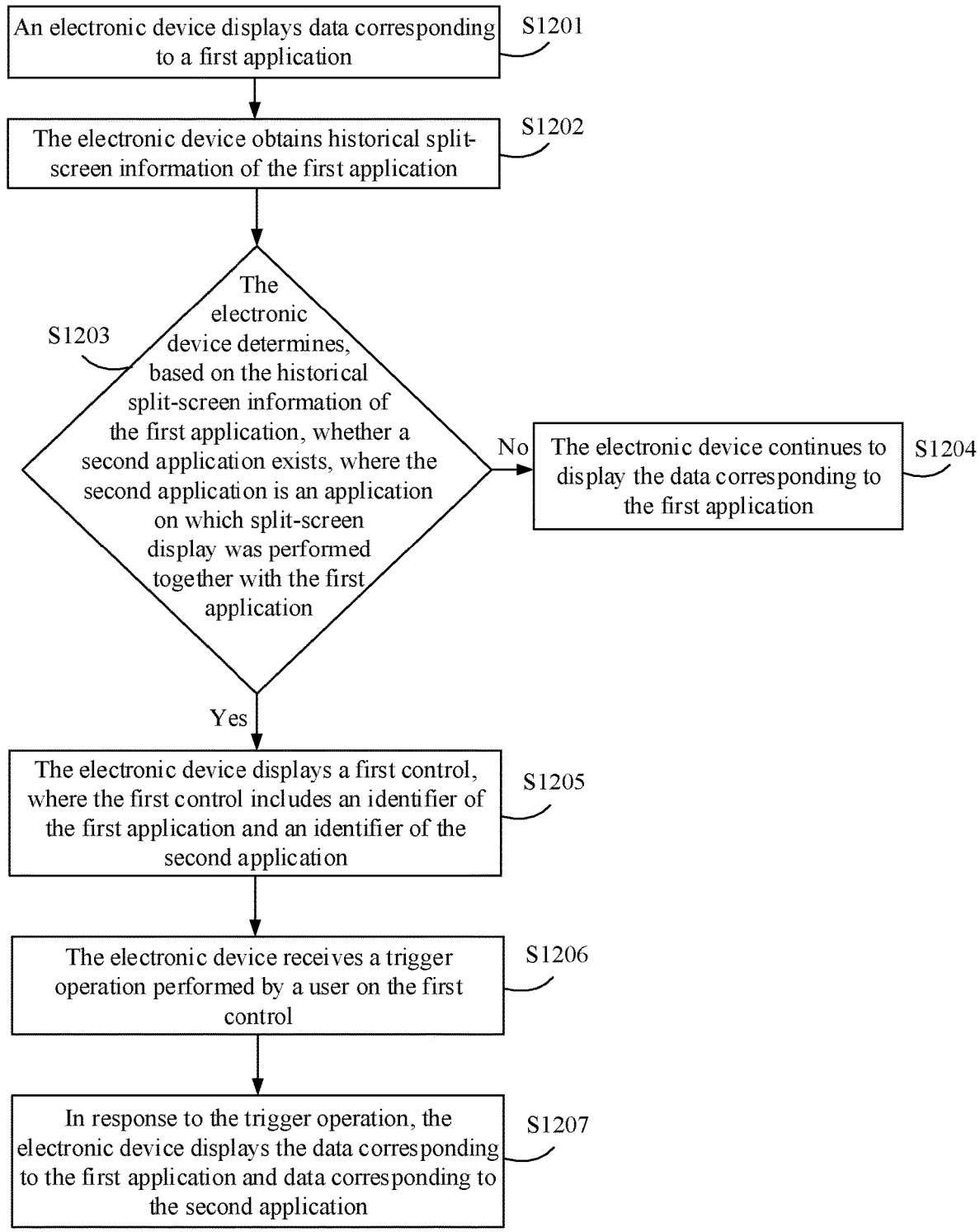
FIG. 12A is a schematic flowchart 3 of a display method according to an embodiment of this application.

As shown in FIG. 12A, the display method provided in the embodiments of this application may include the following S1201-S1207.

S1201: An electronic device displays data corresponding to a first application.

For a specific implementation in which the electronic device displays the data corresponding to the first application, refer to the implementation in the foregoing S801. Details are not described in this embodiment of this application again.

S1202: The electronic device obtains historical split-screen information of the first application.

After the electronic device displays the data corresponding to the first application, that is, after the electronic device displays an interface corresponding to the first application, the electronic device can obtain the stored historical split-screen information of the first application, so that the electronic device can determine, based on the historical split-screen information of the first application, whether a second application exists, where the second application is an application on which split-screen display was performed together with the first application.

The historical split-screen information may include an application that is in the electronic device and on which split-screen display was performed together with the first application. There may be one or more applications that are in the electronic device and on which split-screen display was performed together with the first application. This is not limited in this embodiment of this application. In other words, the historical split-screen information may include a plurality of application pairs, and the electronic device has performed split-screen display on a plurality of applications in each application pair. The application pair may include two or more applications. This is not limited in this embodiment of this application. For example, the application pair may include a learning and office application and a learning and office application, a learning and office application and a communication and social application, a communication and social application and an audio/video entertainment application, a photographing and beautifying application and a learning and office application, or a utility application and a learning and office application, or the application pair may include other types of applications. This is not limited in this embodiment of this application.

For example, the first application is a picture application. Before the electronic device displays data corresponding to the picture application, the user has performed split-screen display on the data corresponding to the picture application and data corresponding to a social application by using the electronic device. In this case, historical split-screen information corresponding to the picture application includes the social application. After the electronic device determines that the historical split-screen information corresponding to the picture application includes the social application, the electronic device may store the historical split-screen information corresponding to the picture application, so that the electronic device can obtain the historical split-screen information corresponding to the picture application after the electronic device displays the data corresponding to the picture application.

In some examples, the historical split-screen information may further include: a display manner used when the electronic device uses the first application for split-screen display, the application that is in the electronic device and on which split-screen display was performed together with the first application, a time in which the electronic device uses the first application for split-screen display, a location of the electronic device that exists when the electronic device uses the first application for split-screen display, a device status of the electronic device that exists when the electronic device uses the first application for split-screen display, and a reason why the electronic device uses the first application for split-screen display.

In some examples, the historical split-screen information may further include attribute information of a user. The attribute information of the user may include an age of the user, a gender of the user, an occupation of the user, or the like.

Display manners used when the electronic device uses the first application for split-screen display may include a split-screen browsing mode, a side pulling mode, and a middle window mode. When the display manner used when the electronic device uses the first application for split-screen display is the split-screen browsing mode, the historical split-screen information may further include display locations of the first application and another application on a screen of the electronic device. For example, the electronic device performs split-screen display on the first application and the another application in an up-down direction, or the electronic device displays the first application and the another application side by side in a left-right direction.

The time in which the electronic device uses the first application for split-screen display may be a time period in which the electronic device uses the first application for split-screen display, for example, from ten o'clock to twelve o'clock, from fourteen o'clock to sixteen o'clock, or from nineteen o'clock to twenty-two o'clock.

The location of the electronic device that exists when the electronic device uses the first application for split-screen display may include a home, a company, a car, a bus, a subway, or the like.

The device status of the electronic device that exists when the electronic device uses the first application for split-screen display may include a status of the screen of the electronic device (for example, the screen of the electronic device is in an unfolded state), or may be that the electronic device is inserted with a headset, the electronic device is connected to Wi-Fi, the electronic device is connected to in-vehicle Bluetooth, or the like.

The reason why the electronic device uses the first application for split-screen display may include an event trigger reason (for example, the electronic device receives a message, for example, a message of the social application, the electronic device is inserted with a headset, or the electronic device is connected to in-vehicle Bluetooth), or may be that applications on which split-screen display is performed are an immersive background application (for example, a specific social application or office application) and an interruptive application (for example, a chat social application), applications on which split-screen display is performed are cooperative applications (for example, a specific social application and a specific picture application), or the like. In some examples, the historical split-screen information of the first application may include historical split-screen information generated when the current electronic device uses the first application, or may include historical split-screen information generated when another electronic device uses the first application. This is not limited in this embodiment of this application. The historical split-screen information generated when the current electronic device uses the first application is information generated when the user uses the current electronic device to perform split-screen display on the data corresponding to the first application before the user uses the current electronic device to display the data corresponding to the first application. The historical split-screen information generated when the another electronic device uses the first application is information generated when the user uses the another electronic device to perform split-screen display on the data corresponding to the first application.

For example, when the historical split-screen information includes a time of the electronic device that exists when the electronic device uses a plurality of applications (for example, the plurality of applications are referred to as an application pair) for split-screen display, and a display manner (for example, the split-screen browsing mode, a smart multi-window mode, and a floating window mode) used when the electronic device uses the application pair for split-screen display, the electronic device may collect statistics on split-screen information generated when the user uses the electronic device to perform split-screen display, to obtain historical split-screen information generated when the user uses the applications for split-screen display. For example, with reference to Table 1, the electronic device may collect statistics on the display manner used when the user uses the electronic device to perform split-screen display, a quantity of users who use the electronic device to perform split-screen display (namely, a user quantity), a quantity of times the electronic device is used to perform split-screen display (namely, a usage count), a quantity of users using an electronic device model when the electronic device is used to perform split-screen display (for example, a quantity of users using a tablet computer type or a mobile phone type), a per capita usage frequency obtained when the electronic device is used to perform split-screen display, and utilization obtained when the electronic device is used to perform split-screen display, to obtain the historical split-screen information generated when the user uses the electronic device to perform split-screen display.

TABLE 1

| Display manner | User quantity | Usage count | Quantity of users using a specific model | Per capita usage frequency | Utilization |
|---|---|---|---|---|---|
| Smart multi-window mode | 47326 | 2380139 | 71529 | 50 | 66% |
| Split-screen browsing mode | 13030 | 138477 | 71529 | 11 | 18% |
| Floating window mode | 46899 | 2241662 | 71529 | 48 | 66% |

With reference to statistical data in Table 1, time distribution of split-screen display of the applications shown in FIG. 12B(1), namely, time distribution generated when the plurality of applications are displayed in the split-screen browsing mode, may be obtained, and time distribution of floating window display of the applications shown in FIG. 12B(2), namely, time distribution generated when the plurality of applications are displayed in the floating window mode, may be obtained.

As shown in FIG. 12B(1), a line 01 indicates a quantity of times split-screen display is used, namely, the quantity of times the electronic device is used to perform split-screen display, and the time in which the electronic device is used to perform split-screen display can be obtained based on the line 01 and time points of each day. A line 02 indicates a quantity of times an office application and an office application are used to perform split-screen display, and a time in which the office application and the office application are used to perform split-screen display can be obtained based on the line 02 and the time points of each day. A line 03 indicates a quantity of times an office application and a social application are used to perform split-screen display, and a time in which the office application and the social application are used to perform split-screen display can be obtained based on the line 03 and the time points of each day. A line 04 indicates a quantity of times an audio/video entertainment application and a social application are used to perform split-screen display, and a time in which the audio/video entertainment application and the social application are used to perform split-screen display can be obtained based on the line 04 and the time points of each day. Historical split-screen information, namely, a time of the electronic device that exists when the electronic device uses the plurality of applications for split-screen display and a display manner used when the electronic device uses the application pair for split-screen display, namely, the split-screen browsing mode, can be obtained based on FIG. 12B(1).

As shown in FIG. 12B(2), a line 05 indicates a quantity of times floating window display is used, namely, a quantity of times the electronic device is used to perform floating window display, and a time in which the electronic device is used to perform floating window display can be obtained based on the line 05 and time points of each day. A line 06 indicates a quantity of times an audio/video entertainment application and a social application are used to perform floating window display, and a time in which the audio/video entertainment application and the social application are used to perform floating window display can be obtained based on the line 06 and the time points of each day. A line 07 indicates a quantity of times an office application and a social application are used to perform floating window display, and a time in which the office application and the social application are used to perform floating window display can be obtained based on the line 07 and the time points of each day. A line 08 indicates a quantity of times an audio/video entertainment application and a social application are used to perform floating window display, and a time in which the audio/video entertainment application and the social application are used to perform floating window display can be obtained based on the line 08 and the time points of each day. Historical split-screen information, namely, a time of the electronic device that exists when the electronic device uses the plurality of applications for floating window display and a display manner used when the electronic device uses the application pair for floating window display, namely, a floating window browsing mode, can be obtained based on FIG. 12B(2).

It should be noted that, when the user uses a new electronic device, that is, when the electronic device does not store the historical split-screen information generated when the current electronic device uses the first application, the electronic device may obtain, from a cloud, the historical split-screen information generated when the another electronic device uses the first application.

For example, with reference to FIG. 7, the awareness module in the electronic device may obtain the historical split-screen information of the first application.

S1203: The electronic device determines, based on the historical split-screen information of the first application, whether a second application exists, where the second application is an application on which split-screen display was performed together with the first application.

After the electronic device obtains the historical split-screen information of the first application, the electronic device may determine, based on the historical split-screen information of the first application, whether the second application exists in the electronic device. The second application may be an application on which split-screen display was performed together with the first application.

In some examples, when the historical split-screen information of the first application includes an application on which split-screen display was performed together with the first application, the electronic device may determine that the application on which split-screen display was performed together with the first application is the second application. There may be one or more second applications. This is not limited in this embodiment of this application.

In some other examples, when the historical split-screen information of the first application includes the time in which the electronic device uses the first application for split-screen display, the electronic device may determine whether a time in which the data corresponding to the first application is currently displayed matches the time in which the electronic device uses the first application for split-screen display, that is, determine whether the time in which the data corresponding to the first application is currently displayed falls within the time in which the electronic device uses the first application for split-screen display. When the electronic device determines that the time in which the data corresponding to the first application is currently displayed matches the time in which the electronic device uses the first application for split-screen display, the electronic device may determine that an application on which split-screen display is performed together with the first application within the time is the second application.

In some other examples, when the historical split-screen information of the first application includes the location of the electronic device that exists when the electronic device uses the first application for split-screen display, the electronic device may determine whether a location of the electronic device that exists when the data corresponding to the first application is currently displayed matches the location of the electronic device that exists when the electronic device uses the first application for split-screen display, that is, determine whether the location in which the data corresponding to the first application is currently displayed is the same as the location of the electronic device that exists when the electronic device uses the first application for split-screen display. When the electronic device determines that the location in which the data corresponding to the first application is currently displayed matches the location in which the electronic device uses the first application for split-screen display, the electronic device may determine that an application on which split-screen display is performed together with the first application in the location is the second application.

In some other examples, when the historical split-screen information of the first application includes the device status of the electronic device that exists when the electronic device uses the first application for split-screen display, the electronic device may determine whether a device status of the electronic device that exists when the data corresponding to the first application is currently displayed matches the device status of the electronic device that exists when the electronic device uses the first application for split-screen display, that is, determine whether the device status of the electronic device that exists when the data corresponding to the first application is currently displayed is the same as the device status of the electronic device that exists when the electronic device uses the first application for split-screen display. When the electronic device determines that the device status of the electronic device that exists when the data corresponding to the first application is currently displayed matches the device status of the electronic device that exists when the electronic device uses the first application for split-screen display, the electronic device may determine that an application, on which split-screen display is performed together with the first application in a same device status as the device status of the electronic device that exists when the data corresponding to the first application is currently displayed, is the second application.

In some other examples, when the historical split-screen information of the first application includes the reason why the electronic device uses the first application for split-screen display, the electronic device may determine whether there is a reason why the electronic device uses the first application for split-screen display when the data corresponding to the first application is currently displayed. When the electronic device determines that there is a reason why the electronic device uses the first application for split-screen display when the data corresponding to the first application is currently displayed, the electronic device may determine that an application whose split-screen display reason is the same as the reason why the first application is currently display is the second application, where the application is an application in applications on which split-screen display was performed together with the first application.

For example, with reference to FIG. 7, the learning module in the electronic device may store the historical split-screen information of the first application. The decision execution module in the electronic device may determine, based on the historical split-screen information that is of the first application and that is stored in the learning module, whether the second application exists, where the second application is an application on which split-screen display was performed together with the first application.

When the electronic device determines that no second application exists, the electronic device may continue to display the data corresponding to the first application, that is, the electronic device may continue to perform the following S1204. When the electronic device determines that the second application exists, the electronic device may display the identifier of the second application, that is, the electronic device may continue to perform the following S1205.

S1204: The electronic device continues to display the data corresponding to the first application.

When the electronic device determines that no second application exists, that is, when the electronic device determines that an application on which split-screen display was performed together with the first application does not exist in the electronic device, that is, when an application on which split-screen display can be performed together with the first application does not exist in the electronic device, the electronic device may continue to display the data corresponding to the first application.

For example, with reference to FIG. 7, the display module in the electronic device may continue to display the data corresponding to the first application.

S1205: The electronic device displays a first control, where the first control includes an identifier of the first application and an identifier of the second application.

When the electronic device determines that the second application exists, that is, when the electronic device determines that an application on which split-screen display was performed together with the first application exists in the electronic device, that is, when an application on which split-screen display can be performed together with the first application exists in the electronic device, the electronic device may display the identifier of the second application, so that the user can determine whether to perform split-screen display on the data corresponding to the second application.

In some examples, the electronic device may display the first control, and the first control may include the identifier of the first application and the identifier of the second application, so that the user can trigger the first control. When the electronic device receives a trigger operation, for example, a tap operation, performed by the user on the first control, the electronic device may display the data corresponding to the first application and the data corresponding to the second application. The second application may refer to one application, or the second application may refer to a plurality of applications. When the second application refers to a plurality of applications, the electronic device may display identifiers of the plurality of applications, so that the user can select an application on which split-screen display needs to be performed.

For example, when the first application is a social application, and split-screen display was performed on the social application and each of a picture application, a music application, and an office application in the electronic device, the second applications may be the picture application, the music application, and the office application. The electronic device may display an identifier of the picture application, an identifier of the music application, and an identifier of the office application, and the user selects the identifier of the picture application, the identifier of the music application, or the identifier of the office application, so that the electronic device can perform split-screen display on data corresponding to the social application and data corresponding to the picture application, data corresponding to the social application and data corresponding to the music application, or data corresponding to the social application and data corresponding to the office application.

In some examples, when the electronic device determines that the second application exists, the electronic device may display a split-screen application bar, which may also be referred to as a recommendation capsule. The split-screen application bar may include the identifier of the second application. The user selects, from the split-screen application bar, the identifier of the second application on which split-screen display needs to be performed.

For example, with reference to FIG. 7, the display module in the electronic device may display the identifier of the second application.

S1206: The electronic device receives a trigger operation performed by the user on the first control.

After the electronic device displays the first control, the user may perform the trigger operation on the first control, to trigger the electronic device to perform split-screen display on content corresponding to the second application. In other words, the electronic device can simultaneously display content corresponding to the first application and the content corresponding to the second application on the screen (namely, a display interface).

S1207: In response to the trigger operation, the electronic device displays the data corresponding to the first application and the data corresponding to the second application.

When the electronic device receives a trigger operation, for example, a tap operation, performed by the user on the identifier of the second application, the electronic device may display, in response to the operation, the data corresponding to the first application and the data corresponding to the second application. For example, the electronic device may display the data corresponding to the first application and the data corresponding to the second application in a split-screen mode of the electronic device (for example, a split-screen browsing mode, a side pulling mode, or a middle window mode) or the like. In this embodiment of this application, that the electronic device performs split-screen display on the data corresponding to the first application and the data corresponding to the second application is used as an example for description. In other words, the electronic device may display the data corresponding to the first application and the data corresponding to the second application in the split-screen browsing mode.

For example, a mobile phone is a mobile phone having an inward foldable screen, and the first application is a social application. With reference to FIG. 12C(1), when the foldable screen of the mobile phone is in a fully unfolded state, the electronic device displays data corresponding to the social application, namely, an interface corresponding to the social application. The electronic device obtains historical split-screen information of the social application, and may determine, based on the historical split-screen information of the social application, that split-screen display was performed on the social application and a picture application. In this case, the electronic device can determine that the picture application is the second application. As shown in FIG. 12C(2), the electronic device may display the split-screen application bar 1201, namely, the first control, on the interface corresponding to the social application. The split-screen application bar 1201 may include an identifier of the social application and an identifier of the picture application. When the electronic device receives a trigger operation performed by the user on the split-screen application bar 1201, as shown in FIG. 12C(3), the electronic device may perform, in response to the operation, split-screen display on the data corresponding to the social application and data corresponding to the picture application.

For example, with reference to FIG. 7, the display module in the electronic device may display the data corresponding to the first application and the data corresponding to the second application.

By using the solution in this application, when the electronic device displays the data corresponding to the first application, the electronic device may automatically display, based on the historical split-screen information of the first application, the identifier of the second application on which split-screen display can be performed together with the first application, thereby reducing operations performed when the user uses the electronic device to perform split-screen display, and improving split-screen display efficiency of the electronic device.

In some examples, when the electronic device displays a home screen or data corresponding to another application, the electronic device may predict, based on current status information of the electronic device, an application pair on which the user needs to perform split-screen display, so that the electronic device can automatically display the identifiers of the first application and the second application that are included in the application pair on which split-screen display can be performed, thereby reducing operations performed when the user uses the electronic device to perform split-screen display, and improving split-screen display efficiency of the electronic device.

Figure 13A:
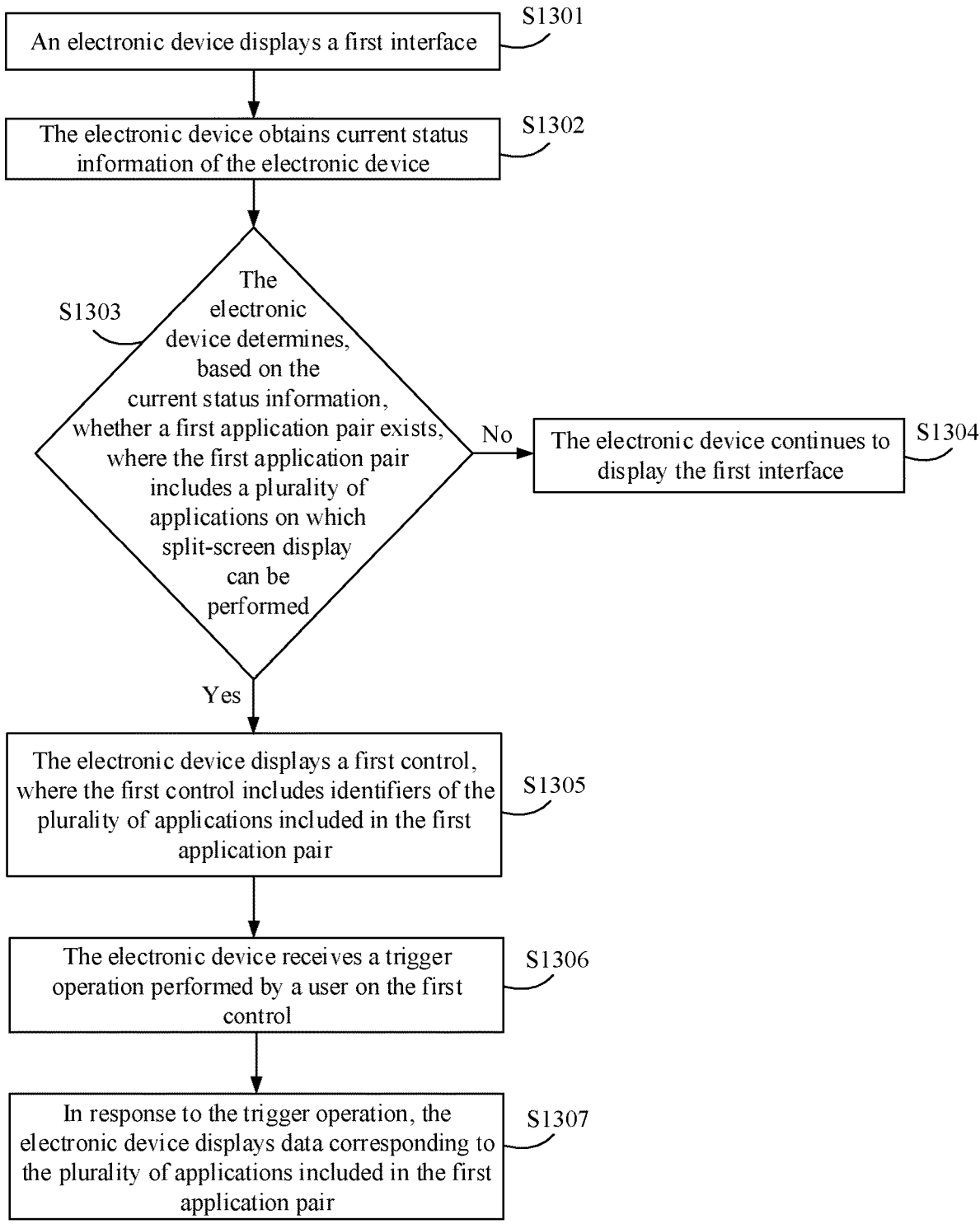
FIG. 13A is a schematic flowchart 4 of a display method according to an embodiment of this application.

As shown in FIG. 13A, the display method provided in the embodiments of this application may include the following S1301-S1307.

S1301: An electronic device displays a first interface.

The first interface may be a home screen of the electronic device, or may be an interface corresponding to any application included in the electronic device. This is not limited in this embodiment of this application.

For example, with reference to FIG. 7, the display module in the electronic device may display the first interface.

S1302: The electronic device obtains current status information of the electronic device.

After the electronic device displays the first interface, the electronic device may obtain the current status information of the electronic device, so that the electronic device can predict, based on the current status information of the electronic device, an application pair on which a user needs to perform split-screen display.

The current status information of the electronic device may include at least one of a current time of the electronic device, a current location of the electronic device, a current device status of the electronic device, and a current speed of the electronic device. The current status information of the electronic device may further include other status information of the electronic device. This is not limited in this embodiment of this application.

The current location of the electronic device may include a home, a company, a car, a bus, a subway, or the like. This is not limited in this embodiment of this application.

The current device status of the electronic device may include a current status of a screen of the electronic device (for example, whether the screen of the electronic device is in a folded state or an unfolded state), whether the electronic device is inserted with a headset, whether the electronic device is connected to Wi-Fi, whether the electronic device is connected to in-vehicle Bluetooth, or the like. The current device status of the electronic device may alternatively include another device state of the electronic device. This is not limited in this embodiment of this application.

For example, with reference to FIG. 7, the awareness module in the electronic device may obtain the current status information of the electronic device.

S1303: The electronic device determines, based on the current status information, whether a first application pair exists, where the first application pair includes a plurality of applications on which split-screen display can be performed.

After the electronic device obtains the current status information of the electronic device, the electronic device may determine, based on the current status information of the electronic device, whether the first application pair exists. The first application pair may include a plurality of applications on which split-screen display can be performed. For example, the first application pair may include a picture application and a social application.

In some examples, after the electronic device obtains the current status information of the electronic device, the electronic device may determine, based on the current status information of the electronic device and a built-in split-screen prediction model, whether the first application pair exists. The split-screen prediction model may be an artificial intelligence (artificial intelligence, AI) model. For example, the electronic device may identify a feature corresponding to the current status information of the electronic device by using the split-screen prediction model, and determine the identified and predicted first application pair based on the identified feature.

The split-screen prediction model may be obtained through training based on historical split-screen information that is stored in the electronic device and that is of an application pair on which split-screen display was performed by the electronic device. The split-screen prediction model may alternatively be obtained through training based on historical split-screen information of an application pair on which split-screen display was performed by another electronic device. This is not limited in this embodiment of this application. After the electronic device obtains the split-screen prediction model, the electronic device may store the split-screen prediction model, so that the electronic device can input the current status information of the electronic device into the split-screen prediction model, and the first application pair can be output by using the split-screen prediction model, where the historical split-screen information corresponding to the first application pair matches the current status information of the electronic device.

The historical split-screen information may include at least one of an application pair on which split-screen display is historically performed by the electronic device, a display manner used when the electronic device historically performs split-screen display on the application pair, a time in which the electronic device historically performs split-screen display on the application pair, a location of the electronic device that exists when the electronic device historically performs split-screen display on the application pair, a device status of the electronic device that exists when the electronic device historically performs split-screen display on the application pair, and a reason why the electronic device historically performs split-screen display on the application pair. There may be a plurality of pieces of historical split-screen information.

In some examples, the historical split-screen information may further include attribute information of a user. The attribute information of the user may include an age of the user, a gender of the user, an occupation of the user, or the like.

The application pair on which split-screen display is historically performed by the electronic device, namely, a plurality of applications on which split-screen display was performed by the electronic device, may be referred to as a first application pair. The first application pair may include a learning and office application and a learning and office application, a learning and office application and a communication and social application, a communication and social application and an audio/video entertainment application, a photographing and beautifying application and a learning and office application, or a utility application and a learning and office application, or the first application pair may include other types of applications. This is not limited in this embodiment of this application.

Display manners used when the electronic device historically performs split-screen display on the application pair may include a split-screen browsing mode, a side pulling mode, and a middle window mode. When the display manner used when the electronic device historically performs split-screen display on the application pair is the split-screen browsing mode, the historical split-screen information may further include display locations that are on the screen of the electronic device and that are of the plurality of applications included in the application pair on which split-screen display is historically performed by the electronic device. For example, the electronic device performs split-screen display on the plurality of applications in an up-down direction, or the electronic device displays the plurality of applications side by side in a left-right direction.

The time in which the electronic device historically performs split-screen display on the application pair may be a time period in which split-screen display is historically performed on the application pair, for example, from ten o'clock to twelve o'clock, from fourteen o'clock to sixteen o'clock, or from nineteen o'clock to twenty-two o'clock on a workday or weekend.

The location of the electronic device that exists when the electronic device historically performs split-screen display on the application pair may include a home, a company, a car, a bus, a subway, or the like.

The device status of the electronic device that exists when the electronic device historically performs split-screen display on the application pair may include the status of the screen of the electronic device (for example, the screen of the electronic device is in the unfolded state) when the electronic device historically performs split-screen display on the application pair, whether the electronic device is inserted with a headset when the electronic device historically performs split-screen display on the application pair, whether the electronic device is connected to Wi-Fi when the electronic device historically performs split-screen display on the application pair, whether the electronic device is connected to in-vehicle Bluetooth when the electronic device historically performs split-screen display on the application pair, or the like.

The reason why the electronic device historically performs split-screen display on the application pair may include an event trigger reason (for example, the electronic device receives a message, for example, a message of the social application, the electronic device is inserted with a headset, or the electronic device is connected to in-vehicle Bluetooth) why the electronic device historically performs split-screen display on the application pair, or may be that, when the electronic device historically performs split-screen display on the application pair, applications on which split-screen display is performed are an immersive background application (for example, a specific social application or office application) and an interruptive application (for example, a chat social application), applications on which split-screen display is performed are cooperative applications (for example, a specific social application and a specific picture application), or the like.

It should be noted that when the user uses a new electronic device, that is, when the electronic device does not store the historical split-screen information of the current electronic device, the electronic device may obtain historical split-screen information of another electronic device from a cloud, to obtain the split-screen prediction model based on the historical split-screen information of the another electronic device.

For example, the historical split-screen information of the electronic device includes the application pair on which split-screen display is historically performed by the electronic device, the time in which the electronic device historically performs split-screen display on the application pair, the location of the electronic device that exists when the electronic device historically performs split-screen display on the application pair, the device status of the electronic device that exists when the electronic device historically performs split-screen display on the application pair, and the display manner used when the electronic device historically performs split-screen display on the application pair. With reference to FIG. 14, there may be a plurality of pieces of historical split-screen information of the electronic device. For example, the historical split-screen information of the electronic device may include: applications: a learning and office application+a learning and office application; a time: forenoon; a site: an office; a device status: none; and a split-screen display manner: the learning and office application is on a left side+the learning and office application is on a right side. The historical split-screen information of the electronic device may include: applications: a social application+a social application; a time: lunch break; a site: the office; a device status: none; and a split-screen display manner: the social application is on the left side+the social application is on the right side.

For example, with reference to FIG. 7, the learning module in the electronic device may perform training based on the historical split-screen information that is stored in the electronic device and that is of the application pair on which split-screen display was performed by the electronic device, to obtain the split-screen prediction model. The decision execution module in the electronic device may determine, based on the split-screen prediction model stored in the learning module and the current status information that is of the electronic device and that is obtained by the awareness module, whether the first application pair exists, where the first application pair includes a plurality of applications on which split-screen display can be performed.

When the electronic device determines that no first application pair exists, the electronic device may continue to display the first interface, that is, the electronic device may continue to perform the following S1304. When the electronic device determines that the first application pair exists, the electronic device may display identifiers of the plurality of applications included in the first application pair, that is, the electronic device may continue to perform the following S1305.

S1304: The electronic device continues to display the first interface.

When the electronic device determines that no first application pair exists, that is, when the electronic device determines that a plurality of applications that meet the current status information of the electronic device and on which split-screen display can be performed do not exist in the electronic device, the electronic device may continue to display the first interface.

For example, with reference to FIG. 7, the display module in the electronic device may continue to display the first interface.

S1305: The electronic device displays a first control, where the first control includes identifiers of the plurality of applications included in the first application pair.

When the electronic device determines that the first application pair exists, that is, when the electronic device determines that a plurality of applications that meet the current status information of the electronic device and on which split-screen display can be performed exist in the electronic device, the electronic device may display the identifiers of the plurality of applications included in the first application pair, so that the user can trigger the electronic device to perform split-screen display on data corresponding to the plurality of applications.

In some examples, that the electronic device displays the plurality of applications included in the first application pair may include: The electronic device displays the first control, where the first control may include an identifier of a first application and an identifier of a second application, so that the user can trigger the first control. When the electronic device receives a trigger operation, for example, a tap operation, performed by the user on the first control, the electronic device may display data corresponding to the first application and data corresponding to the second application. The second application may refer to one application, or the second application may refer to a plurality of applications. When the second application refers to a plurality of applications, the electronic device may display identifiers of the plurality of applications, so that the user can select an application on which split-screen display needs to be performed. In some examples, when the electronic device determines that the first application pair exists, the electronic device may display a split-screen application bar, which may also be referred to as a recommendation capsule. The split-screen application bar may include the identifiers of the plurality of applications included in the first application pair. The user selects, from the split-screen application bar, the identifiers of the plurality of applications on which split-screen display needs to be performed.

For example, with reference to FIG. 7, the display module in the electronic device may display the identifiers of the plurality of applications included in the first application pair.

S1306: The electronic device receives a trigger operation performed by a user on the first control.

After the electronic device displays the first control, the user may perform the trigger operation on the first control, to trigger the electronic device to perform split-screen display on content corresponding to the second application. In other words, the electronic device can simultaneously display content corresponding to the first application and the content corresponding to the second application on the screen (namely, a display interface).

S1307: In response to the trigger operation, the electronic device displays data corresponding to the plurality of applications included in the first application pair.

When the electronic device receives a trigger operation, for example, a tap operation, performed by the user on the identifier of the second application, the electronic device may display, in response to the operation, the data corresponding to the first application and the data corresponding to the second application. For example, the electronic device may display the data corresponding to the first application and the data corresponding to the second application in a split-screen mode of the electronic device (for example, a split-screen browsing mode, a side pulling mode, or a middle window mode) or the like. In this embodiment of this application, that the electronic device performs split-screen display on the data corresponding to the first application and the data corresponding to the second application is used as an example for description. In other words, the electronic device may display the data corresponding to the first application and the data corresponding to the second application in the split-screen browsing mode.

For example, a mobile phone is a mobile phone having an inward foldable screen, and the first interface is a home screen of the electronic device. With reference to FIG. 13B(1), when the foldable screen of the mobile phone is in a fully unfolded state, the electronic device displays the first interface, namely, the home screen of the electronic device. The electronic device obtains the current status information of the electronic device. After obtaining the current status information of the electronic device, the electronic device may determine the first application pair based on the current status information of the electronic device and the split-screen prediction model, for example, the first application pair may include a camera application and a picture application. In other words, historical split-screen information generated when the electronic device performs split-screen display on the camera application and the picture application matches the current status information of the electronic device. After the electronic device determines the first application pair, as shown in FIG. 13B(2), the electronic device may display the split-screen application bar 1301, namely, the first control, on the first interface. The split-screen application bar 1301 may include an identifier of the picture application and an identifier of the camera application. When the electronic device receives a trigger operation performed by the user on the identifiers that are of the picture application and the camera application and that are included in the split-screen application bar 1301, as shown in FIG. 13B(3), the electronic device may perform, in response to the operation, split-screen display on data corresponding to the camera application and data corresponding to the picture application.

For example, with reference to FIG. 7, the display module in the electronic device may display the data corresponding to the plurality of applications included in the first application pair.

By using the solution in this application, when the electronic device displays the first interface, for example, the home screen of the electronic device or the interface corresponding to any application included in the electronic device, the electronic device may predict, based on the current status information of the electronic device, an application pair on which the user needs to perform split-screen display, so that the electronic device can automatically display the identifiers of the first application and the second application that are included in the application pair on which split-screen display can be performed, thereby reducing operations performed when the user uses the electronic device to perform split-screen display, and improving split-screen display efficiency of the electronic device.

Figure 15:
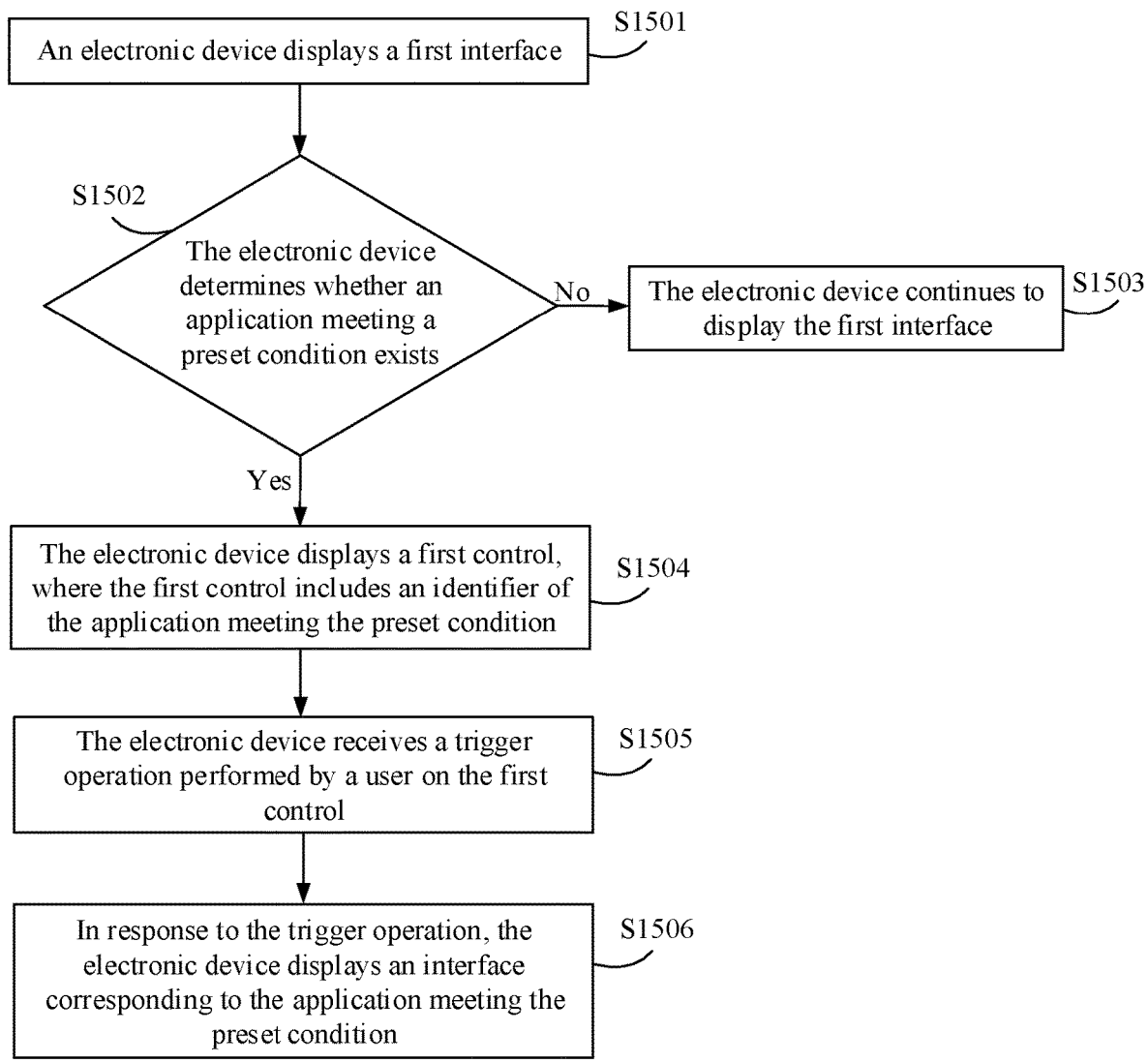
FIG. 15 is a schematic flowchart 5 of a display method according to an embodiment of this application.

For ease of understanding, the following describes the display method provided in the embodiments of this application with reference to FIG. 15. As shown in FIG. 15, the display method provided in the embodiments of this application may include the following S1501-S1506.

S1501: An electronic device displays a first interface.

The first interface may be a home screen of the electronic device, or may be an interface corresponding to any application included in the electronic device. For example, the first interface may be an interface corresponding to a first application, that is, the first application is any application in the electronic device. This is not limited in this embodiment of this application.

S1502: The electronic device determines whether an application meeting a preset condition exists.

After the electronic device displays the first interface, the electronic device may determine whether an application meeting the preset condition exists, so that when the electronic device determines that an application meeting the preset condition exists, the electronic device can automatically display an identifier of the application meeting the preset condition. There may be one or more applications that meet the preset condition. This is not limited in this embodiment of this application.

In some examples, when the first interface is the interface corresponding to the first application, the preset condition may include: a quantity of switching times between a second application and the first application within a first preset time period is greater than a threshold for the quantity of switching times, the second application is enabled before the first application within a second preset time period, split-screen display was performed on the second application and the first application, or current status information of the electronic device matches historical status information. When the electronic device is in the historical status information, the electronic device simultaneously displays the interface of the first application and an interface of the second application, In other words, the electronic device may display a second interface, where the second interface may include the interface of the first application and the interface of the second application. There may be one or more second applications. This is not limited in this embodiment of this application.

When the preset condition is that the quantity of switching times between the second application and the first application within the first preset time period is greater than the threshold for the quantity of switching times, that is, when the preset condition is that the quantity of switching times between the second application and the first application within the first preset time period before the first interface is displayed is greater than the threshold for the quantity of switching times, the application meeting the preset condition is an application whose quantity of switching times with the first application within the first preset time period is greater than the threshold for the quantity of switching times.

When the preset condition is that the second application is enabled before the first application within the second preset time period, that is, when the preset condition is that the second application ran in a foreground within the second preset time period before the first interface is displayed, the application meeting the preset condition is an application enabled before the first application within the second preset time period.

When the preset condition is that split-screen display was performed on the second application and the first application, that is, when the preset condition is that the second interface and the first interface were simultaneously displayed on a display before the first interface is displayed, When the preset condition is that the current status information of the electronic device matches the historical status information, that is, when the preset condition is that status information of the electronic device that is generated when the first interface is displayed matches the historical status information of the electronic device that is generated when the second interface is displayed on the display (that is, the interface of the first application and the interface of the second application are simultaneously displayed), The current status information of the electronic device may include at least one of a location of the electronic device (for example, a current location of the electronic device), a time of the electronic device (for example, a current time of the electronic device), a device status of the electronic device (for example, a current device status of the electronic device), and a speed of the electronic device (for example, a current speed of the electronic device).

The device status of the electronic device may include: a current status of a screen of the electronic device (for example, whether the screen of the electronic device is in a folded state or an unfolded state), whether the electronic device is inserted with a headset, whether the electronic device is connected to Wi-Fi, whether the electronic device is connected to in-vehicle Bluetooth, or the like. The current device status of the electronic device may alternatively include another device state of the electronic device. This is not limited in this embodiment of this application.

The historical status information includes at least one of a location of the electronic device that exists when the electronic device simultaneously displays interfaces corresponding to a plurality of applications, a time of the electronic device that exists when the electronic device simultaneously displays the interfaces corresponding to the plurality of applications, a device status of the electronic device that exists when the electronic device simultaneously displays the interfaces corresponding to the plurality of applications, and a speed of the electronic device that exists when the electronic device simultaneously displays the interfaces corresponding to the plurality of applications. The plurality of applications may include the first application and the second application. In other words, the historical status information may include at least one of a location of the electronic device that exists when the first interface and the second interface are simultaneously displayed on the display, a time of the electronic device that exists when the first interface and the second interface are simultaneously displayed on the display, a device status of the electronic device that exists when the first interface and the second interface are simultaneously displayed on the display, and a speed of the electronic device that exists when the first interface and the second interface are simultaneously displayed on the display.

In some examples, that status information of the electronic device that is generated when the first interface is displayed matches the historical status information of the electronic device that is generated when the second interface is displayed on the display includes at least one of the following: a location of the electronic device that exists when the first interface is displayed on the display matches the location of the electronic device that exists when the second interface is displayed on the display; a time of the electronic device that exists when the first interface is displayed on the display matches the time of the electronic device that exists when the second interface is displayed on the display; a device status of the electronic device that exists when the first interface is displayed on the display matches the device status of the electronic device that exists when the second interface is displayed on the display; or a speed of the electronic device that exists when the first interface is displayed on the display matches the speed of the electronic device that exists when the second interface is displayed on the display.

For example, when the current status information of the electronic device includes the location of the electronic device, and the historical status information includes the location of the electronic device that exists when the first interface and the second interface are simultaneously displayed on the display, that the current status information of the electronic device matches the historical status information includes: The location of the electronic device that exists when the first interface is displayed is the same as the location included in the historical status information of the electronic device that is generated when the first interface and the second interface are simultaneously displayed on the display.

For a specific implementation in which the electronic device determines whether an application meeting the preset condition exists, refer to the implementation in S802, S1002, S1203, or S1303. Details are not described in this embodiment of this application again.

When the electronic device determines that no application meeting the preset condition exists, the electronic device may continue to display the first interface, that is, the electronic device may continue to perform the following S1503. When the electronic device determines that an application meeting the preset condition exists, the electronic device may display the identifier of the application meeting the preset condition, that is, the electronic device may continue to perform the following S1504.

S1503: The electronic device continues to display the first interface.

When the electronic device determines that no application meeting the preset condition exists, that is, when an application on which split-screen display can be performed together with the first application does not exist in the electronic device, the electronic device may continue to display data corresponding to the first application.

S1504: The electronic device displays a first control, where the first control includes an identifier of the application meeting the preset condition.

When the first interface is a home screen of the electronic device or an interface corresponding to any application in the electronic device, identifiers of applications that meet the preset condition may be the identifier of the first application and the identifier of the second application. When the first interface is the interface of the first application in the electronic device, the identifier of the application meeting the preset condition may be the identifier of the second application.

When the electronic device determines that an application meeting the preset condition exists, that is, when an application on which split-screen display can be performed together with the first application exists in the electronic device, the electronic device may display the first control, where the first control may include the identifier of the application meeting the preset condition. In this case, the user can determine whether to perform split-screen display on the data corresponding to the application meeting the preset condition.

In some examples, when the electronic device determines that an application meeting the preset condition exists, the electronic device may display a split-screen application bar, which may also be referred to as a recommendation capsule. The split-screen application bar may include the identifier of the application meeting the preset condition. The user can select, from the split-screen application bar, the identifier of the application that meets the preset condition and on which split-screen display needs to be performed.

In some examples, when the electronic device includes a foldable screen, and before the electronic device displays the identifier of the application meeting the preset condition, the electronic device may determine whether the status of the screen of the electronic device is the unfolded state. When the electronic device determines that the status of the screen of the electronic device is the unfolded state, the electronic device may display the identifier of the application meeting the preset condition. For example, the electronic device may display the split-screen application bar, where the split-screen application bar may include the identifier of the application meeting the preset condition.

When the electronic device determines that the status of the screen of the electronic device is not the unfolded state, that is, is a folded state, the electronic device may display a prompt window to prompt the user to unfold the foldable screen of the electronic device. In other words, split-screen display may be used when the status of the screen of the electronic device is the unfolded state. After the electronic device displays the prompt window, when the status of the screen of the electronic device is changed from the folded state to the unfolded state within a preset time period, for example, when the electronic device receives a second operation performed by the user to unfold the foldable screen, the electronic device may display the identifier of the application meeting the preset condition. For example, the electronic device may display the split-screen application bar, where the split-screen application bar may include the identifier of the application meeting the preset condition.

S1505: The electronic device receives a trigger operation performed by a user on the first control.

After the electronic device displays the first control, the user may perform the trigger operation (which may be referred to as a first operation) on the first control, to trigger the electronic device to perform split-screen display on content corresponding to the application meeting the preset condition. In other words, the electronic device can simultaneously display content or data corresponding to a plurality of applications (namely, interfaces corresponding to the applications) on the screen (namely, a display interface).

In some examples, when the electronic device displays the identifier of the application meeting the preset condition, the electronic device receives the trigger operation performed by the user on the application meeting the preset condition, that is, the electronic device receives the trigger operation performed by the user on the identifier of the application meeting the preset condition. When the electronic device receives the trigger operation, for example, a tap operation, performed by the user on the identifier of the application meeting the preset condition, the electronic device may perform split-screen display on data corresponding to an application, namely, an interface corresponding to the application, selected by the user.

S1506: In response to the trigger operation, the electronic device performs split-screen display on an interface corresponding to the application meeting the preset condition.

When the electronic device receives the trigger operation, for example, the tap operation, performed by the user on the identifier of the application meeting the preset condition, the electronic device may display, in response to the operation, the interface corresponding to the application meeting the preset condition. For example, the electronic device may simultaneously display content corresponding to a plurality of applications on the screen (namely, the display interface).

By using the solution in this application, when the electronic device displays the first interface, for example, the home screen of the electronic device or the interface corresponding to any application included in the electronic device, the electronic device can determine whether an application meeting the preset condition exists (namely, an application on which split-screen display can be performed). When the electronic device determines that an application meeting the preset condition exists, the electronic device can automatically display the identifier of the application on which split-screen display can be performed, thereby reducing operations performed when the user uses the electronic device to perform split-screen display, and improving split-screen display efficiency of the electronic device.

An embodiment of this application further provides a display apparatus corresponding to the method in the foregoing embodiments. The display apparatus may be used in an electronic device, and is configured to implement the method in the foregoing embodiments. Functions of the display apparatus may be implemented by hardware or may be implemented by corresponding software executed by hardware. The hardware or software includes one or more modules corresponding to the functions.

Figure 16:
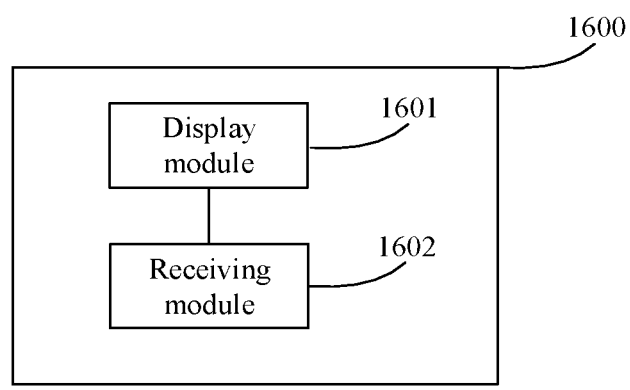
FIG. 16 is a schematic diagram 1 of a structure of a display apparatus according to an embodiment of this application.

For example, FIG. 16 is a schematic diagram of a structure of a display apparatus 1600. As shown in FIG. 16, the display apparatus 1600 may include a display module 1601, a receiving module 1602, and the like.

The display module 1601 may be configured to display a first interface on a display, where the first interface is an interface of a first application in an electronic device.

The display module 1601 may be further configured to display a first control on the first interface when a second application in the electronic device meets a preset condition, where the first control includes an identifier of the first application and an identifier of the second application.

The receiving module 1602 may be configured to receive a first operation performed by a user on the first control.

The display module 1601 may be further configured to display a second interface on the display in response to the first operation, where the second interface includes the interface of the first application and an interface of the second application.

In another possible implementation, the preset condition may be one or more of the following conditions: a quantity of switching times between the second application and the first application within a first preset time period before the first interface is displayed is greater than a threshold for the quantity of switching times; the second application ran in a foreground within a second preset time period before the first interface is displayed; the second interface was displayed on the display before the first interface is displayed; and status information of the electronic device that is generated when the first interface is displayed matches historical status information of the electronic device that is generated when the second interface is displayed on the display, and the historical status information includes at least one of a location of the electronic device that exists when the second interface is displayed on the display, a time of the electronic device that exists when the second interface is displayed on the display, a device status of the electronic device that exists when the second interface is displayed on the display, and a speed of the electronic device that exists when the second interface is displayed on the display.

In another possible implementation, that status information of the electronic device that is generated when the first interface is displayed matches historical status information of the electronic device that is generated when the second interface is displayed on the display includes at least one of the following: a location of the electronic device that exists when the first interface is displayed on the display matches the location of the electronic device that exists when the second interface is displayed on the display; a time of the electronic device that exists when the first interface is displayed on the display matches the time of the electronic device that exists when the second interface is displayed on the display; a device status of the electronic device that exists when the first interface is displayed on the display matches the device status of the electronic device that exists when the second interface is displayed on the display; or a speed of the electronic device that exists when the first interface is displayed on the display matches the speed of the electronic device that exists when the second interface is displayed on the display.

In another possible implementation, the display may be a foldable screen.

In another possible implementation, the display module 1601 may be further configured to display the second interface on the display when it is detected that the foldable screen of the electronic device is in an unfolded state.

In another possible implementation, the display module 1601 may be further configured to display a first prompt window when it is detected that the foldable screen of the electronic device is in a folded state, where the first prompt window is used to prompt the user to unfold the foldable screen of the electronic device. The receiving module 1602 may be further configured to receive a second operation performed by the user to unfold the foldable screen.

Figure 17:
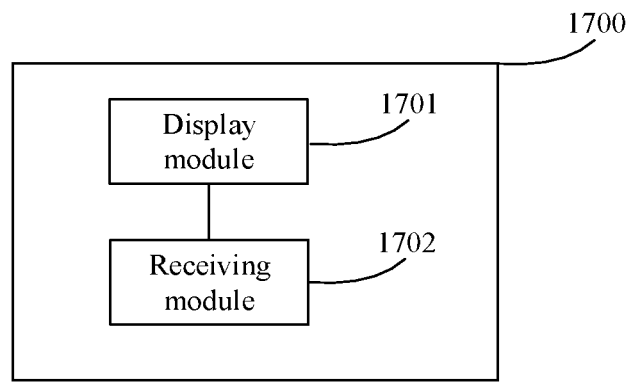
FIG. 17 is a schematic diagram 2 of a structure of a display apparatus according to an embodiment of this application.

For another example, FIG. 17 is a schematic diagram of a structure of a display apparatus 1700. As shown in FIG. 17, the display apparatus 1700 may include a display module 1701, a receiving module 1702, and the like.

The display module 1701 may be configured to display a first interface on a display, where the first interface is a home screen of an electronic device or an interface corresponding to any application in an electronic device.

The display module 1701 may be further configured to display a first control on the first interface when a first application and a second application in the electronic device meet a preset condition, where the first control includes an identifier of the first application and an identifier of the second application.

The receiving module 1702 may be configured to receive a first operation performed by a user on the first control.

The display module 1701 may be further configured to enable the electronic device to display a second interface on the display in response to the first operation, where the second interface includes an interface of the first application and an interface of the second application.

In another possible implementation, the preset condition may be that status information of the electronic device that is generated when the first interface is displayed matches historical status information of the electronic device that is generated when the second interface is displayed on the display, and the historical status information includes at least one of a location of the electronic device that exists when the second interface is displayed on the display, a time of the electronic device that exists when the second interface is displayed on the display, a device status of the electronic device that exists when the second interface is displayed on the display, and a speed of the electronic device that exists when the second interface is displayed on the display.

In another possible implementation, that status information of the electronic device that is generated when the first interface is displayed matches historical status information of the electronic device that is generated when the second interface is displayed on the display includes at least one of the following: a location of the electronic device that exists when the first interface is displayed on the display matches the location of the electronic device that exists when the second interface is displayed on the display; a time of the electronic device that exists when the first interface is displayed on the display matches the time of the electronic device that exists when the second interface is displayed on the display; a device status of the electronic device that exists when the first interface is displayed on the display matches the device status of the electronic device that exists when the second interface is displayed on the display; or a speed of the electronic device that exists when the first interface is displayed on the display matches the speed of the electronic device that exists when the second interface is displayed on the display.

In another possible implementation, the display may be a foldable screen.

In another possible implementation, the display module 1701 may be further configured to display the second interface on the display when it is detected that the foldable screen of the electronic device is in an unfolded state.

In another possible implementation, the display module 1701 may be further configured to display a first prompt window when it is detected that the foldable screen of the electronic device is in a folded state, where the first prompt window is used to prompt the user to unfold the foldable screen of the electronic device. The receiving module 1702 may be further configured to receive a second operation performed by the user to unfold the foldable screen.

It should be understood that division of units or modules (referred to as units in the following) in the apparatus is merely logical function division. In an actual implementation, all or some of the units or modules may be integrated into one physical entity, or may be physically separated. In addition, the units in the apparatus may be all implemented in a form of software invoked by a processing element or may be all implemented in a form of hardware, or some units may be implemented in a form of software invoked by a processing element and some units are implemented in a form of hardware.

For example, each unit may be a separately disposed processing element, or may be integrated into a specific chip in the apparatus for implementation. In addition, the unit may alternatively be stored in a memory in a form of a program, and invoked by a specific processing element of the apparatus to implement a function of the unit. In addition, all or some of these units may be integrated together, or may be implemented independently. The processing element described herein may also be referred to as a processor, and may be an integrated circuit that has a signal processing capability. In an implementation process, the steps in the foregoing method or the foregoing units may be implemented by using a hardware integrated logic circuit in a processor element, or may be implemented by software invoked by the processing element.

In one example, the units in the foregoing apparatus may be one or more integrated circuits configured to implement the foregoing method, for example, one or more ASICs, one or more DSPs, one or more FPGAs, or a combination of at least two of these integrated circuit forms.

For another example, when the units in the apparatus may be implemented in a form of scheduling a program by using the processing element, the processing element may be a general-purpose processor, for example, a CPU or another processor that can invoke the program. For another example, these units may be integrated together and implemented in a form of a system-on-a-chip (system-on-a-chip, SOC).

In an implementation, the units that are in the foregoing apparatus and that implement corresponding steps in the foregoing method may be implemented in a form of scheduling a program by using the processing element. For example, the apparatus may include a processing element and a storage element, and the processing element invokes a program stored in the storage element to perform the method described in the foregoing method embodiments. The storage element may be a storage element that is located on a same chip as the processing element, namely, an on-chip storage element.

In another implementation, the program used to perform the foregoing method may be on a storage element that is located on a different chip from the processing element, namely, an off-chip storage element. In this case, the processing element invokes or loads the program from the off-chip storage element onto the on-chip storage element, to invoke and perform the method described in the foregoing method embodiments.

For example, an embodiment of this application may further provide an apparatus, for example, an electronic device. The electronic device may include a processor and a memory configured to store instructions executable by the processor. The processor is configured to enable, when executing the instructions, the electronic device to implement the display method described in the foregoing embodiments. The memory may be located inside the electronic device or may be located outside the electronic device. In addition, there are one or more processors.

In still another implementation, the units that are in the apparatus and that implement the steps in the foregoing method may be configured as one or more processing elements, and these processing elements may be disposed on the corresponding electronic device described above. The processing elements herein may be integrated circuits, for example, one or more ASICs, one or more DSPs, one or more FPGAs, or a combination of these types of integrated circuits. These integrated circuits may be integrated together to form a chip.

For example, an embodiment of this application further provides a chip, and the chip may be used in the foregoing electronic device. The chip includes one or more interface circuits and one or more processors. The interface circuit and the processor are interconnected by using a line. The processor receives computer instructions from the memory of the electronic device through the interface circuit and executes the computer instructions, to implement the method described in the foregoing method embodiments.

An embodiment of this application further provides a computer program product, including the computer instructions run by the electronic device.

Through the description of the foregoing implementations, a person skilled in the art may clearly understand that, for the purpose of convenient and brief description, only division of the foregoing functional modules is used as an example for description. In an actual application, the functions may be allocated to and completed by different functional modules as required. That is, an internal structure of the apparatus is divided into different functional modules, to complete all or some of the functions described above.

In the several embodiments provided in this application, it should be understood that the disclosed apparatus and method may be implemented in other manners. For example, the foregoing apparatus embodiments are merely examples. For example, division of the modules or the units is merely logical function division and may be another division manner in an actual implementation. For example, a plurality of units or components may be combined or integrated into another apparatus, or some features may be ignored or not performed. In addition, the displayed or discussed mutual coupling or direct coupling or communication connection may be implemented through some interfaces. The indirect coupling or communication connection between the apparatuses or units may be implemented in an electrical form, a mechanical form, or another form.

The units described as separate parts may or may not be physically separated, and parts displayed as units may be one or more physical units, that is, may be located in one place, or may be distributed in a plurality of different places. Some or all of the units may be selected based on actual requirements to achieve the objectives of the solutions in the embodiments.

In addition, the functional units in the embodiments of this application may be integrated into one processing unit, or each of the units may exist alone physically, or two or more units are integrated into one unit. The foregoing integrated unit may be implemented in a form of hardware, or may be implemented in a form of a software functional unit.

When the integrated unit is implemented in the form of the software functional unit and sold or used as an independent product, the integrated unit may be stored in a readable storage medium. Based on such an understanding, the technical solutions in the embodiments of this application essentially, or the part contributing to the conventional technology, or all or some of the technical solutions may be embodied in a form of a software product, for example, a program. The software product is stored in a program product, for example, a computer-readable storage medium, including several instructions used to enable a device (which may be a single-chip microcomputer, a chip, or the like) or a processor (processor) to perform all or some of the steps of the method described in the embodiments of this application. The storage medium includes any medium that can store program code, for example, a USB flash drive, a removable hard disk, a ROM, a RAM, a magnetic disk, or an optical disc.

For example, an embodiment of this application may further provide a computer-readable storage medium, and the computer-readable storage medium stores computer program instructions. When the computer program instructions are executed by an electronic device, the electronic device is enabled to implement the display method described in the foregoing method embodiments.

The foregoing descriptions are merely specific implementations of this application, but are not intended to limit the protection scope of this application. Any change or replacement made within the technical scope disclosed in this application shall fall within the protection scope of this application. Therefore, the protection scope of this application shall be subject to the protection scope of the claims.

What is claimed is:

1. An electronic device, wherein the electronic device comprises:
   a screen;
   at least one processor;
   one or more memories coupled to the at least one processor and storing programming instructions for execution by the at least one processor to cause the electronic device to:
   display a first interface;
   obtain a current status information of the electronic device;
   determine, based on the current status information of the electronic device and a built-in split-screen prediction model, whether a first application pair exists, wherein the split-screen prediction model was obtained through training based on historical split-screen information that is stored in the electronic device and that is of an application pair on which split-screen display was performed by the electronic device, wherein the historical split-screen information comprises a time in which the electronic device historically performs split-screen display on the application pair, a location of the electronic device that exists when the electronic device historically performs split-screen display on the application pair, a device status of the electronic device that exists when the electronic device historically performs split-screen display on the application pair, and a reason why the electronic device historically performs split-screen display on the application pair, wherein the device status of the electronic device that exists when the electronic device historically performs split-screen display on the application pair comprises a first status indication of whether a screen of the electronic device is in an unfolded state when the electronic device historically performs split-screen display on the application pair, and a second status indication of whether the electronic device is inserted with a headset when the electronic device historically performs split-screen display on the application pair, and a third status indication of whether the electronic device is connected to Wi-Fi or Bluetooth when the electronic device historically performs split-screen display on the application pair;
   display a first control when the electronic device determines that the first application pair exists, wherein the first control comprises identifiers of a plurality of applications included in the first application pair;
   receive a trigger operation performed by a user on the first control;
   in response to the trigger operation, display data corresponding to the plurality of applications included in the first application pair in a split-screen mode;
   wherein when electronic device is a new electronic device, the one or more memories store programming instructions for execution by the at least one processor to cause the electronic device to:
   obtain a historical split-screen information of another electronic device from a cloud; and
   obtain the split-screen prediction model based on the historical split-screen information of the another electronic device; and
   determine whether the screen of the electronic device is in the unfolded state or a folded state;
   perform at least one of the following based on a determination of whether the screen of the electronic device is in the unfolded state or the folded state:
   display an identifier of a second application in a split-screen application bar in response to determining that the screen of the electronic device is in the unfolded state; or
   display a prompt window to prompt a user to use the split-screen display in response to determining that the screen of the electronic device is in the folded state.

2. The electronic device according to claim 1, wherein the first interface is a home screen of the electronic device or an interface corresponding to any application in the electronic device.

3. The electronic device according to claim 1, wherein the current status information comprises at least one of: a current time of the electronic device, a current location of the electronic device, a current device status of the electronic device, or a current speed of the electronic device.

4. The electronic device according to claim 3, wherein the current location of the electronic device comprises: a home, a company, a car, a bus, or a subway.

5. The electronic device according to claim 3, wherein the current device status of the electronic device comprises at least one of: a current status of the screen, the electronic device is inserted with a headset, the electronic device is connected to Wi-Fi, or the electronic device is connected to in-vehicle Bluetooth.

6. The electronic device according to claim 5, wherein the screen is a foldable screen, and the current status of the screen comprises: an unfolded state.

7. The electronic device according to claim 1, wherein the one or more memories store programming instructions for execution by the at least one processor to cause the electronic device to:
continue to display the first interface when the electronic device determines that no first application pair exists.

8. The electronic device according to claim 1, wherein the first application pair comprises at least one of: a learning and office application and a learning and office application, a learning and office application and a communication and social application, a communication and social application and an video entertainment application, a photographing application and a learning and office application, or a utility application and a learning and office application.

9. The electronic device according to claim 1, wherein the one or more memories store programming instructions for execution by the at least one processor to cause the electronic device to:
display a data corresponding to a first application;
obtain a stored historical split-screen information of the first application, or obtain a historical split-screen information, generated when the another electronic device uses the first application, from a cloud, when electronic device is a new electronic device;
determines, based on the stored historical split-screen information of the first application or the historical split-screen information generated when the another electronic device uses the first application, whether a second application exists;
display a first control when determining that the second application exists, wherein the first control includes an identifier of the first application and an identifier of the second application;
receive a trigger operation performed by the user on the first control; and
in response to the trigger operation, display the data corresponding to the first application and the data corresponding to the second application in a split-screen mode.

10. The electronic device according to claim 9, wherein the historical split-screen information comprises at least one of: attribute information of the user, a display manner used when the electronic device uses the first application for split-screen display, applications that is in the electronic device and on which split-screen display was performed together with the first application.

11. The electronic device according to claim 10, wherein the device status of the electronic device that exists when the electronic device uses the first application for split-screen display comprises at least one of: a status of the screen, the electronic device is inserted with a headset, the electronic device is connected to Wi-Fi, or the electronic device is connected to in-vehicle Bluetooth.

12. A display method, applied to an electronic device having a display, wherein the method comprises:
displaying a first interface;
obtaining a current status information of the electronic device;
determining, based on the current status information of the electronic device and a built-in split-screen prediction model, whether a first application pair exists, wherein the split-screen prediction model was obtained through training based on historical split-screen information that is stored in the electronic device and that is of an application pair on which split-screen display was performed by the electronic device, wherein the historical split-screen information comprises a time in which the electronic device historically performs split-screen display on the application pair, a location of the electronic device that exists when the electronic device historically performs split-screen display on the application pair, a device status of the electronic device that exists when the electronic device historically performs split-screen display on the application pair, and a reason why the electronic device historically performs split-screen display on the application pair, wherein the device status of the electronic device that exists when the electronic device historically performs split-screen display on the application pair comprises a first status indication of whether a screen of the electronic device is in an unfolded state when the electronic device historically performs split-screen display on the application pair, and a second status indication of whether the electronic device is inserted with a headset when the electronic device historically performs split-screen display on the application pair, and a third status indication of whether the electronic device is connected to Wi-Fi or Bluetooth when the electronic device historically performs split-screen display on the application pair;
displaying a first control when the electronic device determines that the first application pair exists, wherein the first control comprises identifiers of a plurality of applications included in the first application pair;
receiving a trigger operation performed by a user on the first control;
in response to the trigger operation, displaying data corresponding to the plurality of applications included in the first application pair in a split-screen mode;
wherein when electronic device is a new electronic device, the method further comprises:
obtaining a historical split-screen information of another electronic device from a cloud; and
obtaining the split-screen prediction model based on the historical split-screen information of the another electronic device; and
determining whether the screen of the electronic device is in the unfolded state or a folded state;
performing at least one of the following based on a determination of whether the screen of the electronic device is in the unfolded state or the folded state:

displaying an identifier of a second application in a split-screen application bar in response to determining that the screen of the electronic device is in the unfolded state; or display a prompt window to prompt a user to use the split-screen display in response to determining that the screen of the electronic device is in the folded state.

13. The method according to claim 12, wherein the first interface is a home screen of the electronic device or an interface corresponding to any application in the electronic device.

14. The method according to claim 12, wherein the current status information comprises at least one of: a current time of the electronic device, a current location of the electronic device, a current device status of the electronic device, or a current speed of the electronic device.

15. The method according to claim 14, wherein the current location of the electronic device comprises: a home, a company, a car, a bus, or a subway.

16. The method according to claim 14, wherein the current device status of the electronic device comprises at least one of: a current status of the screen, the electronic device is inserted with a headset, the electronic device is connected to Wi-Fi, or the electronic device is connected to in-vehicle Bluetooth.

17. The method according to claim 16, wherein the screen is a foldable screen, and the current status of the screen comprises: an unfolded state.

18. The method according to claim 12, wherein the method further comprises:
continuing to display the first interface when the electronic device determines that no first application pair exists.

19. The method according to claim 12, wherein the first application pair comprises at least one of: a learning and office application and a learning and office application, a learning and office application and a communication and social application, a communication and social application and an video entertainment application, a photographing application and a learning and office application, or a utility application and a learning and office application.

20. The method according to claim 12, wherein the method further comprises:
displaying a data corresponding to a first application;
obtaining a stored historical split-screen information of the first application, or obtaining a historical split-screen information, generated when the another electronic device uses the first application, from a cloud, when electronic device is a new electronic device;
determining, based on the stored historical split-screen information of the first application or the historical split-screen information generated when the another electronic device uses the first application, whether a second application exists;
displaying a first control when determining that the second application exists, wherein the first control includes an identifier of the first application and an identifier of the second application;
receiving a trigger operation performed by the user on the first control;
in response to the trigger operation, displaying the data corresponding to the first application and the data corresponding to the second application in a split-screen mode.

* * * * *